(12) United States Patent
Mitsui et al.

(10) Patent No.: US 7,698,803 B2
(45) Date of Patent: Apr. 20, 2010

(54) METHOD OF MANUFACTURING LAMINATED CORE

(75) Inventors: Yoshiaki Mitsui, Fukuoka (JP); Katsufusa Fujita, Fukuoka (JP)

(73) Assignee: Mitsui High-Tec, Inc. (JP)

( * ) Notice: Subject to any disclaimer, the term of this patent is extended or adjusted under 35 U.S.C. 154(b) by 554 days.

(21) Appl. No.: 10/573,867

(22) PCT Filed: Sep. 8, 2005

(86) PCT No.: PCT/JP2005/016531

§ 371 (c)(1),
(2), (4) Date: Mar. 29, 2006

(87) PCT Pub. No.: WO2006/028179

PCT Pub. Date: Mar. 16, 2006

(65) Prior Publication Data

US 2008/0098587 A1    May 1, 2008

(30) Foreign Application Priority Data

| Sep. 9, 2004 | (JP) | 2004-262541 |
| Oct. 26, 2004 | (JP) | 2004-311198 |
| Nov. 9, 2004 | (JP) | 2004-325201 |
| Nov. 25, 2004 | (JP) | 2004-340510 |
| Nov. 25, 2004 | (JP) | 2004-340511 |
| Dec. 2, 2004 | (JP) | 2004-349848 |

(51) Int. Cl.
    H02K 15/02    (2006.01)
(52) U.S. Cl. .............. 29/596; 29/605; 29/609; 29/732; 310/254.1

(58) Field of Classification Search .......... 29/596–598, 29/732–736, 605–609; 310/42, 52, 216, 310/254, 74, 202, 198, 208, 216.001, 254.1, 310/180; 72/353.2, 354.2, 363, 402
See application file for complete search history.

(56) References Cited

U.S. PATENT DOCUMENTS 4,395,815 A * 8/1983 Stanley et al. .......... 29/598

(Continued)

FOREIGN PATENT DOCUMENTS

JP    A-7-087714    3/1995

(Continued)

Primary Examiner—Minh Trinh
(74) Attorney, Agent, or Firm—Wood, Phillips, Katz, Clark & Mortimer

(57) ABSTRACT

A method of manufacturing a laminated stator core includes: forming a band-shaped yoke core piece having a shape that a yoke of the laminated stator core is developed in a straight line and having concave connection portions in the inner circumferential edge thereof by punching a metal plate; forming a laminated yoke body by winding and laminating the band-shaped yoke core piece in a spiral shape and coupling the laminated band-shaped yoke core piece in a caulking manner; forming a magnetic core piece having a convex connection portion at the base end thereof by punching a metal plate; forming a laminated magnetic body by laminating and coupling a predetermined number of the magnetic core pieces to each other in a caulking manner; and coupling the laminated yoke body and the laminated magnetic body to each other by winding a coil around the laminated magnetic body and then inserting the convex connection portions into the concave connection portions.

11 Claims, 67 Drawing Sheets

U.S. PATENT DOCUMENTS

| | | | | |
|---|---|---|---|---|
| 4,438,558 | A * | 3/1984 | Mitsui | 29/732 |
| 4,951,377 | A * | 8/1990 | Fritzsche | 29/596 |
| 5,896,648 | A * | 4/1999 | Brown et al. | 29/732 |
| 6,448,685 | B1 * | 9/2002 | Mayer et al. | 310/254 |
| 6,681,476 | B2 * | 1/2004 | Mayer et al. | 29/596 |
| 6,806,615 | B2 * | 10/2004 | Enomoto et al. | 310/218 |
| 6,936,949 | B2 * | 8/2005 | Akutsu et al. | 310/218 |
| 7,067,952 | B2 * | 6/2006 | Neal | 310/259 |
| 2004/0124734 | A1 | 7/2004 | Liao | |

FOREIGN PATENT DOCUMENTS

| | | |
|---|---|---|
| JP | A-9-117112 | 5/1997 |
| JP | 11-275781 | 10/1999 |
| JP | A-11-299136 | 10/1999 |
| JP | A-2000-224817 | 8/2000 |
| JP | A-2002-051485 | 2/2002 |
| JP | A-2002-112513 | 4/2002 |
| JP | A-2002-374642 | 12/2002 |
| JP | A-2004-072983 | 3/2004 |

* cited by examiner

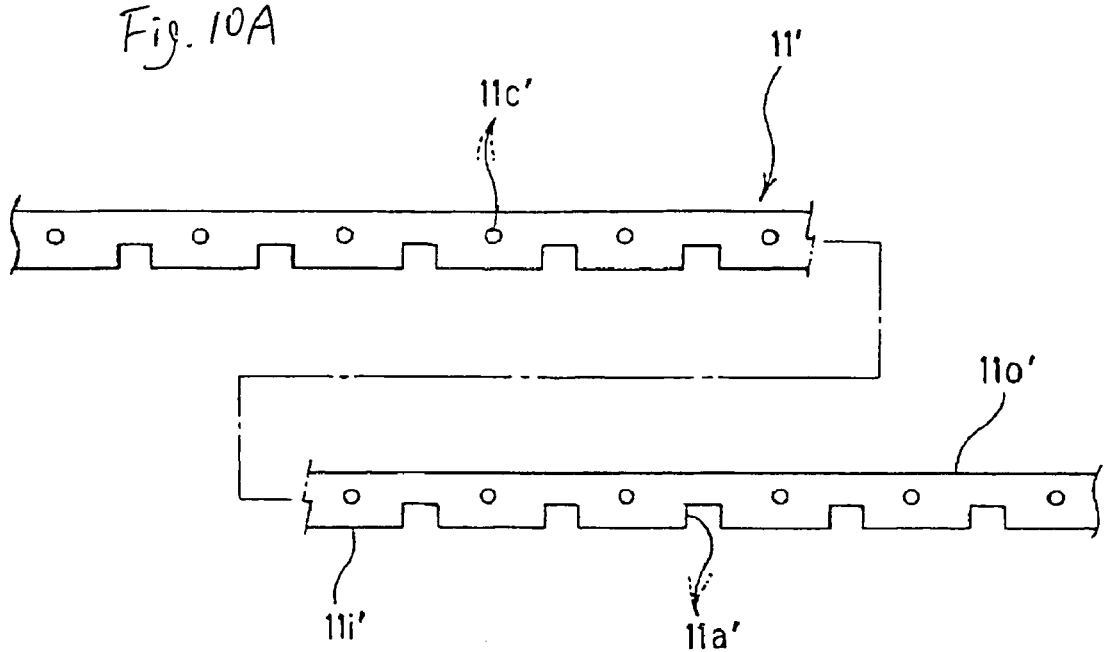
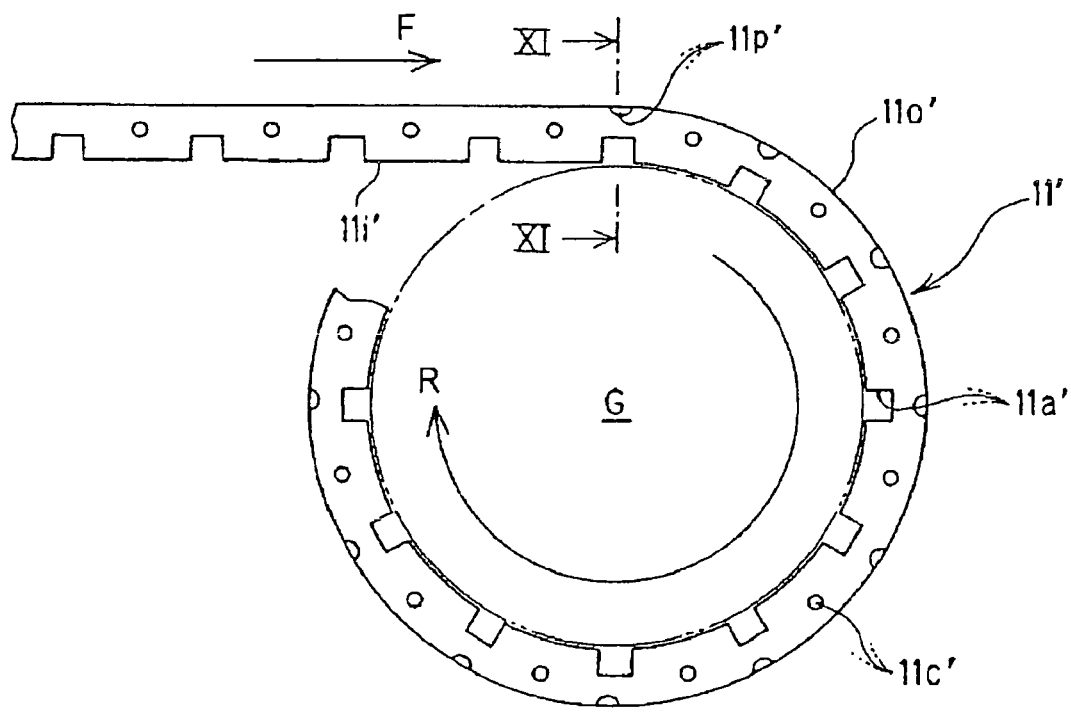

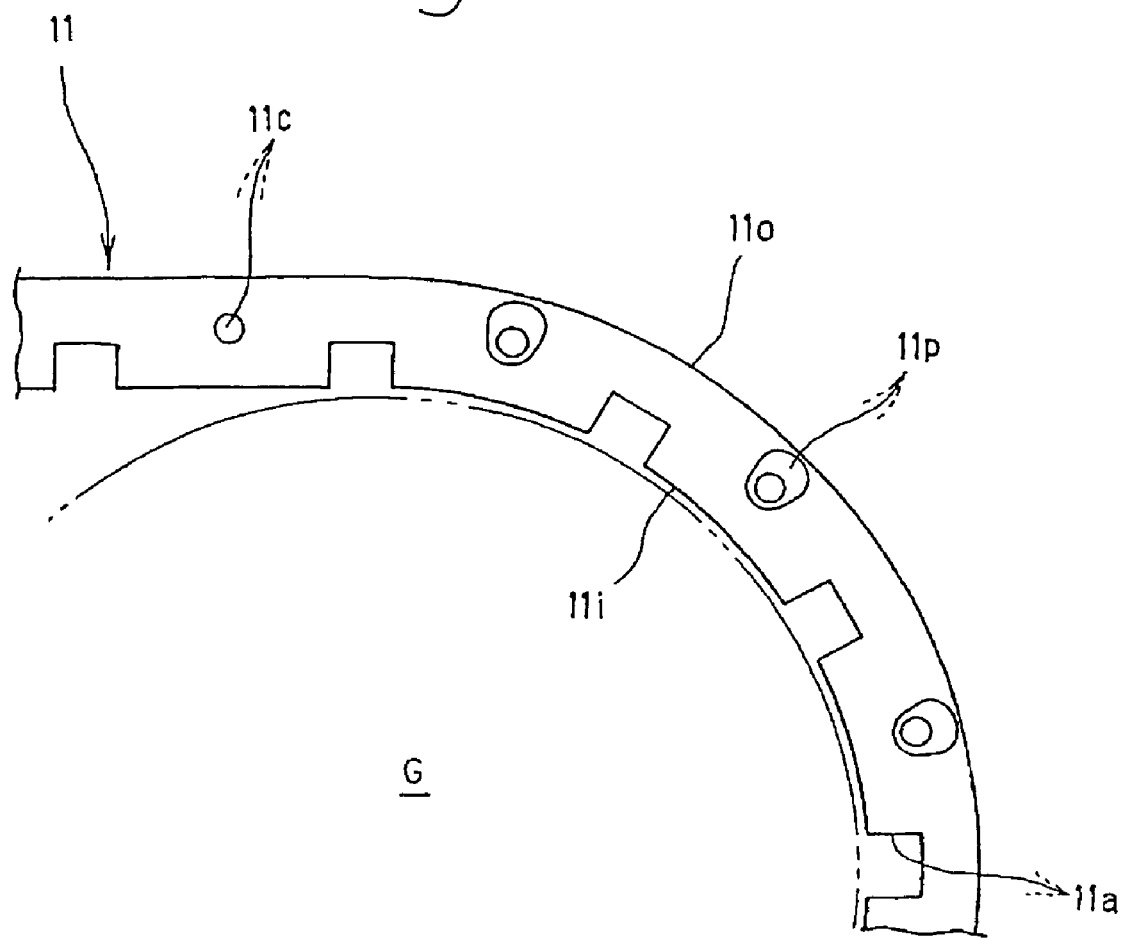

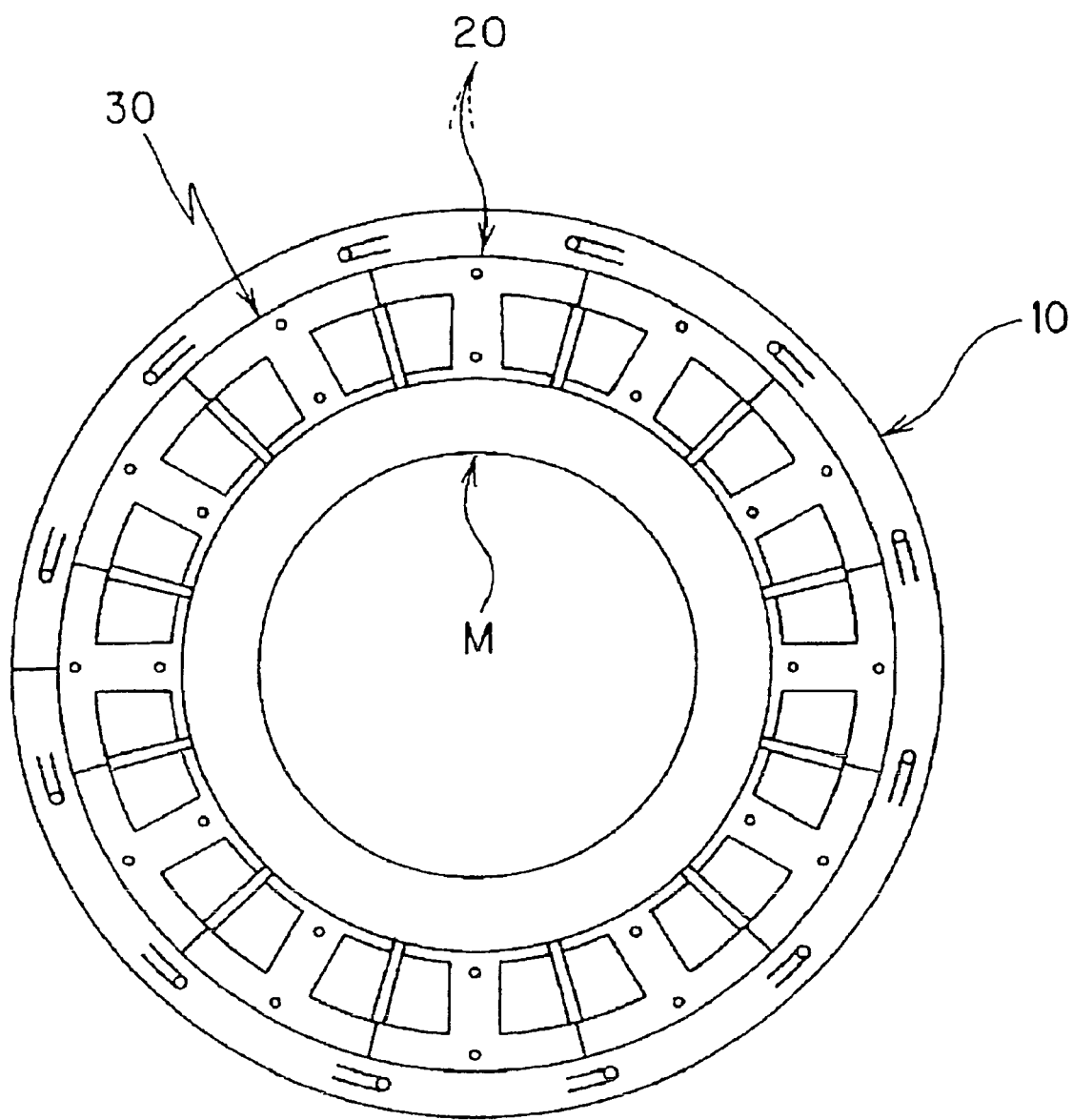

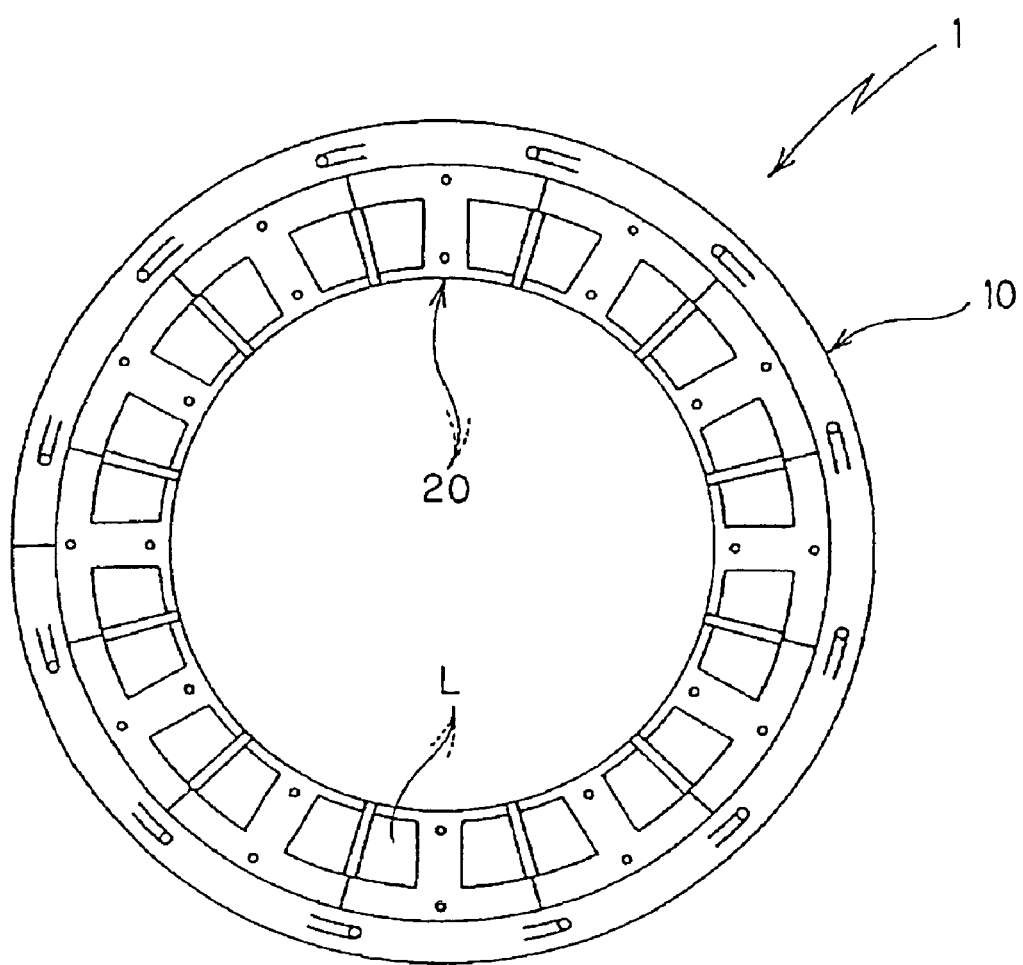

METHOD OF MANUFACTURING LAMINATED CORE

TECHNICAL FIELD OF THE INVENTION

The present invention relates to a method of manufacturing a laminated core, and more particularly, to a method of manufacturing a laminated core by winding and laminating band-shaped core pieces in a spiral shape and coupling the band-shaped core pieces to each other in a caulking manner.

DESCRIPTION OF THE RELATED ART

Large-sized ones are used as a laminated core built in a driving electric motor generating high power. Since a large-sized manufacturing apparatus (molding apparatus) is required for manufacturing the large-sized laminated core such as a laminated stator core, the increase in cost is caused. Further, since when a large-sized stator core piece is formed through punching, wide scraped portions are generated from the inside. Accordingly, a blanking yield of a core material is remarkably reduced.

In order to solve the above-mentioned problem, there has been suggested a method of manufacturing a laminated stator core by forming band-shaped core pieces having a shape that the laminated stator core is developed in a straight line by punching a metal plate, and winding and laminating the band-shaped core pieces in a spiral shape (for example, see Patent Document 1 and Patent Document 2).

The laminated stator core A shown in FIG. 62A includes a yoke Y having a cylinder shape and a predetermined number of protrusions T, T, . . . protruded in the diameter direction from the yoke Y. The laminated stator core is manufactured, as shown in FIG. 63A, by winding and laminating a band-shaped core piece S, that is, a band-shaped core piece S in which magnetic pole portions St, St, . . . are formed in the inner circumferential edge of a yoke portion Sy extending in a line shape, around the outer circumference of a guide C; and caulking the band-shaped core pieces S, S, . . . wound and laminated with each other by vertically pressing them or fixing them by welding.

In the method of manufacturing a laminated stator core, since a large-sized manufacturing apparatus (molding apparatus) is not necessary and the blanking yield of the core material is enhanced, it is possible to prevent the increase in manufacturing cost.

Patent Document 1: Japanese Unexamined Patent Publication No. 11-299136

Patent Document 2: Japanese Unexamined Patent Publication No. 2000-224817

However, in the conventional manufacturing method described above, since the plane shape of the band-shaped core piece S constituting the laminated stator core A is very complex, it is difficult to wind the band-shaped core piece S in a circular shape due to deviation in deformation of each place at the time of winding it in a spiral shape or the like. In addition, since a departure can be easily generated between the laminated magnetic pole portions St, St, . . . constituting the magnetic poles T, shaping precision of the manufactured laminated stator core A is severely deteriorated.

In this way, when the shaping precision of the laminated stator core A is deteriorated, there is a problem that an air gap from a rotor (not shown) has to be set great and it is possible to accomplish high power and high torque with increase in size due to deterioration in efficiency.

In the conventional manufacturing method described above, when the band-shaped core pieces S, S, . . . wound are coupled to each other by welding, an eddy current loss in the manufactured laminated stator core A is increased. On the other hand, when the band-shaped core pieces S, S, . . . wound are coupled to each other in a caulking manner, the shaping precision of winding the band-shaped core pieces S, S, . . . is not good as described above. Accordingly, the coupling strength is decreased due to the gap generated between the laminated band-shaped core pieces S, thereby reducing the mechanical strength of the manufactured laminated stator core A.

In the conventional manufacturing method described above, since the plane shape of the band-shaped core piece S is very complex, the material yield of blanking the band-shaped core piece S is not good.

In the conventional manufacturing method described above, since the yoke Y and the magnetic poles T, T, . . . of the laminated stator core A are formed integrally with each other, it is difficult to perform the winding work of coils to the respective magnetic poles T, thereby causing deterioration in electrical characteristic due to disturbance of the coils.

As a technology for solving the above-mentioned problems, a method of manufacturing a laminated stator core is suggested by arranging and fixing laminated stator sub-bodies, which have a shape that the laminated stator core is divided in a unit of magnetic poles, in a ring shape inside a case (for example, see Patent Document 3).

The laminated stator core B shown in FIGS. 64 and 65 is manufactured as follows. First, a laminated stator sub-body C is formed by laminating a predetermined number of stator core sub-pieces Ca formed by punching a plate material and then a coil L is wound around the laminated stator sub-body C. Thereafter, a predetermined number of laminated stator sub-bodies C, C, . . . on which the coil L has been wound are arranged in a ring shape on the inner circumference of an inner case I having a cylinder shape in which a slit Is is formed in the axis direction and are temporarily held in this state. Subsequently, an outer case O is shrink-fitted to the outer circumference of the inner case I, thereby coupling the laminated stator sub-bodies C, C, . . . , the inner case I, and the outer case O to each other.

According to the conventional method of manufacturing such a laminated stator core, since the laminated stator core is divided into a predetermined number of laminated stator sub-bodies C, C, . . . , the yield of blanking the stator core sub-pieces Ca, Ca, . . . is enhanced and the winding work of a coil around the respective laminated stator sub-bodies C is performed very easily.

Patent Document 3: Japanese Unexamined Patent Publication No. 2002-51485

However, in the conventional manufacturing method described with reference to FIGS. 64 and 65, since it is necessary to additionally prepare the inner case I and the outer case O which are manufactured through a particular process, along with the laminated stator sub-bodies C, C, . . . manufactured through punching, laminating, and caulking processes by the use of a molding apparatus, the processes of manufacturing the laminated stator core B are very complex. In addition, when a predetermined number of laminated stator sub-bodies C, C, . . . on which the coils L have been wound are arranged and temporarily held on the inner circumferential surface of the inner case I, a highly skilled hand is required for arranging the laminated stator sub-bodies C, C, . . . in a complete circular shape. Accordingly, it cannot be told that the shaping precision of the manufactured laminated stator core B is satisfactory.

In the case that the above-mentioned method of manufacturing a laminated stator core is used for manufacturing a laminated stator core, since a laminated rotor core is generally smaller than the laminated stator core and it is very difficult to wind the band-shaped core pieces in a circular shape with a small curvature, the shaping precision of the manufactured laminated rotor core is deteriorated.

On the other hand, as another method of manufacturing a laminated rotor core, there is known a method of manufacturing a laminated rotor core by laminating a predetermined number of core pieces which are formed by winding band-shaped core pieces in a ring shape, not in a spiral shape (see Patent Document 4).

Specifically, the laminated rotor core B shown in FIG. 66 has a rotation shaft fitting hole (shaft hole) O at the center thereof and protrusions C, C, . . . at the outer circumference thereof. As shown in FIG. 67, the laminated stator core B is manufactured by winding a band-shaped plate W extending straightly, in which cut portions n, n, . . . are formed in the inner circumferential edge Wi and slits s, s, . . . are formed in the outer circumferential edge Wo, by a predetermined length l in a ring shape to form the shaft hole Do at the center thereof, forming the magnetic pole portions c, c, . . . by punching the peripheries of the slits to form a sheet of a rotor core piece D, and laminating and fixing a predetermined number of the rotor core pieces D to each other.

Patent Document 4: Japanese Unexamined Patent Publication No. 7-87714

In the method of manufacturing a laminated rotor core shown in FIGS. 66 and 67, since the rotor core piece D is formed by winding the band-shaped plate W, the material yield of the metal plate is greatly enhanced.

However, since the shaft hole Do of the respective rotor core pieces D constituting the laminated rotor core B has a polygonal shape consisting of segments formed by dividing the inner circumference edge Wi of the band-shaped plate W by the cut portions n, a re-grinding process using a broaching machine or the like should be necessarily performed to the rotation shaft fitting hole O so as to fitting a rotation shaft (not shown) into the rotation shaft fitting hole (shaft hole) O of the laminated rotor core B in which a predetermined number of rotor core pieces D are laminated. Accordingly, the processes of manufacturing the laminated rotor core as a complete product are complex, thereby causing deterioration in productivity.

In the above-mentioned method of manufacturing the laminated rotor core, since the respective rotor core pieces D are formed in a ring shape by winding them one by one, it is difficult to enhance the productivity of the laminated rotor core in which a predetermined number of rotor core pieces D.

DISCLOSURE OF INVENTION

Problems to be Solved by the Invention

As described above, it is difficult to manufacture a large-sized laminated core excellent in shaping precision and electrical characteristic.

An object of the present invention is to provide a method of manufacturing a laminated core excellent in shaping precision and electrical characteristic in view of the above-mentioned problems.

According to a first aspect of the present invention, there is provided a method of manufacturing a laminated stator core, the method comprising: forming a band-shaped yoke core piece having a shape that a yoke of the laminated stator core is developed in a straight line and having concave connection portions in the inner circumferential edge thereof by punching a metal plate; forming a laminated yoke body by winding and laminating the band-shaped yoke core piece in a spiral shape and coupling the laminated band-shaped yoke core piece in a caulking manner; forming a magnetic core piece having a convex connection portion at the base end thereof by punching a metal plate; forming a laminated magnetic body by laminating and coupling a predetermined number of the magnetic core pieces to each other in a caulking manner; and coupling the laminated yoke body and the laminated magnetic body to each other by winding a coil around the laminated magnetic body and then inserting the convex connection portions into the concave connection portions.

According to a second aspect of the present invention, there is provided a method of manufacturing a laminated stator core, the method comprising: forming a band-shaped yoke core piece having a shape that a yoke of the laminated stator core is developed in a straight line and having concave connection portions in the inner circumferential edge thereof by punching a metal plate; forming a laminated yoke body by locally pressing the outer circumferential edge of the band-shaped yoke core piece to roll it in a longitudinal direction, then winding and laminating the band-shaped yoke core piece in a spiral shape, and coupling the laminated band-shaped yoke core piece in a caulking manner; forming a magnetic core piece having a convex connection portion at the base end thereof by punching a metal plate; forming a laminated magnetic body by laminating and coupling a predetermined number of the magnetic core pieces to each other in a caulking manner; and coupling the laminated yoke body and the laminated magnetic body to each other by winding a coil around the laminated magnetic body and then inserting the convex connection portions into the concave connection portions.

According to a third aspect of the present invention, the method of the first or second aspect may further comprise correcting the shape of the laminated yoke body by applying a diameter enlarging force from the inner circumference of the laminated yoke body, after the forming the laminated yoke body and before the coupling the laminated magnetic bodies to the laminated yoke body.

According to a fourth aspect of the present invention, there is provided a method of manufacturing a laminated stator core, the method comprising: forming a band-shaped yoke core piece having a shape that a yoke of the laminated stator core is developed in a straight line and having concave connection portions in the inner circumferential edge thereof by punching a metal plate; forming a laminated yoke body by winding and laminating the band-shaped yoke core piece in a spiral shape, coupling the laminated band-shaped yoke core piece in a caulking manner by the use of caulking portions formed in advance, and locally pressing the caulking portions or peripheries of the caulking portions including the caulking portions; forming a magnetic core piece having a convex connection portion at the base end thereof by punching a metal plate; forming a laminated magnetic body by laminating and coupling a predetermined number of the magnetic core pieces to each other in a caulking manner; and coupling the laminated yoke body and the laminated magnetic body to each other by winding a coil around the laminated magnetic body and then inserting the convex connection portions into the concave connection portions.

According to a fifth aspect of the present invention, in the method of the fourth aspect, the area where the periphery of each caulking portion including the caulking portion is locally pressed may be an area which is widened from the caulking portion toward the outer circumferential edge of each band-shaped yoke core piece According to a sixth aspect of the present invention, there is provided a method of manufacturing a laminated stator core in which a laminated magnetic body formed by laminating a magnetic core piece in a caulking manner is fitted to a laminated yoke body formed by winding and laminating a band-shaped yoke core piece in a caulking manner, the method comprising: forming the band-shaped yoke core piece having a shape that a yoke of the laminated stator core is developed in a straight line by punching a metal plate, wherein concave connection portions are formed in the inner circumferential edge thereof and arc-shaped caulking portions are arranged with a constant pitch in a plane shape curved in the winding direction; forming the laminated yoke body by winding and laminating the band-shaped yoke core piece in a spiral shape and inserting caulking tongues of the arc-shaped caulking portions into caulking grooves of the arc-shaped caulking portion in a lower layer to couple them in a caulking manner; forming a magnetic core piece having a convex connection portion at the base end thereof by punching a metal plate; forming a laminated magnetic body by laminating and coupling a predetermined number of the magnetic core pieces to each other in a caulking manner; and coupling the laminated yoke body and the laminated magnetic body to each other by winding a coil around the laminated magnetic body and then inserting the convex connection portions into the concave connection portions.

According to a seventh aspect of the present invention, there is provided a method of manufacturing a laminated stator core, the method comprising: forming a band-shaped yoke core sub-piece having a shape that an outer half is developed in a straight line when a yoke portion of the laminated stator core is divided into two halves in the width direction by punching a metal plate; forming an outer laminated yoke body by winding and laminating the band-shaped yoke core sub-piece in a spiral shape and coupling it in a caulking manner; forming an inner yoke-attachment magnetic core sub-piece having an inner yoke sub-portion obtained by dividing the inner half in a unit of magnetic poles when the yoke portion of the laminated stator core is divided into two halves in the width direction, by punching a metal plate; forming an inner yoke-attachment laminated magnetic sub-body by laminating and coupling a predetermined number of the inner yoke-attachment magnetic core sub-pieces to each other in a caulking manner; forming an intermediate assembly in which the inner yoke sub-portions form a ring shape by winding a coil on the inner yoke-attachment laminated magnetic sub-body and connecting the ends of the inner yoke sub-portions in a predetermined number of the inner yoke-attachment laminated magnetic sub-bodies to each other; and coupling the inner yoke-attachment laminated magnetic sub-bodies to the outer laminated yoke body by shrink-fitting the outer laminated yoke body to the outer circumference of the intermediate assembly.

According to an eighth aspect of the present invention, there is provided a method of manufacturing a laminated stator core, the method comprising: forming a band-shaped yoke core sub-piece having a shape that an outer half is developed in a straight line when a yoke portion of the laminated stator core is divided into two halves in the width direction and having concave connection portions in the inner circumferential edge thereof by punching a metal plate; forming an outer laminated yoke body by winding and laminating the band-shaped yoke core sub-piece in a spiral shape and coupling it in a caulking manner; forming an inner yoke-attachment magnetic core sub-piece having a convex connection portion at the back side of an inner yoke sub-portion obtained by dividing the inner half in a unit of magnetic poles when the yoke portion of the laminated stator core is divided into two halves in the width direction, by punching a metal plate; forming an inner yoke-attachment laminated magnetic sub-body by laminating and coupling a predetermined number of the inner yoke-attachment magnetic core sub-pieces to each other in a caulking manner; and coupling the inner yoke-attachment laminated magnetic sub-body to the outer laminated yoke body by winding a coil on the inner yoke-attachment laminated magnetic sub-body and inserting the convex connection portion into the concave connection portion.

According to a ninth aspect of the present invention, there is provided a method of manufacturing a laminated stator core, the method comprising: forming a band-shaped yoke core sub-piece having a shape that an outer half is developed in a straight line when a yoke portion of the laminated stator core is divided into two halves in the width direction and having concave connection portions in the inner circumferential edge thereof by punching a metal plate; forming an outer laminated yoke body by winding and laminating the band-shaped yoke core sub-piece in a spiral shape and coupling it in a caulking manner; forming an inner yoke-attachment magnetic core sub-piece having a convex connection portion at the back side of an inner yoke sub-portion obtained by dividing the inner half in a unit of magnetic poles when the yoke portion of the laminated stator core is divided into two halves in the width direction, by punching a metal plate; forming an inner yoke-attachment laminated magnetic sub-body by laminating and coupling a predetermined number of the inner yoke-attachment magnetic core sub-pieces to each other in a caulking manner; and forming an inner yoke-attachment laminated magnetic sub-body by laminating and coupling a predetermined number of the inner yoke-attachment magnetic core sub-pieces to each other in a caulking manner; forming an intermediate assembly in which the inner yoke sub-portions form a ring shape by winding a coil on the inner yoke-attachment laminated magnetic sub-body and connecting the ends of the inner yoke sub-portions in a predetermined number of the inner yoke-attachment laminated magnetic sub-bodies to each other; and coupling the inner yoke-attachment laminated magnetic sub-bodies to the outer laminated yoke body by shrink-fitting the outer laminated yoke body to the outer circumference of the intermediate assembly and inserting the convex connection portions into the concave connection portions.

According to a tenth aspect of the present invention, there is provided a method of manufacturing a laminated rotor core by coupling a band-shaped core piece, which is wound and laminated in a spiral shape, in a caulking manner, the method comprising: forming a band-shaped core piece having a shape that the laminated rotor core is developed in a straight line by punching a metal plate, wherein cut portions are formed with a predetermined pitch in the inner circumferential edge, the inner circumferential edge between the adjacent cut portions is formed in an arc shape corresponding to the inner circumference of a shaft hole, and magnet fitting holes are formed with a predetermined pitch in an intermediate portion in the width direction; and winding and laminating the band-shaped core piece in a spiral shape while locally pressing and stretching the outer circumferential edge of the band-shaped core piece, and coupling the laminated band-shaped core piece in a caulking manner.

According to an eleventh aspect of the present invention, there is provided a method of manufacturing a laminated rotor core by coupling a band-shaped core piece, which is wound and laminated in a spiral shape, in a caulking manner, the method comprising: forming a band-shaped core piece having a shape that the laminated rotor core is developed in a straight line by punching a metal plate, wherein cut portions are formed with a predetermined pitch in the inner circumferential edge, the inner circumferential edge between the adjacent cut portions is formed in an arc shape corresponding to the inner circumference of a shaft hole, and diecast metal filling holes are formed with a predetermined pitch in an intermediate portion in the width direction; and winding and laminating the band-shaped core piece in a spiral shape while locally pressing and stretching the outer circumferential edge of the band-shaped core piece, and coupling the laminated band-shaped core piece in a caulking manner.

EFFECT OF THE INVENTION

In the first aspect of the present invention, since the laminated yoke body constituting the yoke of the laminated stator core and the laminated magnetic body constituting a magnetic pole of the laminated stator core are independently formed, the band-shaped yoke core piece constituting the laminated yoke body has a band shape with a small width, and the concave connection portions are formed in the inner circumferential edge of the band-shaped yoke core piece, bending processability of the band-shaped yoke core piece is greatly enhanced to be satisfactory. Accordingly, it is possible to form the laminated yoke body, which is formed by winding the band-shaped yoke core piece, in a circular shape.

Since the laminated magnetic body is formed by laminating a predetermined number of magnetic core pieces in a caulking manner, the laminated magnetic body is manufactured without departure between the laminated magnetic core pieces. Accordingly, the laminated stator core in which a predetermined number of laminated magnetic bodies are coupled to the laminated yoke body has very excellent shaping precision.

In addition, since the laminated magnetic body is formed independently of the laminated yoke body, the winding work of winding a coil on the laminated magnetic body becomes very easy. Accordingly, it is possible to wind a coil with a high density and an excellent proportion.

As a result, according to the first aspect of the present invention, it is possible to manufacture a laminated stator core excellent in shaping precision and electrical characteristic.

In the second aspect of the present invention, since the laminated yoke body constituting the yoke of the laminated stator core and the laminated magnetic body constituting a magnetic pole of the laminated stator core are independently formed, the band-shaped yoke core piece constituting the laminated yoke body has a band shape with a small width, and the concave connection portions are formed in the inner circumferential edge of the band-shaped yoke core piece, bending processability of the band-shaped yoke core piece is greatly enhanced to be satisfactory. Accordingly, it is possible to form the laminated yoke body, which is formed by winding the band-shaped yoke core piece, in a circular shape.

By locally pressing the outer circumferential edge of the band-shaped yoke core piece to roll the band-shaped yoke core piece in a longitudinal direction before winding the band-shaped yoke core piece in a spiral shape, it is possible to easily wind the band-shaped yoke core piece. Accordingly, the degree of circularity of the laminated yoke body formed by winding the band-shaped yoke core piece is enhanced and thus the shaping precision of the laminated yoke body is enhanced.

Since the laminated magnetic body is formed by laminating a predetermined number of magnetic core pieces in a caulking manner, the laminated magnetic body is manufactured without departure between the laminated magnetic core pieces. Accordingly, the laminated stator core in which a predetermined number of laminated magnetic bodies are coupled to the laminated yoke body has very excellent shaping precision.

In addition, since the laminated magnetic body is formed independently of the laminated yoke body, the winding work of winding a coil on the laminated magnetic body becomes very easy. Accordingly, it is possible to wind a coil with a high density and an excellent proportion.

In this way, by the use of the second method of manufacturing a laminated stator core according to the present invention, it is possible to manufacture a laminated stator core excellent in shaping precision and electrical characteristic.

In the third aspect of the present invention, since the shape is corrected by applying the diameter enlarging force from the inner circumference to the laminated yoke body formed by winding the band-shaped yoke core piece, it is possible to enhance the degree of circularity of the laminated yoke body and thus to manufacture a laminated stator core with excellent shaping precision.

In the fourth aspect of the present invention, since the laminated yoke body constituting the yoke of the laminated stator core and the laminated magnetic body constituting a magnetic pole of the laminated stator core are independently formed, the band-shaped yoke core piece constituting the laminated yoke body has a band shape with a small width, and the concave connection portions are formed in the inner circumferential edge of the band-shaped yoke core piece, bending processability of the band-shaped yoke core piece is greatly enhanced to be satisfactory. Accordingly, it is possible to form the laminated yoke body, which is formed by winding the band-shaped yoke core piece, in a circular shape.

By coupling the band-shaped yoke core piece wound and laminated in a spiral shape by the use of the caulking portions in a caulking manner and locally pressing the periphery of the caulking portions including the caulking portions, the thickness of the band-shaped yoke core piece is locally reduced. Accordingly, the shaping property at the time of winding the band-shaped yoke core piece is further enhanced and a laminated yoke body with a large coupling strength can be obtained in which a gap is not formed between the laminated band-shaped yoke core pieces.

Since the laminated magnetic body is formed by laminating a predetermined number of magnetic core pieces in a caulking manner, the laminated magnetic body is manufactured without departure between the laminated magnetic core pieces. Accordingly, the laminated stator core in which a predetermined number of laminated magnetic bodies are coupled to the laminated yoke body has very excellent shaping precision.

In addition, since the laminated magnetic body is formed independently of the laminated yoke body, the winding work of winding a coil on the laminated magnetic body becomes very easy. Accordingly, it is possible to wind a coil with a high density and an excellent proportion.

As a result, according to the fourth aspect of the present invention, it is possible to manufacture a laminated stator core excellent in shaping precision, mechanical strength, and electrical characteristic.

In the fifth aspect of the present invention, by locally pressing the area widened from the caulking portions toward the outer circumferential edge of the band-shaped yoke core piece, it is possible to easily wind the band-shaped yoke core piece. Accordingly, the shape of the laminated yoke body formed by winding the band-shaped yoke core piece becomes very good.

In the sixth aspect of the present invention, since the laminated yoke body constituting the yoke of the laminated stator core and the laminated magnetic body constituting a magnetic pole of the laminated stator core are independently formed, the band-shaped yoke core piece constituting the laminated yoke body has a band shape with a small width, and the concave connection portions are formed in the inner circumferential edge of the band-shaped yoke core piece, bending processability of the band-shaped yoke core piece is greatly enhanced to be satisfactory. Accordingly, it is possible to form the laminated yoke body, which is formed by winding the band-shaped yoke core piece, in a circular shape.

By arranging the arc-shaped caulking portions formed in the band-shaped yoke core piece in a plane shape curved in the winding direction, the caulking tongues of the arc-shaped caulking portions in an upper layer are inserted into the caulking grooves of the arc-shaped caulking portions in a lower layer so as to induce the winding of the band-shaped yoke core piece at the time of winding and laminating the band-shaped yoke core piece in a spiral shape. Accordingly, the shaping property of the band-shaped yoke core piece at the time of winding is enhanced and it is thus possible to form the laminated yoke body in a circular shape.

Since the laminated magnetic body is formed by laminating a predetermined number of magnetic core pieces in a caulking manner, the laminated magnetic body is manufactured without departure between the laminated magnetic core pieces. Accordingly, the laminated stator core in which a predetermined number of laminated magnetic bodies are coupled to the laminated yoke body has very excellent shaping precision.

In addition, since the laminated magnetic body is formed independently of the laminated yoke body, the winding work of winding a coil on the laminated magnetic body becomes very easy. Accordingly, it is possible to wind a coil with a high density and an excellent proportion.

As a result, according to the sixth aspect of the present invention, it is possible to manufacture a laminated stator core excellent in shaping precision and electrical characteristic.

In the seventh aspect of the present invention, since the outer laminated yoke body constituting the outer yoke of the laminated stator core and the inner yoke-attachment laminated magnetic sub-body constituting the inner yoke and a magnetic pole of the laminated stator core are independently formed, and the band-shaped yoke core sub-piece constituting the outer laminated yoke body has a band shape with a small width, the bending processability of the band-shaped yoke core sub-piece is greatly enhanced to be satisfactory. Accordingly, it is possible to form the outer laminated yoke body, which is formed by winding the band-shaped yoke core sub-piece, in a circular shape.

Since the inner yoke-attachment laminated magnetic sub-body is formed by laminating a predetermined number of inner yoke-attachment magnetic core sub-pieces in a caulking manner, the inner yoke-attachment laminated magnetic sub-body is manufactured without departure between the laminated inner yoke-attachment magnetic core sub-pieces. Accordingly, the laminated stator core in which a predetermined number of inner yoke-attachment laminated magnetic sub-bodies are coupled to the outer laminated yoke body has very excellent shaping precision.

Since the outer laminated yoke body and the inner yoke-attachment laminated magnetic sub-body are strongly and satisfactorily coupled to each other by means of shrink-fitting, the shaping precision of the laminated stator core is very excellent.

Since the band-shaped yoke core sub-piece constituting the outer laminated yoke body and the inner yoke-attachment laminated magnetic core sub-piece constituting the inner yoke-attachment laminated magnetic sub-body are independently blanked, it is possible to form the band-shaped yoke core sub-piece and the inner yoke-attachment magnetic core sub-piece with an excellent material yield.

In addition, since the inner yoke-attachment laminated magnetic sub-body is formed independently of the outer laminated yoke body, the winding work of winding a coil on the inner yoke-attachment laminated magnetic sub-body becomes very easy. Accordingly, it is possible to wind a coil with a high density and an excellent proportion.

As a result, according to the seventh aspect of the present invention, it is possible to manufacture a laminated stator core excellent in material yield, shaping precision and electrical characteristic.

In the eighth aspect of the present invention, since the outer laminated yoke body constituting the outer yoke of the laminated stator core and the inner yoke-attachment laminated magnetic sub-body constituting the inner yoke and a magnetic pole of the laminated stator core are independently formed, the band-shaped yoke core sub-piece constituting the outer laminated yoke body has a band shape with a small width, and the concave connection portions are formed in the inner circumferential edge of the band-shaped yoke core sub-piece, the bending processability of the band-shaped yoke core sub-piece is greatly enhanced to be satisfactory. Accordingly, it is possible to form the outer laminated yoke body, which is formed by winding the band-shaped yoke core sub-piece, in a circular shape.

Since the inner yoke-attachment laminated magnetic sub-body is formed by laminating a predetermined number of inner yoke-attachment magnetic core sub-pieces in a caulking manner, the inner yoke-attachment laminated magnetic sub-body is manufactured without departure between the laminated inner yoke-attachment magnetic core sub-pieces. Accordingly, the laminated stator core in which a predetermined number of inner yoke-attachment laminated magnetic sub-bodies are coupled to the outer laminated yoke body has very excellent shaping precision.

Since the outer laminated yoke body and the inner yoke-attachment laminated magnetic sub-body are strongly and satisfactorily coupled to each other by inserting the convex connection portions of the inner yoke-attachment laminated magnetic sub-bodies into the concave connection portions of the outer laminated yoke body, the shaping precision of the laminated stator core is very excellent.

Since the band-shaped yoke core sub-piece constituting the outer laminated yoke body and the inner yoke-attachment laminated magnetic core sub-piece constituting the inner yoke-attachment laminated magnetic sub-body are independently blanked, it is possible to form the band-shaped yoke core sub-piece and the inner yoke-attachment magnetic core sub-piece with an excellent material yield.

In addition, since the inner yoke-attachment laminated magnetic sub-body is formed independently of the outer laminated yoke body, the winding work of winding a coil on the inner yoke-attachment laminated magnetic sub-body becomes very easy. Accordingly, it is possible to wind a coil with a high density and an excellent proportion.

As a result, according to the eighth aspect of the present invention, it is possible to manufacture a laminated stator core excellent in material yield, shaping precision and electrical characteristic.

In the ninth aspect of the present invention, since the outer laminated yoke body constituting the outer yoke of the laminated stator core and the inner yoke-attachment laminated magnetic sub-body constituting the inner yoke and a magnetic pole of the laminated stator core are independently formed, the band-shaped yoke core sub-piece constituting the outer laminated yoke body has a band shape with a small width, and the concave connection portions are formed in the inner circumferential edge of the band-shaped yoke core sub-piece, the bending processability of the band-shaped yoke core sub-piece is greatly enhanced to be satisfactory. Accordingly, it is possible to form the outer laminated yoke body, which is formed by winding the band-shaped yoke core sub-piece, in a circular shape.

Since the inner yoke-attachment laminated magnetic sub-body is formed by laminating a predetermined number of inner yoke-attachment magnetic core sub-pieces in a caulking manner, the inner yoke-attachment laminated magnetic sub-body is manufactured without departure between the laminated inner yoke-attachment magnetic core sub-pieces. Accordingly, the laminated stator core in which a predetermined number of inner yoke-attachment laminated magnetic sub-bodies are coupled to the outer laminated yoke body has very excellent shaping precision.

Since the outer laminated yoke body and the inner yoke-attachment laminated magnetic sub-body are strongly and satisfactorily coupled to each other by inserting the convex connection portions of the inner yoke-attachment laminated magnetic sub-bodies into the concave connection portions of the outer laminated yoke body, the shaping precision of the laminated stator core is very excellent.

Since the outer laminated yoke body and the inner yoke-attachment laminated magnetic sub-body are strongly and satisfactorily coupled to each other by shrink-fitting the outer laminated yoke body to the outer circumference of the intermediate assembly to insert the convex connection portions into the concave connection portions, the shaping precision of the laminated stator core is very excellent.

Since the band-shaped yoke core sub-piece constituting the outer laminated yoke body and the inner yoke-attachment laminated magnetic core sub-piece constituting the inner yoke-attachment laminated magnetic sub-body are independently blanked, it is possible to form the band-shaped yoke core sub-piece and the inner yoke-attachment magnetic core sub-piece with an excellent material yield.

In addition, since the inner yoke-attachment laminated magnetic sub-body is formed independently of the outer laminated yoke body, the winding work of winding a coil on the inner yoke-attachment laminated magnetic sub-body becomes very easy. Accordingly, it is possible to wind a coil with a high density and an excellent proportion.

As a result, according to the ninth aspect of the present invention, it is possible to manufacture a laminated stator core excellent in material yield, shaping precision, and electrical characteristic.

In the tenth aspect of the present invention, when winding the band-shaped core piece in a spiral shape, the inner circumferential edge is bent without a surface compression by forming the cut portions with a predetermined pitch, the bending processability of the outer circumferential edge is enhanced by locally pressing the outer circumferential edge of the band-shaped core piece to roll the band-shaped core piece, and the bending processability of an intermediate portion in the width direction is enhanced by forming the magnet fitting holes. Accordingly, it is possible to wind the band-shaped core piece in a circular shape and thus to manufacture a laminated rotor core excellent in shaping precision.

In the tenth aspect of the present invention, since the laminated rotor core is manufactured by winding and laminating the band-shaped core piece in a spiral shape, it is possible to greatly enhance the productivity of the laminated rotor core, in comparison with the conventional manufacturing method in which a rotor core formed by winding a band-shaped plate in a circular shape is laminated sheet by sheet.

In addition, since the shaft hole of the laminated rotor core formed by winding the band-shaped core piece has a circular shape by forming the inner circumferential edge between the cut portions in the band-shaped core piece in an arc shape corresponding to the inner circumference of the shaft hole, a re-grinding process is not necessary. Accordingly, it is possible to greatly improve the productivity of the laminated rotor core.

As a result, according to the tenth aspect of the present invention, it is possible to manufacture a laminated rotor core with saved energy, high power, high efficiency, excellent shaping precision, and high productivity.

In the eleventh aspect of the present invention, when winding the band-shaped core piece in a spiral shape, the inner circumferential edge is bent without a surface compression by forming the cut portions with a predetermined pitch, the bending processability of the outer circumferential edge is enhanced by locally pressing the outer circumferential edge of the band-shaped core piece to roll the band-shaped core piece, and the bending processability of an intermediate portion in the width direction is enhanced by forming the diecast metal filling holes. Accordingly, it is possible to wind the band-shaped core piece in a circular shape and thus to manufacture a laminated rotor core excellent in shaping precision.

In the eleventh aspect of the present invention, since the laminated rotor core is manufactured by winding and laminating the band-shaped core piece in a spiral shape, it is possible to greatly enhance the productivity of the laminated rotor core, in comparison with the conventional manufacturing method in which a rotor core formed by winding a band-shaped plate in a circular shape is laminated sheet by sheet.

In addition, since the shaft hole of the laminated rotor core formed by winding the band-shaped core piece has a circular shape by forming the inner circumferential edge between the cut portions in the band-shaped core piece in an arc shape corresponding to the inner circumference of the shaft hole, a re-grinding process is not necessary. Accordingly, it is possible to greatly improve the productivity of the laminated rotor core.

As a result, according to the eleventh aspect of the present invention, it is possible to manufacture a laminated rotor core with saved energy, high power, high efficiency, excellent shaping precision, and high productivity.

BRIEF DESCRIPTION OF THE DRAWINGS

FIGS. 10A and 10B are conceptual diagrams illustrating a procedure of manufacturing a laminated yoke body in a laminated stator core manufactured by the use of a second method according to the present invention.

FIG. 15 is a partial plan view illustrating a caulking portion and a pressing portion of the laminated yoke body.

FIG. 35 is a conceptual diagram illustrating a procedure of manufacturing the laminated stator core shown in FIG. 29.

FIG. 36 is a conceptual diagram illustrating a procedure of manufacturing the laminated stator core shown in FIG. 29.

REFERENCE NUMERALS

Figure 1A:
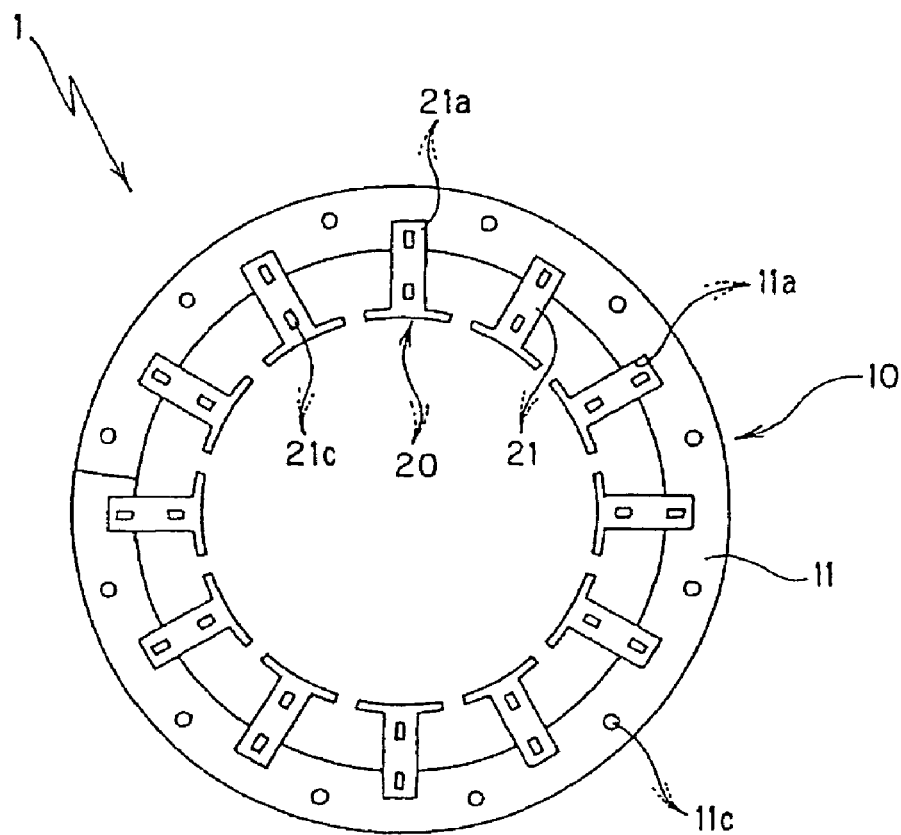
FIGS. 1A and 1B are an entire plan view and an entire side view illustrating a laminated stator core manufactured by the use of a method according to an embodiment of the present invention, respectively.
Figure 1B:

1: LAMINATED STATOR CORE
10: LAMINATED YOKE BODY
11: BAND-SHAPED YOKE CORE PIECE
11*i*: INNER CIRCUMFERENTIAL EDGE
11*a*: CONCAVE CONNECTION PORTION
11*c*: CAULKING PORTION
10': LAMINATED YOKE BODY
11': BAND-SHAPED YOKE CORE PIECE
11*i*': INNER CIRCUMFERENTIAL EDGE
11*a*': CONCAVE CONNECTION PORTION
11*o*': INNER CIRCUMFERENTIAL EDGE
11*p*': THIN PORTION
11*c*': CAULKING PORTION
20: LAMINATED MAGNETIC BODY
21: MAGNETIC CORE PIECE
21*a*: CONVEX CONNECTION PORTION
21*c*: CAULKING PORTION
21': MAGNETIC CORE PIECE
21*a*': CONVEX CONNECTION PORTION
21*c*': CAULKING PORTION
21*t*': TAPERED PORTION
21": MAGNETIC CORE PIECE
21*a*": CONVEX CONNECTION PORTION
21*c*": CAULKING PORTION
21*p*": MINUTE PROTRUSION
L: WINDING
W: BAND-SHAPED STEEL PLATE (METAL PLATE)

BEST MODE FOR CARRYING OUT THE INVENTION

Hereinafter, the present invention will be described in detail with reference to the drawings illustrating embodiments thereof.

First Embodiment

FIGS. 1 to 7 illustrate a method of manufacturing a laminated stator core according to the present invention. The laminated stator core 1 manufactured according to the present invention includes a laminated yoke body 10 having a band shape and a predetermined number of laminated magnetic bodies 20, 20, . . . (twelve in the first embodiment) coupled to the inner circumferential edge of the laminated yoke body 10.

As described later, the laminated yoke body 10 is constructed by winding and laminating a band-shaped yoke core piece 11, which is formed by punching a band-shaped steel plate (metal plate), in a spiral shape and coupling the laminated band-shaped steel plate in a caulking manner (caulking lamination). A predetermined number of concave connection portions 11*a*, 11*a*, . . . (twelve in the first embodiment) are formed in the inner circumferential edge of the laminated yoke body 10. Reference numeral 11*c* in the figures denotes a caulking portion formed in the band-shaped yoke core piece 11.

On the other hand, the laminated magnetic body 20 is constructed by laminating a predetermined number of magnetic core pieces 21, 21, . . . , which is formed by punching a band-shaped steel plate (metal plate), and coupling them to each other in a caulking manner (caulking lamination) as described later. A convex connection portion 21*a* engaging with the concave connection portion 11a of the laminated yoke body 10 is formed at a base end of each laminated magnetic body 20. Reference numeral 21c in the figures denotes a caulking portion formed in the respective magnetic core pieces 21, 21, . . . .

By inserting the convex connection portions 21a of the laminated magnetic bodies 20 into the concave connection portions 11a, 11a, . . . of the laminated yoke body 10 and coupling the laminated yoke body 10 and the laminated magnetic bodies 20, 20, . . . to each other, the laminated stator core 1 having a predetermined shape is manufactured in which a predetermined number of laminated magnetic bodies 20, 20, . . . are protruded in the inner radius direction of the laminated yoke body 10.

A method of manufacturing the laminated stator core according to the present invention is now described in detail by exemplifying a procedure of manufacturing the laminated stator core 1.

Figure 3A:
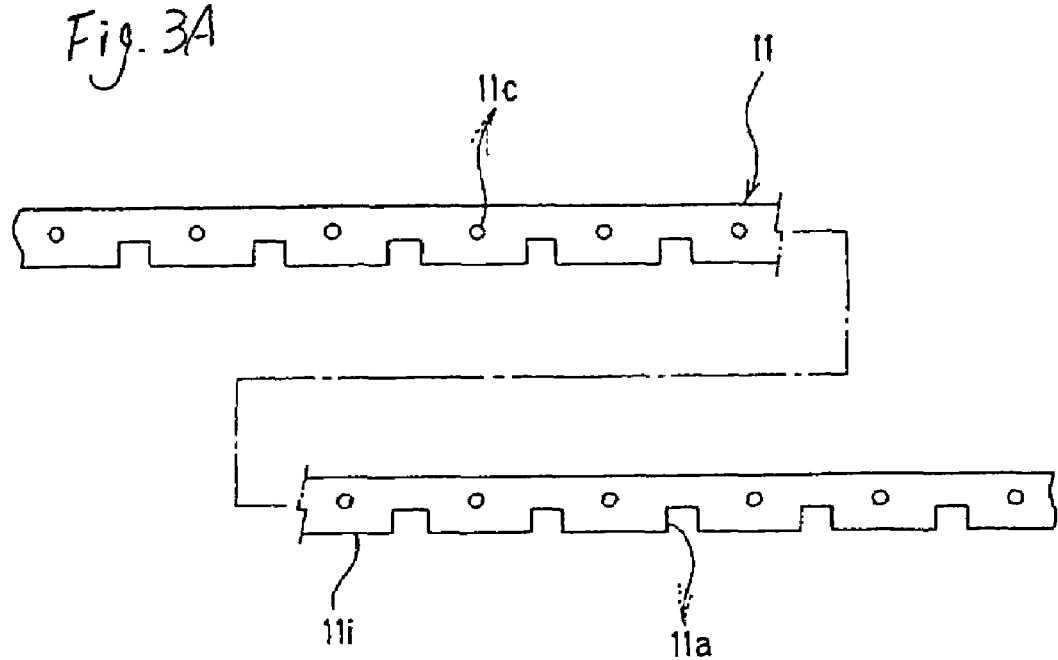
FIGS. 3A and 3B are conceptual diagrams illustrating a procedure of manufacturing a laminated yoke body in the laminated stator core shown in FIG. 1.

First, as shown in FIG. 3A, the band-shaped yoke core pieces 11 are formed by punching an electromagnetic steel plate (metal plate) not shown.

The band-shaped yoke core pieces 11 have a shape that the yoke of the laminated stator core 1 is developed in a straight line, specifically, a band shape straightly extending and having a small width. Caulking portions 11c, 11c, . . . are arranged with a predetermined pitch at the central area thereof.

Concave connection portions 11a, 11a, . . . are arranged with a predetermined pitch at the inner circumferential edge 11i of the band-shaped yoke core pieces 11, that is, at a portion constituting the inner circumferential surface of the laminated yoke body 10 (see FIG. 2) when the band-shaped yoke core piece 11 is wound in the subsequent process.

Here, the pitch of the concave connection portions 11a, 11a, . . . is set so that the concave connection portions 11a overlap with each other when the band-shaped yoke core piece 11 is wound and laminated in a spiral shape in the subsequent process. Similarly, the pitch of the caulking portions 11c, 1c, . . . is set so that the caulking portions 11c overlap with each other when the band-shaped yoke core piece 11 is wound and laminated in a spiral shape in the subsequent process.

After forming the band-shaped yoke core piece 11 by punching the electromagnetic steel plate (metal plate), the band-shaped yoke core piece 11 is taken into a manufacturing apparatus (not shown). Then, as shown in FIG. 3B, the laminated yoke body 10 (see FIG. 2B) is formed by winding and laminating the band-shaped yoke core piece 11 in a spiral shape and coupling the laminated band-shaped yoke core piece in a caulking manner.

Figure 2A:
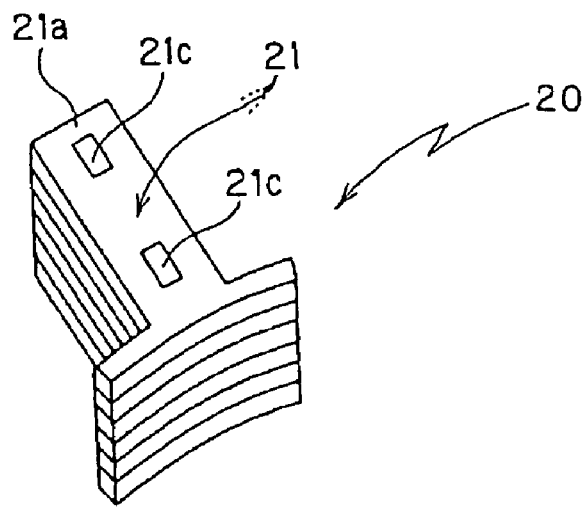
FIGS. 2A and 2B are perspective views illustrating a laminated magnetic body and a laminated yoke body constituting the laminated stator core shown in FIG. 1.
Figure 2B:
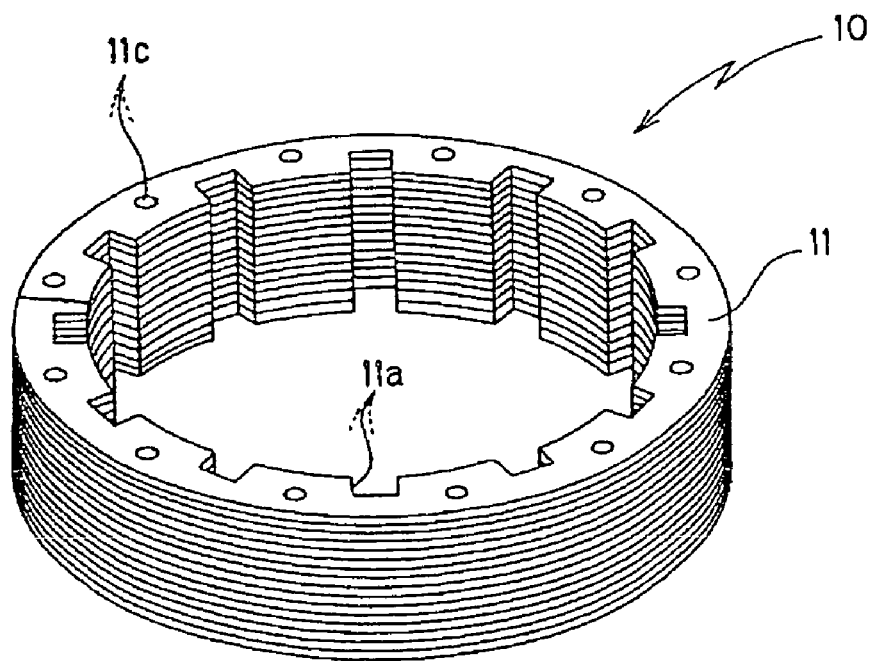
Figure 3B:
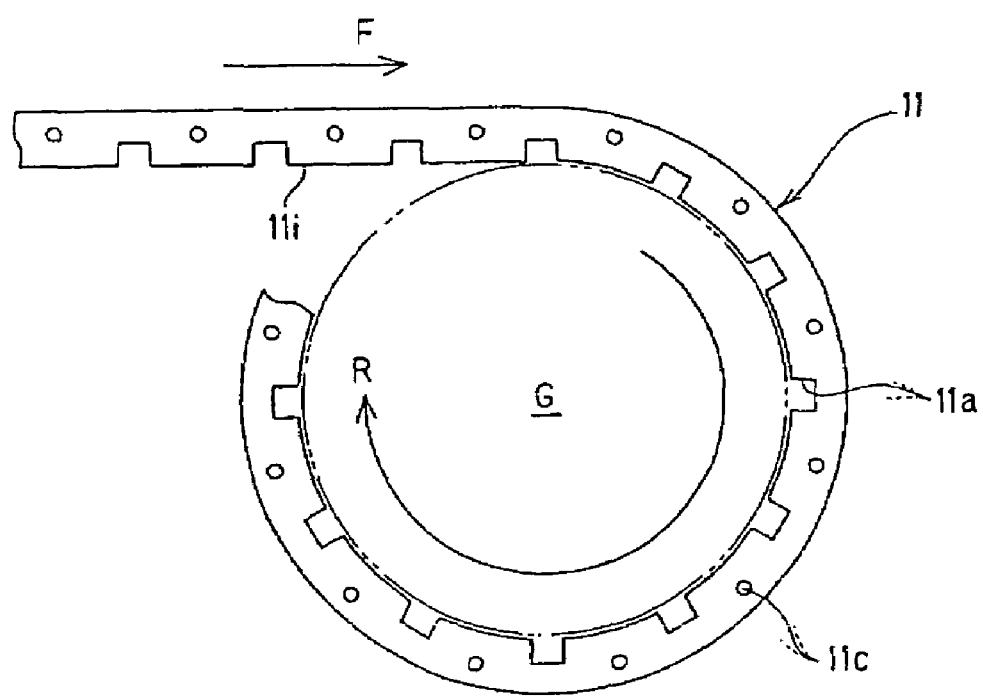

Specifically, the laminated yoke body 10 is manufactured, as shown in FIG. 2B, by suspending one end of the band-shaped yoke core piece 11 on a winding guide G of the manufacturing apparatus, winding the band-shaped yoke core piece 11 around the winding guide G rotating in the arrow direction R while taking the band-shaped yoke core piece 11 into the winding guide G as indicated by the arrow F, and coupling the band-shaped yoke core piece 11 laminated in a predetermined number of layers by the use of the caulking portions 11c, 11c, . . . in a caulking manner.

Here, since the band-shaped yoke core piece 11 constituting the laminated yoke body 10 has a band shape with a small width as described above and the concave connection portions 11a, 11a, . . . are formed in the inner circumferential edge 11i thereof, bending processability thereof is very excellent. Accordingly, it is possible to form the laminated yoke body 10, in which the band-shaped yoke core piece 11 is wound, in a circular shape.

Figure 4:
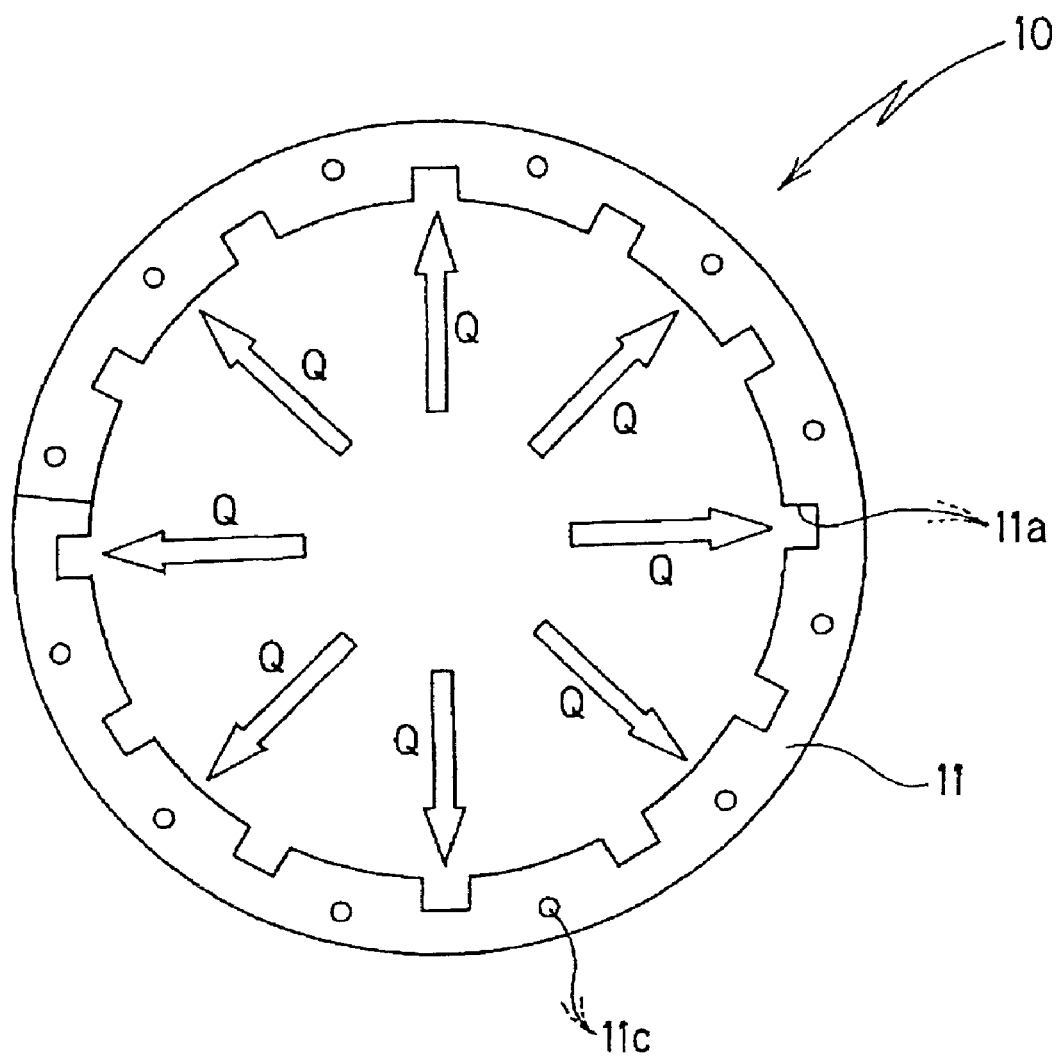
FIG. 4 is a conceptual diagram illustrating a procedure of manufacturing a laminated yoke body in the laminated stator core shown in FIG. 1.

After forming the laminated yoke body 10 (see FIG. 2B) with a manufacturing apparatus (not shown), the shape of the laminated yoke body 10 is corrected by inserting a correcting tool (not shown) into the central opening of the laminated yoke body 10 and applying a diameter enlarging force Q, Q, . . . to the laminate yoke body 10 from the inner circumference as shown in FIG. 4.

In this way, by correcting the shape, it is possible to improve the degree of circularity of the laminated yoke body 10 and thus to manufacture the laminated stator core 1 excellent in shaping precision.

Figure 5A:
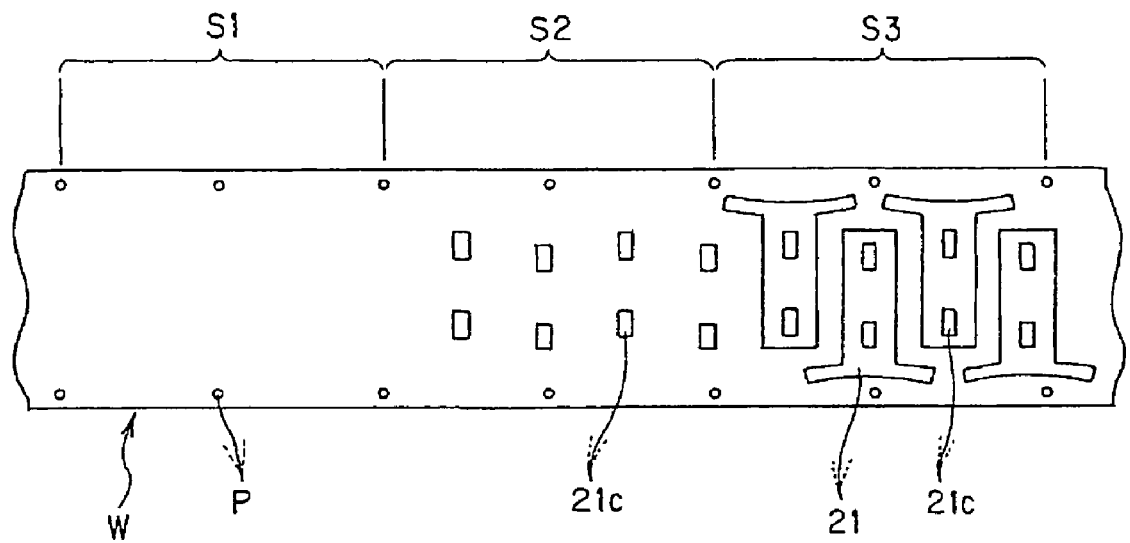
FIGS. 5A, 5B, and 5C are conceptual diagrams illustrating a procedure of manufacturing a laminated magnetic body in the laminated stator core shown in FIG. 1.
Figure 5B:
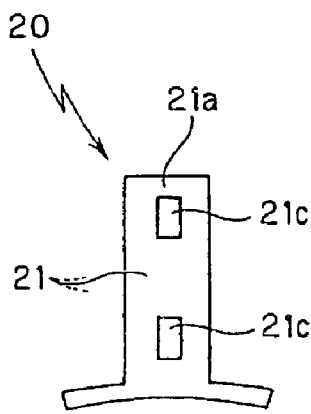

On the other hand, as shown in FIG. 5A, the laminated magnetic body 20 is formed out of an electromagnetic steel plate (metal plate) W by the use of machining stations S1 to S3 of a transfer press (not shown).

That is, pilot holes P are formed by the use of the machining station S1, caulking portions 21c are formed by the use of the machining station S2, and the laminated magnetic body 20 (see FIG. 5B) is manufactured by performing a blanking/caulking process to the magnetic core pieces 21 by the use of the machining station S3.

The procedure of manufacturing the laminated magnetic body 20 using the transfer press is not limited to the above-mentioned embodiment, but may be established properly.

Here, since each laminated magnetic body 20 is formed by laminating the magnetic core pieces 21, 21, . . . as described above, the laminated magnetic body is manufactured without departure between the laminated magnetic core pieces 21. Accordingly, the laminated stator core 1 in which the laminated magnetic bodies 20 are coupled to the laminated yoke body 10 has excellent shaping precision.

Since the laminated magnetic bodies 20 are formed independently of the laminated yoke body 10, the yield of forming the magnetic core pieces 21, 21, . . . out of an electromagnetic steel plate (metal plate) W is enhanced. Therefore, it is possible to prevent increase in manufacturing cost.

Figure 5C:
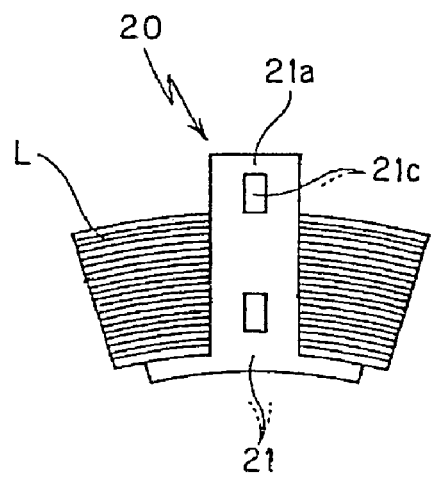
Figure 6A:
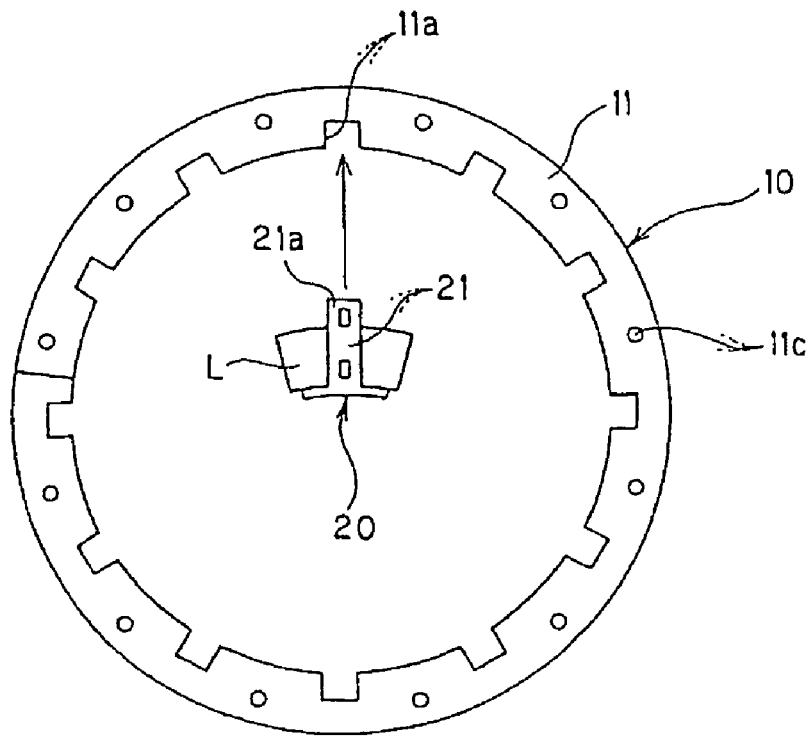
FIGS. 6A and 6B are conceptual diagrams illustrating a procedure of manufacturing the laminated stator core shown in FIG. 1.
Figure 6B:
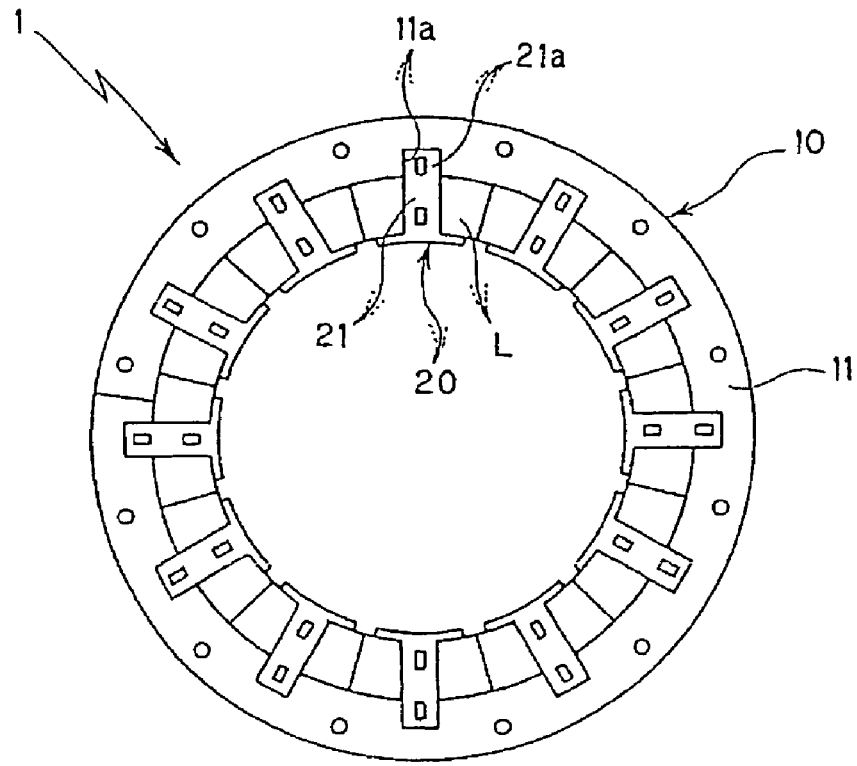

After manufacturing the laminated magnetic bodies 20 as described above, coils L are wound around the laminated magnetic bodies 20 by the use of a specific apparatus (not shown) as shown in FIG. 5C. As well as directly winding the coils L around the laminated magnetic bodies 20, a bobbin (not shown) on which the coils L are wound may be mounted on the laminated magnetic bodies 20 in an additional process.

Here, since the laminated magnetic bodies 20 are separated from the laminated yoke body 10 at the time of winding the coils L around the laminated magnetic bodies 20, the winding work of the coils L around the laminated magnetic bodies 20 is very easy. Accordingly, it is possible to wind the coils L with a high density and an excellent proportion.

After winding coils L around the predetermined number of laminated magnetic bodies 20, the laminated magnetic bodies 20 are coupled and fixed to the laminated yoke body 10 by inserting the convex connection portions 21a of the laminated magnetic bodies 20 into the concave connection portions 10a of the laminated yoke body 10 in the axial direction of the laminated yoke body 10.

As described above, by inserting the convex connection portions 21a of the laminated magnetic bodies 20 into the concave connection portions 11a of the laminated yoke body 10 and coupling and fixing the laminated yoke body 10 and the laminated magnetic bodies 20 to each other, the laminated stator core 1 having a predetermined shape is manufactured and a stator of an electric motor is completed in which the coils L are wound around the laminated magnetic bodies 20, 20, ... of the laminated stator core 1.

Figure 7A:
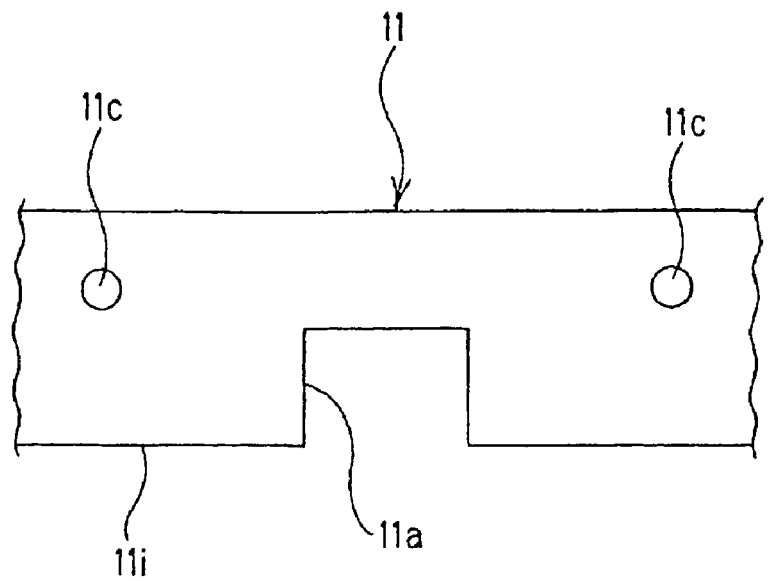
FIGS. 7A and 7B are partial plan views illustrating modifications of a concave connection portion in the laminated yoke body.
Figure 7B:
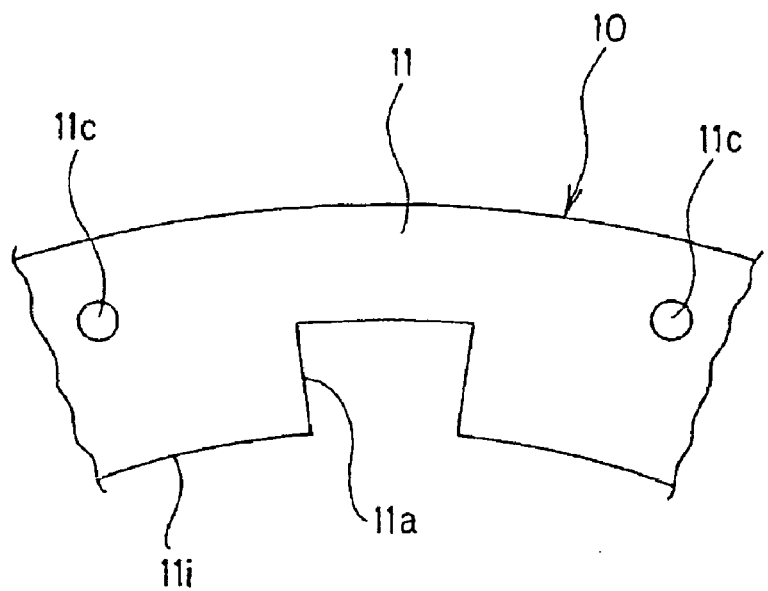

The concave connection portion 11*a* of the laminate yoke body 10 has a rectangular shape as shown in FIG. 7A before winding the band-shaped yoke core piece 11. However, since the width of the opening is decreased toward the inner circumference as shown in FIG. 7B after winding the band-shaped yoke core piece 11 and forming the laminated yoke body 10, the convex connection portion 21*a* of the laminated magnetic body 20 is tightly inserted into the concave connection portion 11*a*. Accordingly, the laminated yoke body 10 and the laminated magnetic body 20 are strongly coupled to each other.

As described above, by the use of the method of manufacturing a laminated stator core according to the first embodiment, it is possible to manufacture a laminated stator core excellent in shaping precision and electrical characteristic.

Figure 8A:
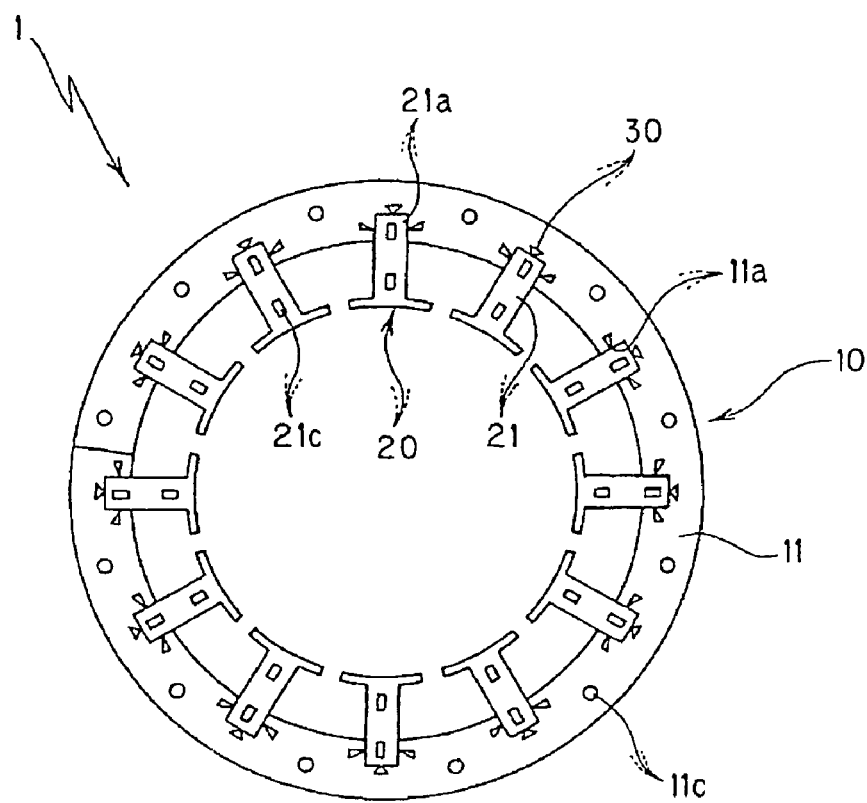
FIGS. 8A and 8B are an entire plan view and an entire side view illustrating a laminated stator core manufactured by the use of a method according to another embodiment of the present invention, respectively.
Figure 8B:

FIG. 8 shows another example of a laminated stator core manufactured by the use of the method according to the present invention. In the laminated stator core 1, the laminated magnetic body 20 is connected to the laminated yoke body 10 by inserting the convex connection portion 21*a* of the laminated magnetic body 20 into the concave connection portion 11*a* of the laminated yoke body 10 and fixing engagement portions 30, 30, ... are formed around the concave connection portion 11*a* by pressing.

The fixing engagement portions 30 formed by pressing minutely deform the periphery of the concave connection portion 11*a* to tighten the corresponding convex connection portion 21*a* of the laminated magnetic body 20. Accordingly, the laminated yoke body 10 and the laminated magnetic body 20 are strongly connected to each other.

Here, the structure of the laminated stator core 1 described above is similar to that of the laminated stator core 1 shown in FIGS. 1 to 7, except that the fixing engagement portions 30, 30, ... are formed by pressing around the concave connection portion 11*a*. In FIG. 8, the coil L (see FIG. 6) wound on each laminated magnetic body 20 is omitted.

According to the above-mentioned method of manufacturing a laminated stator core, it is possible to manufacture a laminated stator core 1 with largely enhanced the coupling strength between the laminated yoke body 10 and the laminated magnetic body 20 by forming the fixing engagement portions 30, 30, ... around the concave connection portion 11*a*.

The portions in which the fixing engagement portions 30, 30, ... are formed by pressing is not limited to the periphery of the concave connection portion 11*a* as described above, but the fixing engagement portions may be formed by pressing in the circumferential edge of the convex connection portion 21*a* of the laminated magnetic body 20 or in both of the periphery of the concave connection portion 11*a* and the circumferential edge of the convex connection portion 21*a*.

Figure 9A:
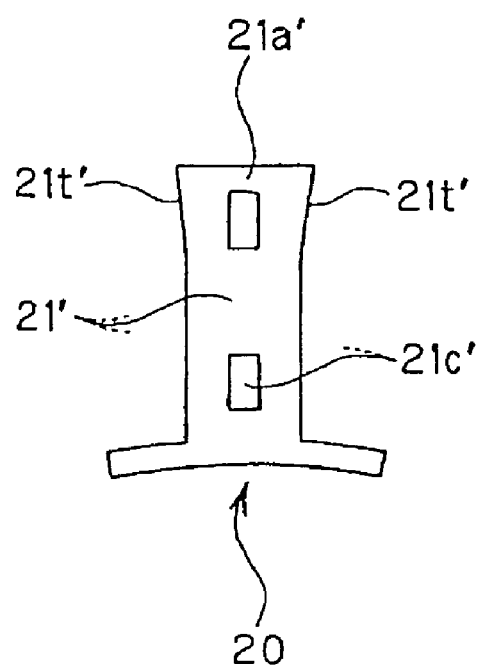
FIGS. 9A and 9B are entire plan views illustrating a laminated magnetic body of the laminated stator core manufactured according to another embodiment of the present invention.
Figure 9B:
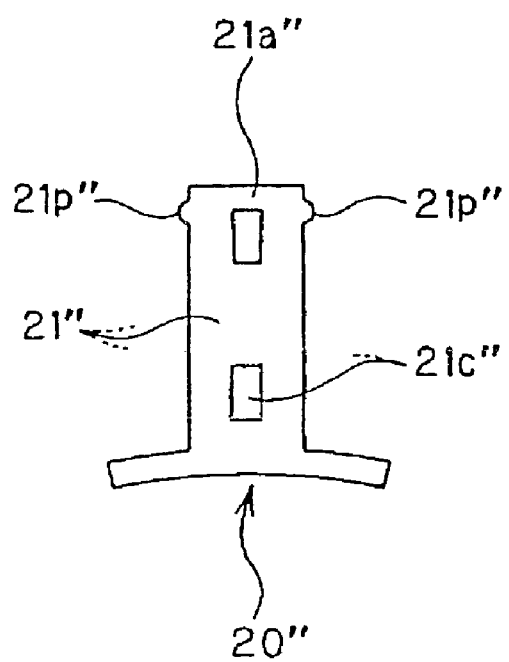

FIG. 9 shows other examples of the laminated stator core manufactured according to the first embodiment. In the laminated magnetic body 20' shown in FIG. 9A, tapered portions 21*t*', 21*t*' are formed on the lateral surfaces of the convex connection portion 21*a*' and thus the convex connection portion 21*a*' has a tapered (reversely tapered) shape widened toward the end. In the laminated magnetic body 20" shown in FIG. 9B, minute protrusions 21*p*", 21*p*", ... are formed on the lateral surfaces of the convex connection portion 21*a*".

The laminated magnetic body 20' is strongly connected to the laminated yoke body 10 by inserting the convex connection portion 21*a*' of the laminated magnetic body 20' into the concave connection portion 1*a* of the laminated yoke body 10. Similarly, the laminated magnetic body 20" is strongly connected to the laminated yoke body 10 by inserting the convex connection portion 21*a*" of the laminated magnetic body 20" into the concave connection portion 11*a* of the laminated yoke body 10.

Second Embodiment

Figure 11A:
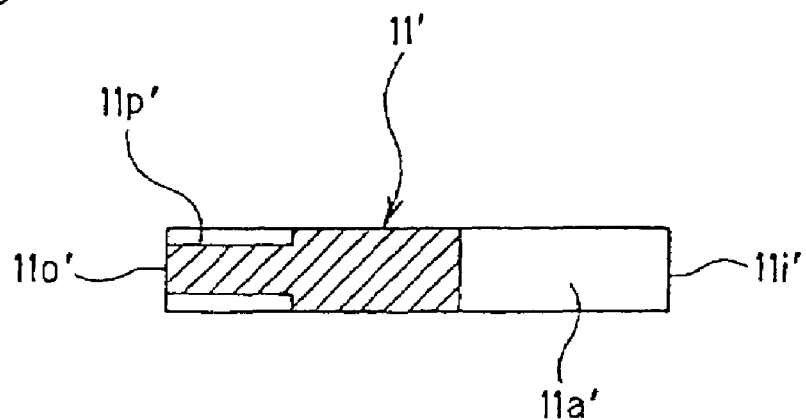
FIGS. 11A and 11B are a cross-sectional view taken along Line XI-XI of FIG. 10 and an entire plan view illustrating the laminated yoke body.

FIGS. 10 and 11 show a method of manufacturing a laminated stator core according to a second embodiment of the present invention.

The method according to the second embodiment is basically similar to the method according to the first embodiment described with reference to FIGS. 1 to 9, except that the details of the processes of forming a laminated yoke body 10' are different as described later. The laminated stator core manufactured according to the first embodiment is basically similar to the laminated stator core 1 shown in FIGS. 1 to 9, except that a partial shape of the laminated yoke body 10' is different.

In the method of manufacturing a laminated stator core according to the second embodiment, first, as shown in FIG. 10A, a band-shaped yoke core piece 11' is formed by punching an electromagnetic steel plate (metal plate) not shown.

The band-shaped yoke core piece 11' has a shape that the yoke of the laminated stator core as a complete product is developed in a straight line, that is, a band shape extending straightly with a small width. Caulking portions 11*c*', 11*c*', ... are arranged in the central area thereof.

The concave connection portions 11*a*', 11*a*', ... are arranged with a predetermined pitch in the inner circumferential edge 11*i*' of the band-shaped yoke core piece 11', that is, in the portions constituting the inner circumferential surface of the laminated yoke body 10' (see FIG. 11B) when the band-shaped yoke core piece 11' is wound in the subsequent process. The shape of the band-shaped yoke core piece 11' is similar to that of the band-shaped yoke core piece 11 described with reference to FIG. 1.

After forming the band-shaped yoke core piece 11' by punching the electromagnetic steel plate (metal plate), the band-shaped yoke core piece 11' is taken into a manufacturing apparatus (not shown). Then, as shown in FIG. 10B, the laminated yoke body 10' (see FIG. 11B) is formed by locally pressing the outer circumferential edge 10*o*' of the band-shaped yoke core piece 11' to roll the band-shaped yoke core piece in a longitudinal direction, winding and laminating the band-shaped yoke core piece 11' in a spiral shape, and coupling the laminated band-shaped yoke core piece in a caulking manner.

Specifically, the band-shaped yoke core piece 11' is bent by suspending one end of the band-shaped yoke core piece 11' on a winding guide G of the manufacturing apparatus and winding the band-shaped yoke core piece 11' on the winding guide G rotating in the arrow direction R while taking the band-shaped yoke core piece 11' into the winding guide G in the arrow direction F.

At this time, before bending the band-shaped yoke core piece 11' by winding the band-shaped yoke core piece on the winding guide Q the outer circumferential edge 11*o*' is locally pressed to roll the band-shaped yoke core piece by forming by pressing thin portions 11*p*' in the outer circumferential edge 11*o*' of the band-shaped yoke core piece 11', as shown in FIG. 10B. The thin portions 11*p*' are formed with a predetermined pitch in the outer circumferential edge 11*o*' with movement of the band-shaped yoke core piece 11'.

Figure 11B:
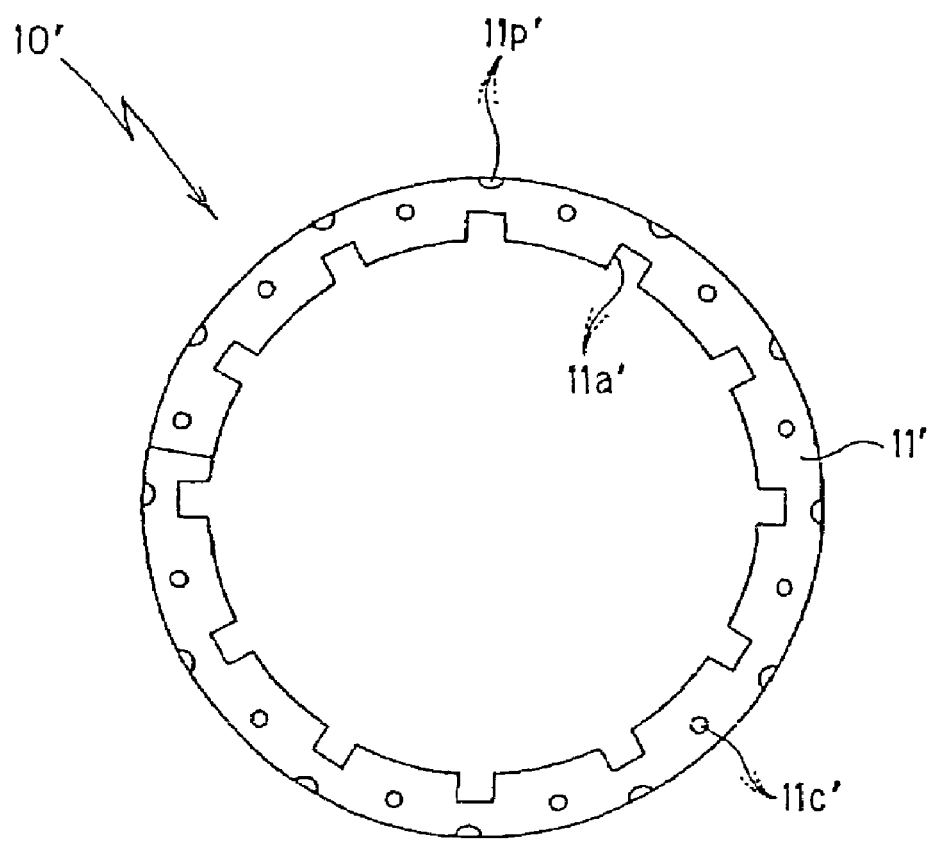
Figure 12A:
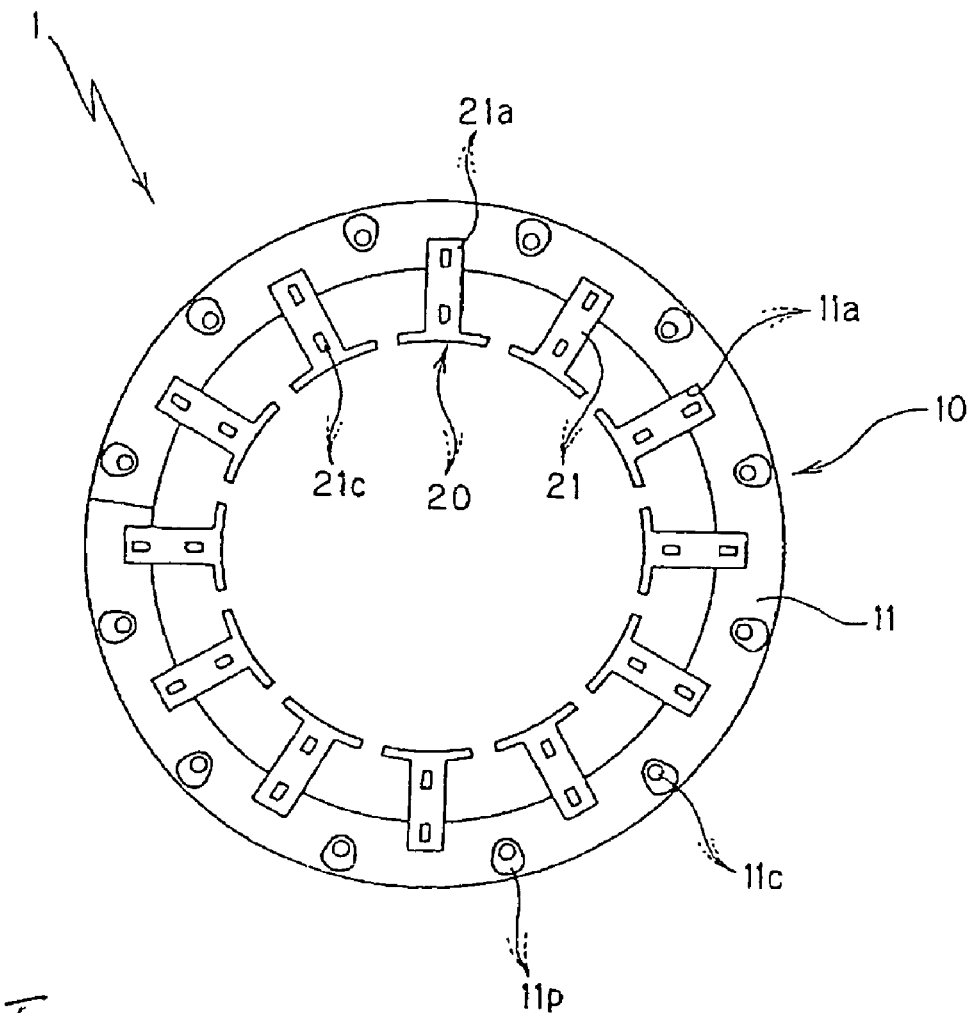
FIGS. 12A and 12B are an entire plan view and an entire side view illustrating a laminated stator cores manufactured by the use of a method according to an embodiment of the present invention.
Figure 12B:

As described above, after forming the thin portions 11*p*' in the outer circumferential edge 11*o*' of the band-shaped yoke core piece 11', the laminated yoke body 10' having a predetermined shape is manufactured as shown in FIG. 11B by winding the band-shaped yoke core piece 11' on the winding guide G rotating and coupling the band-shaped yoke core piece 11' laminated in a predetermined number of layers by the caulking portions 11c', 11c', . . . in a caulking manner.

Here, since the band-shaped yoke core piece 11' constituting the laminated yoke body 10' has a band shape with a small width as described above and the concave connection portions 11a', 11a', . . . are formed in the inner circumferential edge 11i' thereof, bending processability thereof is very excellent. Accordingly, it is possible to form the laminated yoke body 10', in which the band-shaped yoke core piece 11' is wound, in a circular shape.

By locally pressing the outer circumferential edge 11o' of the band-shaped yoke core piece 11' to roll the band-shaped yoke core piece in a longitudinal direction before winding the band-shaped yoke core piece 11' in a spiral shape, it is possible to easily wind the band-shaped yoke core piece 11' 10'. Accordingly, the degree of circularity of the laminated yoke body formed by winding the band-shaped yoke core piece 11' is enhanced and thus the shaping precision of the laminated yoke body 10' is enhanced.

Since the thin portions 11p' formed by local pressing exist not continuously but locally (intermittently), the appearance of the laminated stator core is not deteriorated. In addition, since dust or the like does not invade the laminated stator core, it is possible to elongate a lifetime the laminated stator core.

Similarly to the method of manufacturing a laminated stator core according to the first embodiment, by connecting a laminated magnetic body (not shown) formed separately to the laminated yoke body 10' formed as described above, the laminated stator core having a predetermined shape is manufactured.

In this way, by the use of the method of manufacturing a laminated stator core according to the second embodiment, it is possible to manufacture a laminated stator core excellent in shaping precision and electrical characteristic, similarly to the method of manufacturing a laminated stator core according to the first embodiment.

In the above-mentioned embodiments, the laminated stator core including the laminated yoke body having a ring shape and the twelve laminated magnetic bodies is exemplified. However, the present invention is not limited to the manufacturing the above-mentioned laminated stator core, but may apply effectively to methods of manufacturing laminated stator cores having various structures.

Third Embodiment

FIGS. 12 to 17 show a method of manufacturing a laminated stator core according to a third embodiment of the present invention. The laminated stator core 1 manufactured according to the third embodiment includes a laminated yoke body 10 having a ring shape and a predetermined number (twelve in the third embodiment) of laminated magnetic bodies 20, 20, . . . coupled to the inner circumference of the laminate yoke body 10.

The laminated yoke body 10 is constructed by winding and laminating the band-shaped yoke core piece 11, which is formed by punching a band-shaped steel plate (metal plate), in a spiral shape and coupling them in a caulking manner (caulking lamination) as described later. A predetermined number (twelve in the third embodiment) of concave connection portions 11a, 11a, . . . are formed in the inner circumferential edge of the laminated yoke body 10. Reference Numeral 11c in the figures denotes the caulking portions formed in the band-shaped yoke core piece 11.

On the other hand, the laminated body 20 is constructed as described later by laminating a predetermined number of magnetic core pieces 21, 21, . . . formed by punching a band-shaped steel plate (metal plate) and coupling the laminated magnetic core pieces to each other in a caulking manner. Convex connection portions 21a engaging with the concave connection portions 11a of the laminated yoke body 10 are formed in the base ends. Reference numeral 21c in the figure denotes caulking portions formed in the magnetic core pieces 21, 21, . . . .

By inserting the convex connection portions 21a of the laminated magnetic bodies 20 into the concave connection portions 11a, 11a, . . . of the laminated yoke body 10 and coupling the laminated yoke body 10 and the laminated magnetic bodies 20, 20, . . . to each other, the laminated stator core 1 having a predetermined shape is manufactured in which a predetermined number of laminated magnetic bodies 20, 20, . . . are protruded in the inner radius direction of the laminated yoke body 10.

Now, a method of manufacturing a laminated stator core according to the present invention will be described in detail by exemplifying a procedure of manufacturing the laminated stator core 1.

Figure 14A:
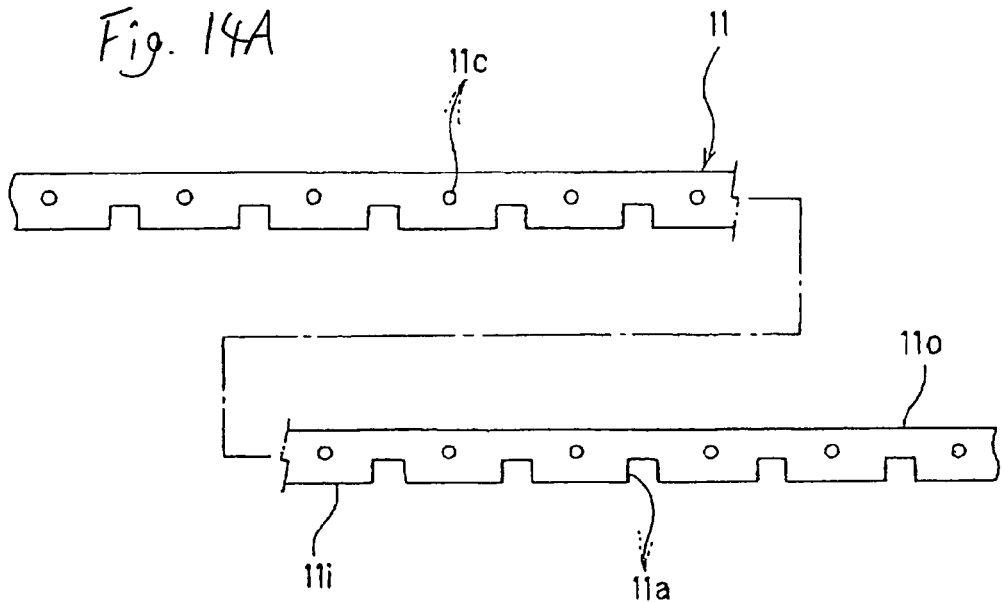
FIGS. 14A, 14B and 14C are conceptual diagrams illustrating a procedure of manufacturing a laminated yoke body in the laminated stator core shown in FIG. 12.

First, as shown in FIG. 14A, the band-shaped yoke core piece 11 is formed by punching an electromagnetic steel plate (metal plate) not shown.

The band-shaped yoke core piece 11 has a shape that the yoke of the laminated stator core 1 is developed in a straight line, that is, a band shape extending straightly with a small width. The caulking portions 11c, 11c, . . . are arranged with a predetermined pitch at the central area thereof.

Concave connection portions 11a, 11a, . . . are arranged with a predetermined pitch in the inner circumference edge 11i of the band-shaped yoke core piece 11, that is, in the portions constituting the inner circumferential surface of the laminated yoke body 10 (see FIG. 13) when the band-shaped yoke core piece 11 is wound in the subsequent process.

Here, the pitch of the concave connection portions 11a, 11a, . . . is set so that the concave connection portions 11a are overlapped with each other when the band-shaped yoke core piece 11 is wound in a spiral shape in the subsequent process. Similarly, the pitch of the caulking portions 11c, 11c, . . . is set so that the caulking portions 11c are overlapped with each other when the band-shaped yoke core piece 11 is wound in a spiral shape in the subsequent process.

After forming the band-shaped yoke core piece 11 by punching the electromagnetic steel plate (metal plate), the band-shaped yoke core piece 11 is taken into a manufacturing apparatus (not shown). Then, as shown in FIG. 14B, the laminated yoke body 10 (see FIG. 13B) is formed by winding and laminating the band-shaped yoke core piece 11 in a spiral shape and coupling the laminated band-shaped yoke core piece in a caulking manner.

Figure 13A:
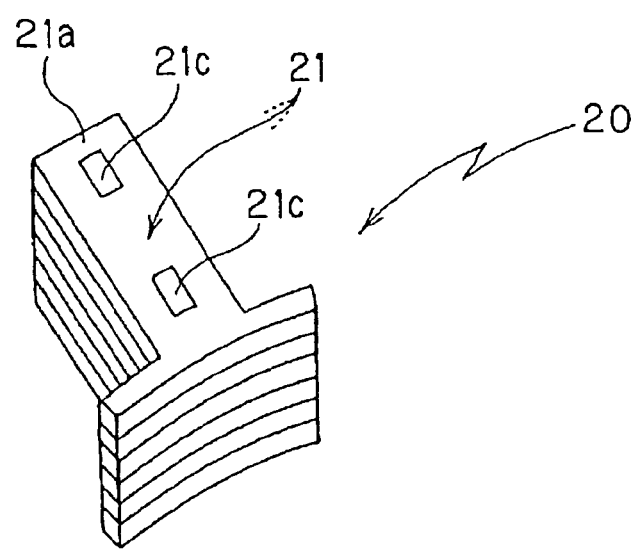
FIGS. 13A and 13B are perspective views illustrating a laminated magnetic body and a laminated yoke body constituting the laminated stator core shown in FIG. 12.
Figure 13B:
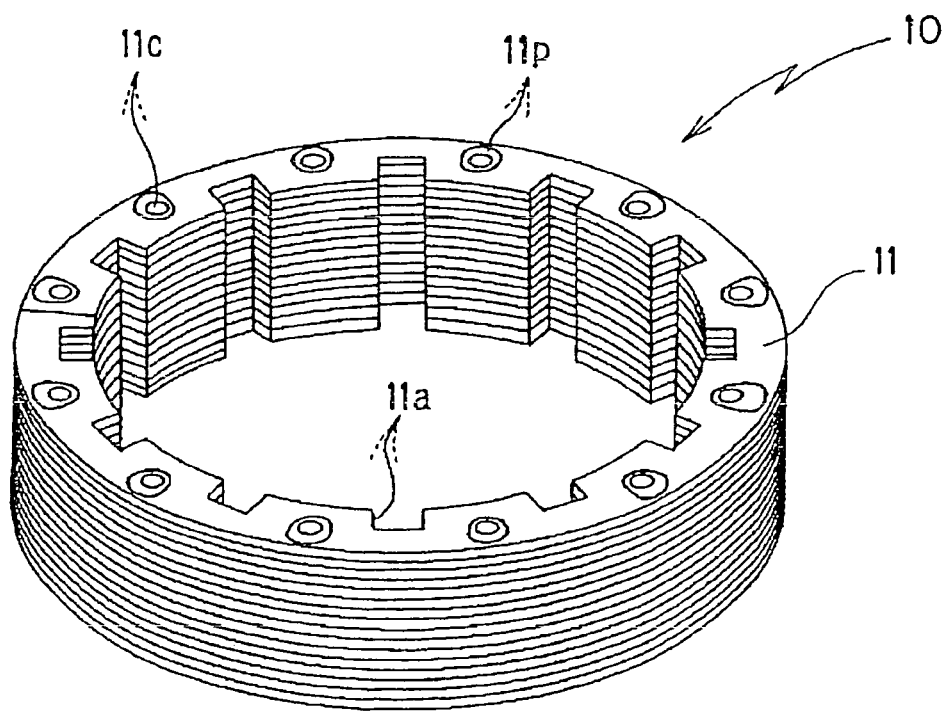
Figure 14B:
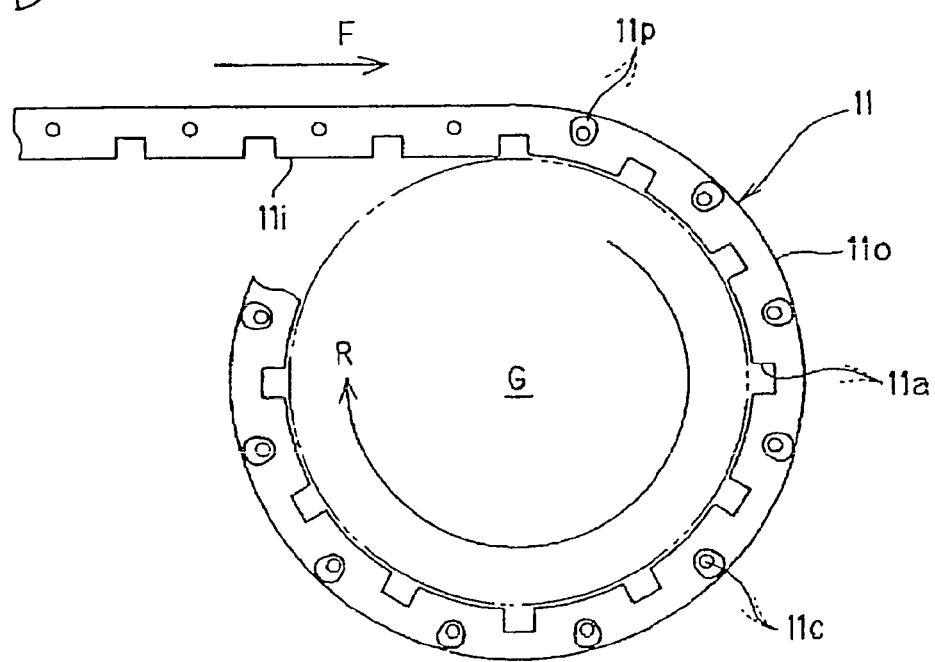

Specifically, the laminated yoke body 10 having a predetermined shape is manufactured, as shown in FIG. 13B, by suspending one end of the band-shaped yoke core piece 11 on a winding guide G of the manufacturing apparatus, winding the band-shaped yoke core piece 11 around the winding guide G rotating in the arrow direction R while taking the band-shaped yoke core piece 11 into the winding guide G in the arrow direction F, coupling the laminated band-shaped yoke core piece 11 by the use of the caulking portions 11c, 11c, . . . in a caulking manner, and locally pressing the periphery of the caulking portions 11c including the caulking portions 11c. The laminated yoke body can be also manufactured by coupling the laminated band-shaped yoke core piece 11 by the use of the caulking portions 11c, 11c, . . . in a caulking manner and locally pressing the caulking portions 11c.

Here, since the band-shaped yoke core piece 11 constituting the laminated yoke body 10 has a band shape with a small width as described above and the concave connection portions 11a, 11a, . . . are formed in the inner circumferential edge 111 thereof, bending processability thereof is very excellent. Accordingly, it is possible to form the laminated yoke body 10, in which the band-shaped yoke core piece 11 is wound, in a circular shape.

Figure 14C:
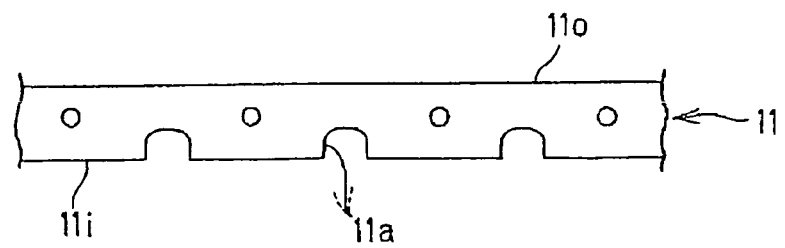

In the third embodiment, the inner portion of the concave connection portion 11a is formed in a substantially rectangular shape. However, for example, as shown in FIG. 14C, by forming the inner edge in a curved line and connecting the inner edge and the lateral edges with a curved line to form the inner edges of the concave connection portion 11a into a continuous round shape, it is possible to further enhance the bending processability (winding formability).

When coupling the band-shaped yoke core piece 11 in a caulking manner, as shown in FIGS. 14 and 15, the laminated band-shaped yoke core piece 11 comes in close contact with each other by forming pressed portions 11p in the peripheries of the caulking portions including the caulking portions 11c through the local pressing, thereby preventing generation of a gap. Accordingly, the laminated yoke body 10 having a large coupling strength is obtained. In addition, by locally pressing the caulking portions 11c, the laminated yoke body having a large coupling strength can be obtained as described above.

As shown in FIGS. 14 and 15, since the pressed portions 11p are formed by press in the area widened from the caulking portions 11c toward the outer circumferential edge 10 of the band-shaped yoke core piece 11, it is possible to easily wind the band-shaped yoke core piece 11 by stretching the area outside the caulking portions 11c in the band-shaped yoke core piece 11. Accordingly, the degree of circularity of the laminated yoke body 10 formed by winding the band-shaped yoke core piece 11 is enhanced and the shaping precision of the laminated yoke body 10 is very excellent.

Figure 16A:
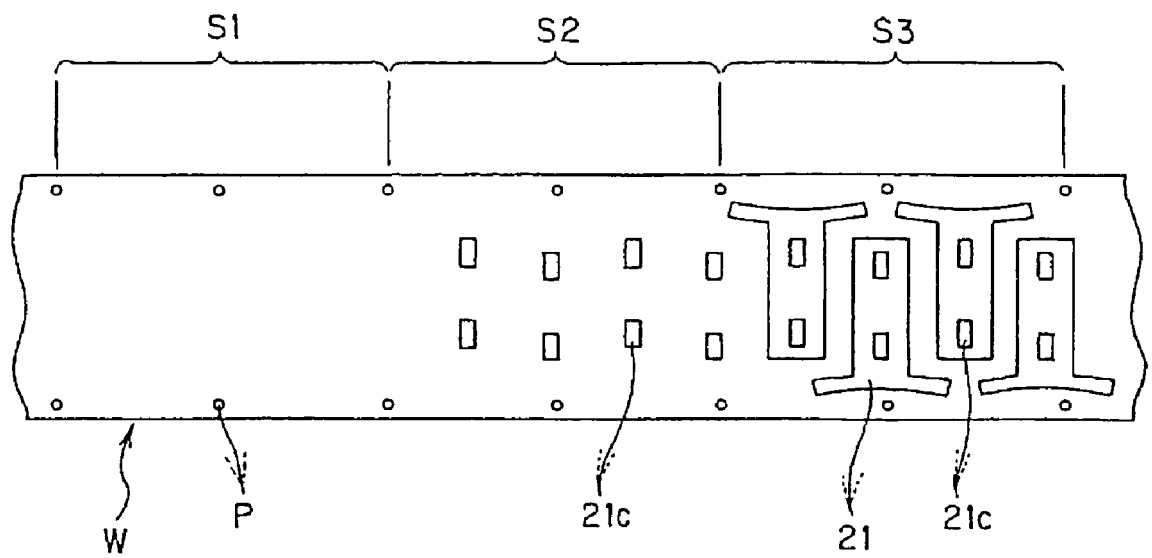
FIGS. 16A, 16B, and 16C are conceptual diagrams illustrating a procedure of manufacturing a laminated magnetic body in the laminated stator core shown in FIG. 12.
Figure 16B:
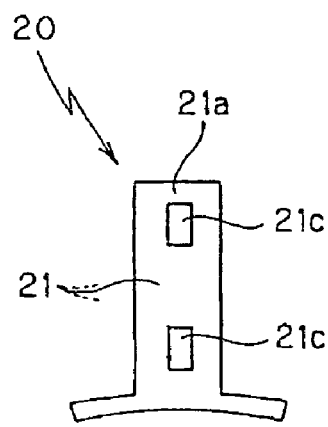

On the other hand, as shown in FIG. 16A, the laminated magnetic body 20 is formed out of an electromagnetic steel plate (metal plate) W by the use of machining stations S1 to S3 of a transfer press (not shown).

That is, pilot holes P are formed by the use of the machining station S1, caulking portions 21c are formed by the use of the machining station S2, and the laminated magnetic body 20 (see FIG. 16B) is manufactured by performing a blanking/caulking process to the magnetic core pieces 21 by the use of the machining station S3.

The procedure of manufacturing the laminated magnetic body 20 by the use of the transfer press is not limited to the above-mentioned embodiment, but may be established properly.

Here, since each laminated magnetic body 20 is formed by laminating a predetermined number of magnetic core pieces 21, 21, . . . in a caulking manner as described above, the laminated magnetic body is manufactured without departure between the laminated magnetic core pieces 21. Accordingly, the laminated stator core 1 in which the laminated magnetic bodies 20 are coupled to the laminated yoke body 10 has very excellent shaping precision.

Since the laminated magnetic bodies 20 are formed independently of the laminated yoke body 10, the yield of forming the magnetic core pieces 21, 21, . . . out of an electromagnetic steel plate (metal plate) W is enhanced. Therefore, it is possible to prevent increase in manufacturing cost.

Figure 16C:
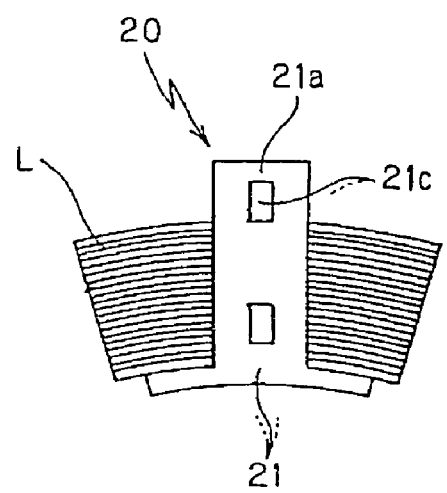
Figure 17A:
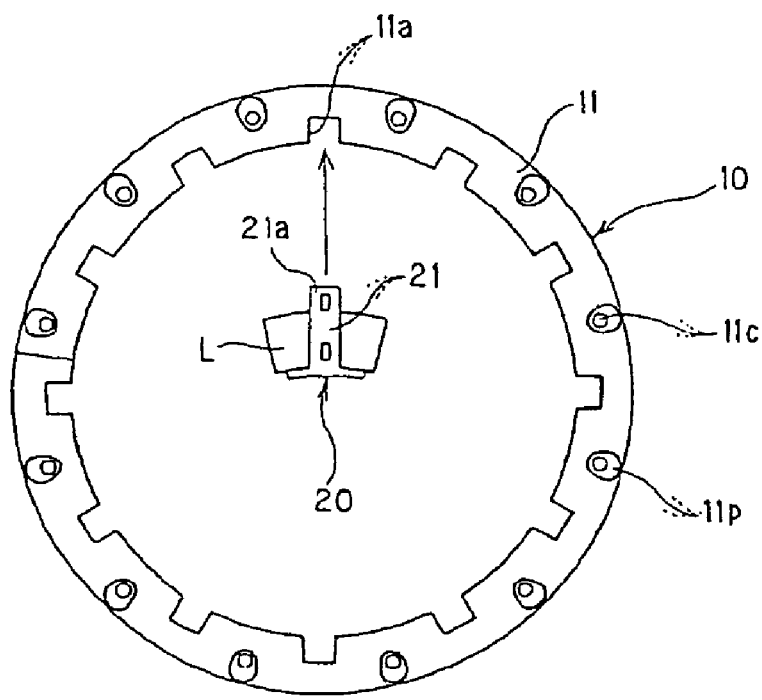
FIGS. 17A and 17B are conceptual diagrams illustrating a procedure of manufacturing the laminated stator core shown in FIG. 12.
Figure 17B:
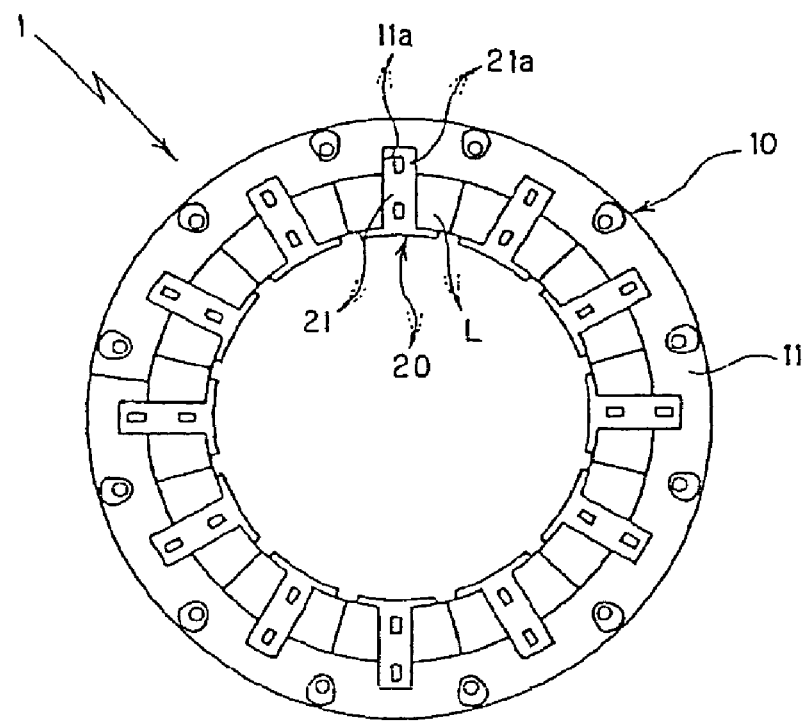

After manufacturing the laminated magnetic bodies 20 as described above, coils L are wound around the laminated magnetic bodies 20 by the use of a specific apparatus (not shown) as shown in FIG. 16C. As well as directly winding the coils L around the laminated magnetic bodies 20, a bobbin (not shown) on which the coils L are wound may be mounted on the laminated magnetic bodies 20 in an additional process.

Here, since the laminated magnetic bodies 20 are separated from the laminated yoke body 10 at the time of winding the coils L on the laminated magnetic bodies 20, the winding work of the coils L on the laminated magnetic bodies 20 is very easy. Accordingly, it is possible to wind the coils L with a high density and an excellent proportion.

After completing the winding of the coils L on a predetermined number of laminated magnetic bodies 20, the laminated magnetic bodies 20 are coupled to the laminated core body 10 by inserting the convex connection portions 21a of the laminated magnetic bodies 20 into the concave connection portions 10a of the laminated yoke body 10 along the diameter direction of the laminated yoke body 10.

As described above, by inserting the convex connection portions 21a of the laminated magnetic bodies 20 into the concave connection portions 11a of the laminated yoke body 10 and coupling the laminated yoke body 10 and the laminated magnetic bodies 20 to each other, the laminated stator core 1 having a predetermined shape is manufactured and a stator of an electric motor is completed in which the coils L are wound on the laminated magnetic bodies 20, 20, . . . of the laminated stator core 1.

As described above, by the use of the method of manufacturing a laminated stator core according to the present invention, it is possible to manufacture a laminated stator core 1 excellent in shaping precision, mechanical strength, and electrical characteristic.

In the above-mentioned embodiment, the laminated stator core including the laminated yoke body having a ring shape and the twelve laminated magnetic bodies is exemplified. However, the present invention is not limited to the manufacturing the above-mentioned laminated stator core, but may apply effectively to methods of manufacturing laminated stator cores having various structures.

Fourth Embodiment

FIGS. 18 to 24 show a method of manufacturing a laminated stator core according to a fourth embodiment of the present invention. The laminated stator core 1 manufactured according to the fourth embodiment includes a laminated yoke body 10 having a ring shape and a predetermined number (twelve in the third embodiment) of laminated magnetic bodies 20, 20, . . . coupled to the inner circumference of the laminate yoke body 10.

The laminated yoke body 10 is constructed by winding and laminating the band-shaped yoke core piece 11, which is formed by punching a band-shaped steel plate (metal plate), in a spiral shape and coupling them in a caulking manner (caulking lamination) as described later. A predetermined number (twelve in the third embodiment) of concave connection portions 11a, 11a, . . . are formed in the inner circumferential edge of the laminated yoke body 10.

Arc-shaped caulking portions 11c, 11c, . . . having a structure to be described in detail later are formed in the band-shaped yoke core piece 11 and the laminated band-shaped yoke core piece 11 is coupled by the use of the arc-shaped caulking portions 11c in a caulking manner.

On the other hand, the laminated magnetic body 20 is formed by laminating a predetermined number of magnetic core pieces 21, 21, . . . , which are formed by punching a band-shaped steel plate (metal plate) as described later, and coupling the laminated magnetic core pieces to each other in a caulking manner. Convex connection portions 21a engaging with the concave connection portions 11a of the laminated yoke body 10 are formed in the base end of the respective laminated magnetic bodies 20. Reference numeral 21c in the figures denotes the caulking portions formed in the respective magnetic core pieces 21, 21, . . . .

The magnetic core pieces 21, 21, . . . constituting the laminated magnetic body 20 are made of a material having a iron loss lower than that of the band-shaped yoke core piece 11 constituting the laminated yoke body 10, specifically, a material such as a thin electromagnetic steel plate and a thin amorphous metal plate having an iron loss lower than the iron loss of the electromagnetic steel plate when the band-shaped yoke core piece 11 is made of the electromagnetic steel plate.

By inserting the convex connection portions 21a of the laminated magnetic bodies 20 into the concave connection portions 11a, 11a, . . . of the laminated yoke body 10 and coupling the laminated yoke body 10 and the laminated magnetic bodies 20, 20, . . . to each other, the laminated stator core 1 having a predetermined shape is manufactured in which a predetermined number of laminated magnetic bodies 20, 20, . . . are protruded in the inner radius direction of the laminated yoke body 10.

A method of manufacturing the laminated stator core according to the present invention will be now described in detail by exemplifying a procedure of manufacturing the laminated stator core 1.

Figure 21A:
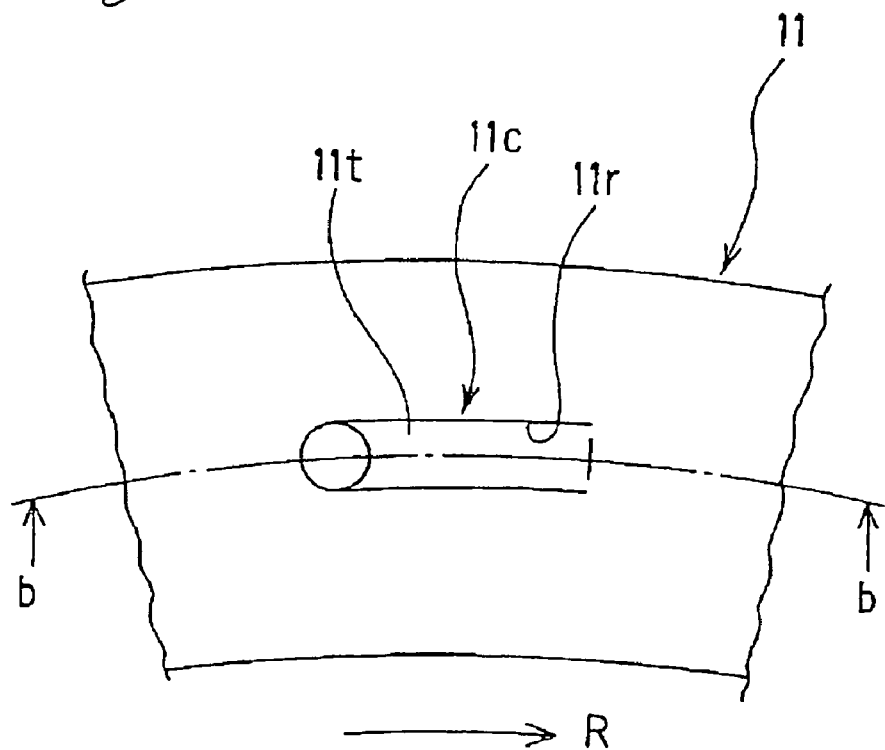
FIGS. 21A and 21B are a partial plan view and a partial cross-sectional view illustrating an arc-shaped caulking portion of a band-shaped yoke core piece.

First, as shown in FIG. 21A, the band-shaped yoke core pieces 11 are formed by punching a band-shaped steel plate (metal plate) not shown.

The band-shaped yoke core pieces 11 have a shape that the yoke of the laminated stator core 1 is developed in a straight line, that is, a band shape extending straightly with a small width. Concave connection portions 11a, 11a, . . . are arranged with a predetermined pitch in the inner circumferential edge 11i, that is, in a portion constituting the inner circumference of the laminated yoke body 10 (see FIG. 19) when the band-shaped yoke core pieces 11 are wound in the subsequent process.

The pitch of the concave connection portions 11a, 11a, . . . is set so that the concave connection portions 11a are overlapped with each other when the band-shaped yoke core pieces 11 are wound and laminated in a spiral shape in the subsequent process.

Arc-shaped caulking portions 11c, 11c, . . . are arranged with a predetermined pitch in the central area in the width direction of the band-shaped yoke core pieces 11.

Figure 21B:
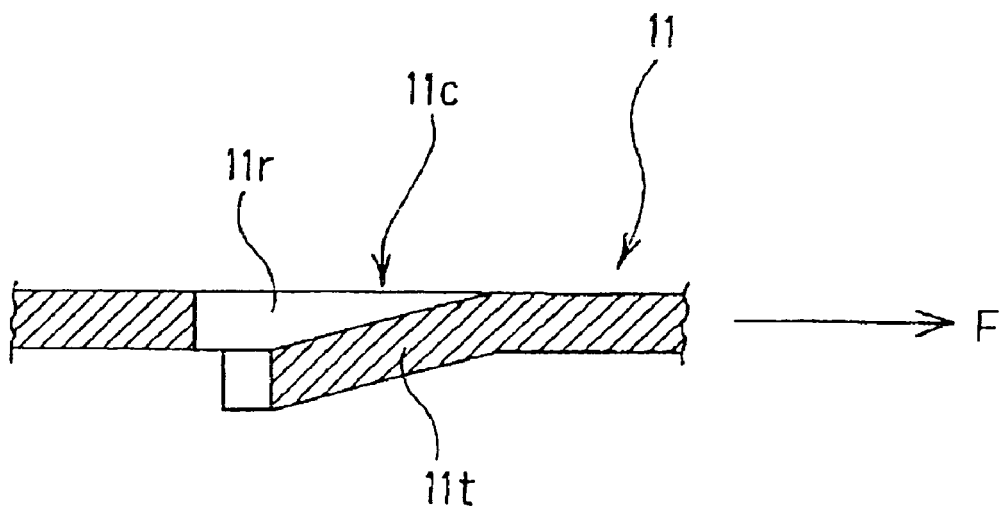

As shown in FIG. 21, each arc-shaped caulking portion 11c has a caulking tongue 11t protruded downwardly by means of a half blanking and a caulking groove 11r formed at the back side of the caulking tongue 11t.

Figure 18A:
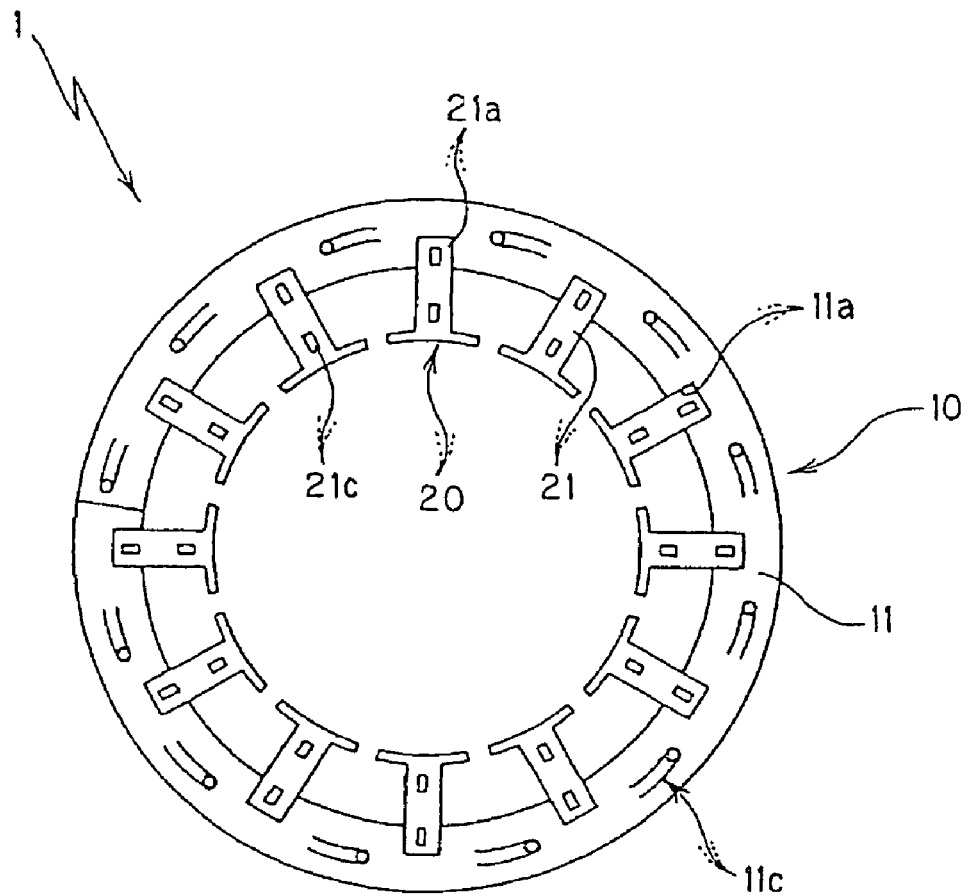
FIGS. 18A and 18B are an entire plan view and an entire side view illustrating a laminated stator core manufactured by the use of another method according to the present invention.
Figure 18B:
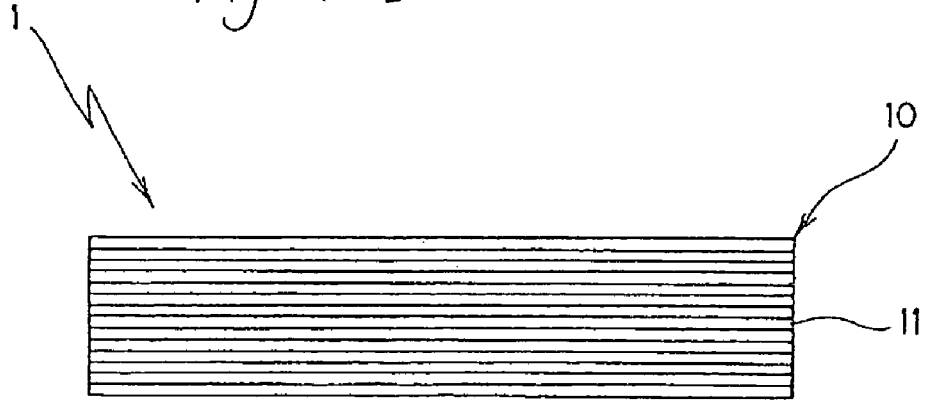
Figure 19A:
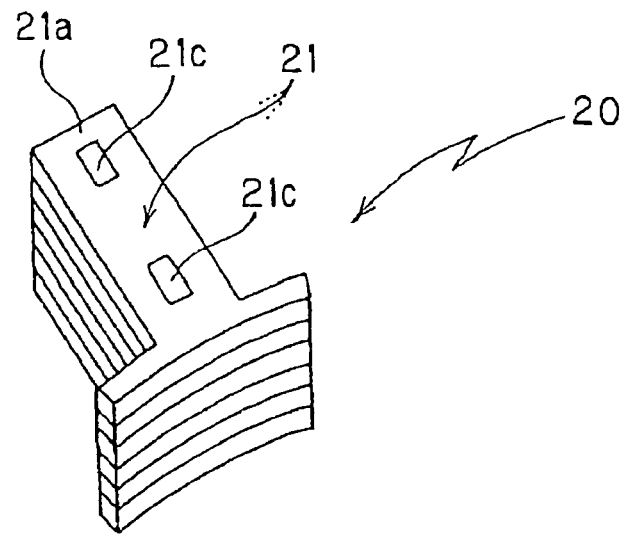
FIGS. 19A and 19B are perspective views illustrating appearances of a laminated magnetic body and a laminated yoke body constituting the laminated stator core shown in FIG. 18.

The arc-shaped caulking portions 11c (including the caulking tongue 11t and the caulking groove 11r) have a plane shape curved in the winding direction (arrow direction R), that is, in the direction in which the band-shaped yoke core pieces 11 are wound in the subsequent process, more specifically, in the circumference direction in which the arc-shaped caulking portions 11c, 11c, . . . are arranged in the completed laminated yoke body 10 (see FIGS. 18 and 19).

As shown in FIG. 21, in the arc-shaped caulking portions 11c, caulking tongues 11t are downwardly tilted in the direction opposite to the winding direction (arrow direction F) when the band-shaped yoke core piece 11 is wound in the subsequent process.

Here, the pitch of the arc-shaped caulking portions 11c, 11c, . . . is set so that the arc-shaped caulking portions 11c are overlapped with each other when the band-shaped yoke core piece 11 is wound in a spiral shape in the subsequent process.

After forming the band-shaped yoke core piece 11 by punching the band-shaped steel plate (metal plate), the band-shaped yoke core piece 11 is taken into a manufacturing apparatus (not shown). Then, as shown in FIG. 20B, the laminated yoke body 10 having a predetermined shape (see FIG. 19B) is formed by winding and laminating the band-shaped yoke core piece 11 in a spiral shape and coupling the laminated band-shaped yoke core piece by the use of the arc-shaped caulking portions 11c, 11c, . . . in a caulking manner.

Figure 19B:
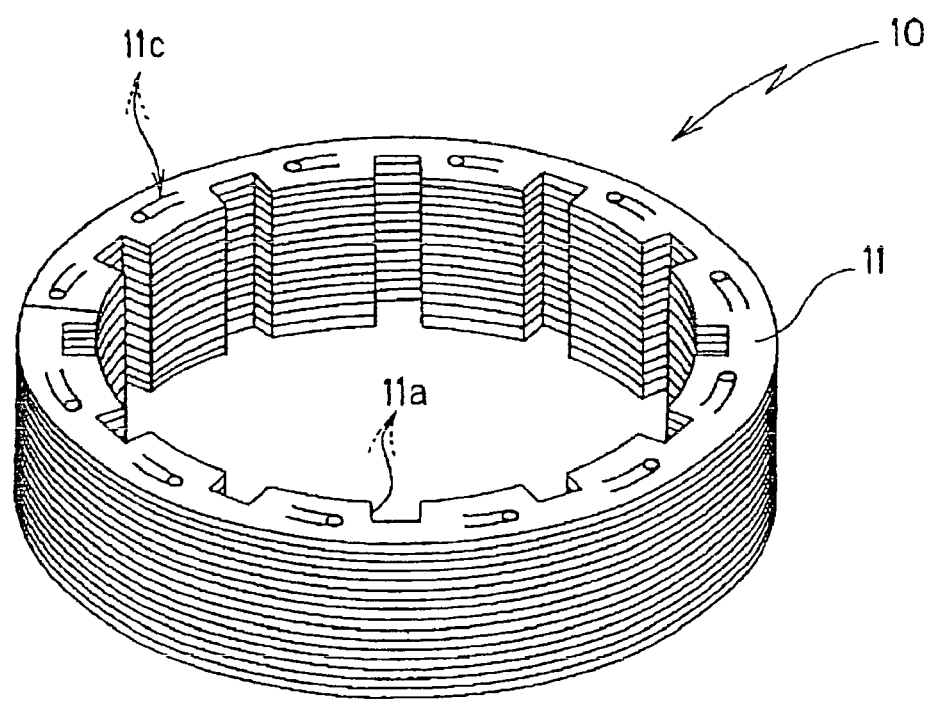
Figure 20A:
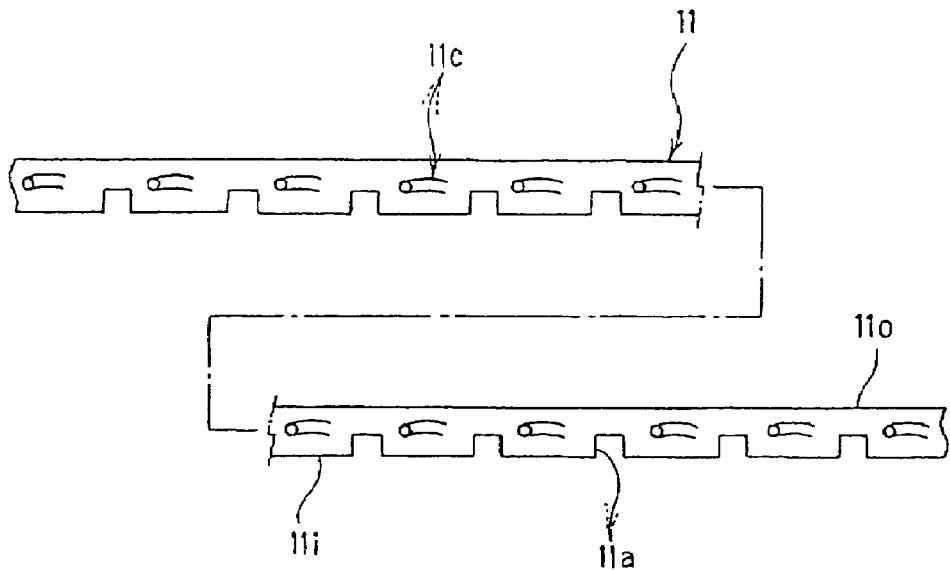
FIGS. 20A and 20B are conceptual diagrams illustrating a procedure of manufacturing a laminated yoke body in the laminated stator core shown in FIG. 18
Figure 20B:
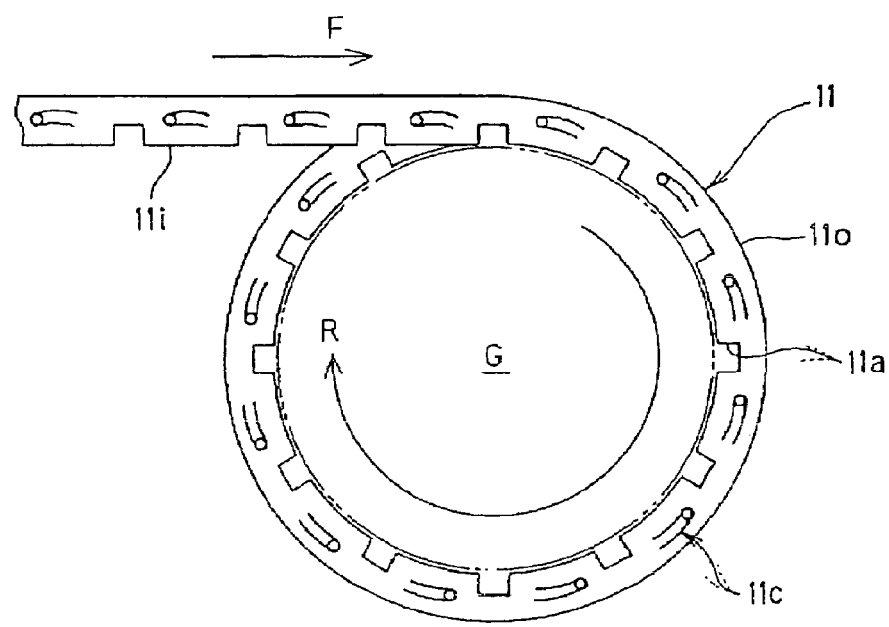

Specifically, the laminated yoke body 10 is manufactured, as shown in FIG. 19B, by suspending one end of the band-shaped yoke core piece 11 on a winding guide G of the manufacturing apparatus, winding the band-shaped yoke core piece 11 around the winding guide G rotating in the arrow direction R while taking the band-shaped yoke core piece 11 into the winding guide G in the arrow direction F, and coupling the laminated band-shaped yoke core piece 11 by the use of the caulking portions 11c, 11c, . . . in a caulking manner.

Here, since the band-shaped yoke core piece 11 constituting the laminated yoke body 10 has a band shape with a small width as described above and the concave connection portions 11a, 11a, . . . are formed in the inner circumferential edge 11i thereof, bending processability thereof is very excellent. Accordingly, it is possible to form the laminated yoke body 10, in which the band-shaped yoke core piece 11 is wound, in a circular shape.

Figure 20C:
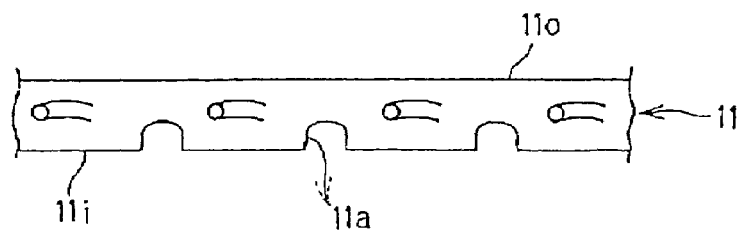
FIG. 20C is a partial cross-sectional view illustrating an example of a band-shaped yoke core piece.

As shown in FIG. 20C, by forming the inner edge of the concave connection portion 11a of the band-shaped yoke core piece 11 into a curved line and connecting the inner edge to the lateral edges with a curved line to form the edges into a continuous round shape, it is possible to further enhance the bending processability (winding formability).

By arranging the arc-shaped caulking portions 11c formed in the band-shaped yoke core piece 11 in a plane shape curved in the winding direction (arrow direction R), the caulking tongues 11t of the arc-shaped caulking portions 11c in an upper layer are inserted into the caulking grooves 11r of the arc-shaped caulking portions 11c in a lower layer so as to induce the winding of the band-shaped yoke core piece 11 at the time of winding and laminating the band-shaped yoke core piece 11 in a spiral shape. Accordingly, the shaping property of the band-shaped yoke core piece 11 at the time of winding is enhanced and it is thus possible to form the laminated yoke body 10 in a circular shape.

Figure 22A:
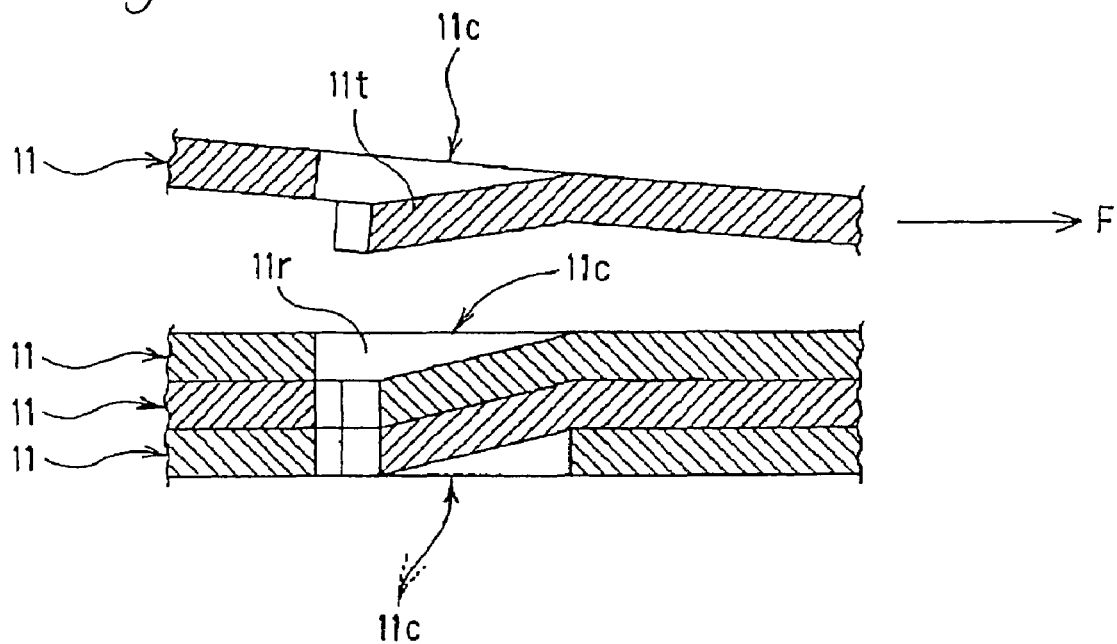
FIGS. 22A and 22B are conceptual diagrams illustrating states that the arc-shaped caulking portions are coupled to each other.
Figure 22B:
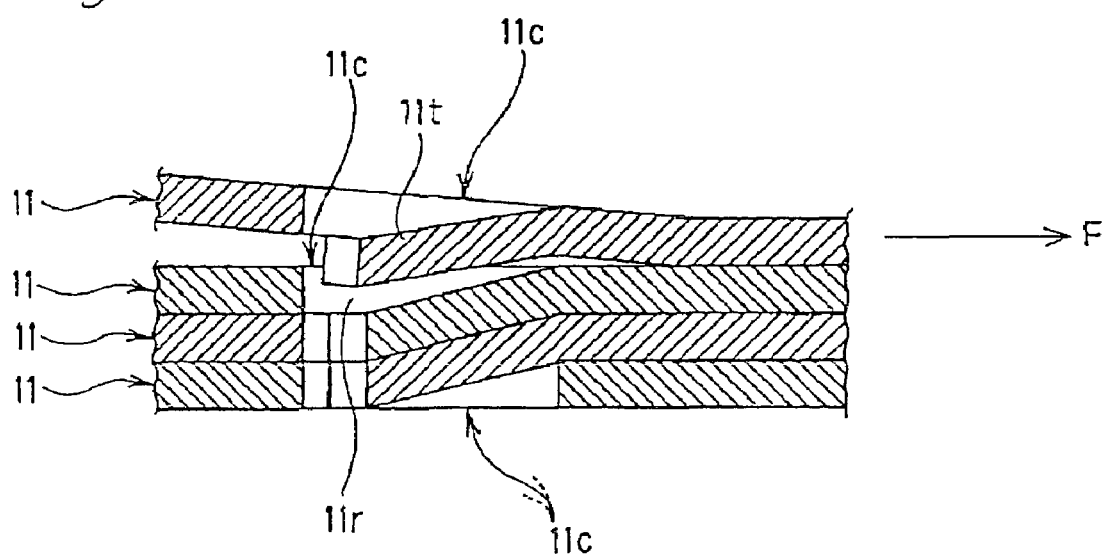

The caulking tongues 11t of the arc-shaped caulking portions 11c are tilted downwardly in the direction opposite to the winding direction (arrow direction F) of the band-shaped yoke core piece 11. Accordingly, when the band-shaped yoke core piece 11 is wound in a spiral shape and laminated in a caulking manner, as shown in FIGS. 22A and 22B, the caulking tongues 11t in an upper layer are slowly inserted into the caulking grooves 11r in a lower layer from the base end to the front end and the entire caulking tongues 11t are completely inserted into the caulking grooves 11r. As a result, it is possible to form the laminated yoke body 10 having a large coupling strength.

Figure 23A:
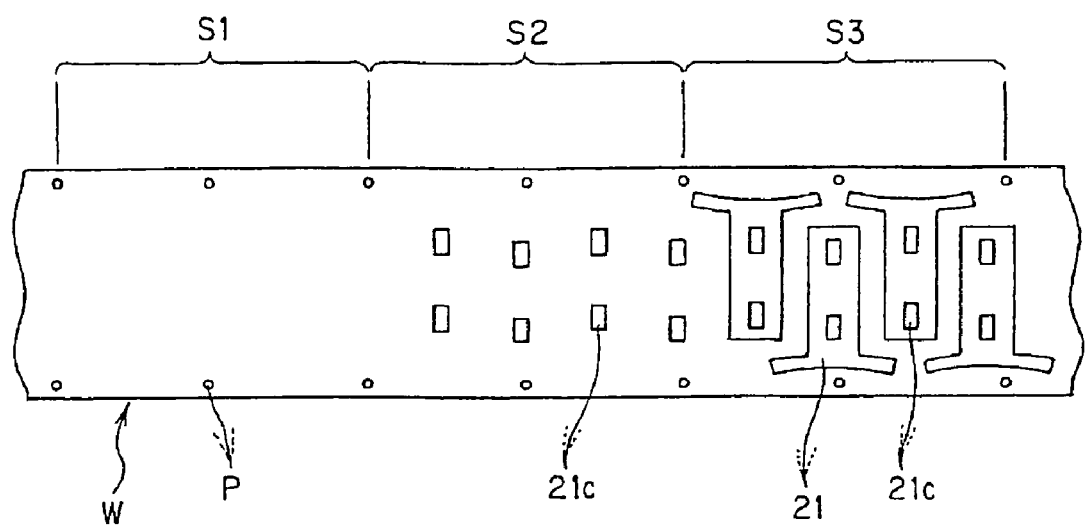
FIGS. 23A, 23B, and 23C are conceptual diagrams illustrating a procedure of manufacturing a laminated magnetic body in the laminated stator core shown in FIG. 18.
Figure 23B:
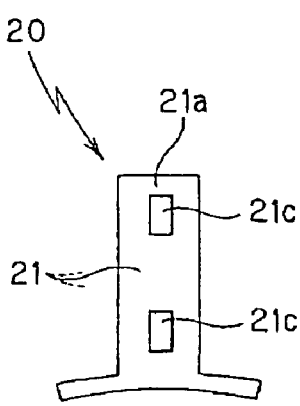

On the other hand, as shown in FIG. 23A, the laminated magnetic body 20 is formed out of a band-shaped steel plate (metal plate) W by the use of machining stations S1 to S3 of a transfer press (not shown).

That is, pilot holes P are formed by the use of the machining station S1, caulking portions 21c are formed by the use of the machining station S2, and the laminated magnetic body 20 (see FIG. 23B) is manufactured by performing a blanking/caulking process to the magnetic core pieces 21 by the use of the machining station S3.

The procedure of manufacturing the laminated magnetic body 20 by the use of the transfer press is not limited to the above-mentioned embodiment, but may be established properly.

Here, since each laminated magnetic body 20 is formed by laminating the magnetic core pieces 21, 21, . . . in a caulking manner as described above, the laminated magnetic body 20 is manufactured without departure between the laminated magnetic core pieces 21. Accordingly, the laminated stator core 1 in which the laminated magnetic bodies 20 are coupled to the laminated yoke body 10 has very excellent shaping precision.

Since the laminated magnetic bodies 20 are formed independently of the laminated yoke body 10, the yield of forming the magnetic core pieces 21, 21, . . . out of an electromagnetic steel plate (metal plate) W is enhanced. Therefore, it is possible to prevent increase in manufacturing cost.

By making the magnetic core pieces 21, 21, . . . constituting the laminated magnetic body 20 out of a material having an iron loss smaller than that of the band-shaped yoke core pieces 11 constituting the laminated yoke body 10, it is possible to accomplish more increase in efficiency and more save of energy of the laminated stator core 1 in which the laminated magnetic bodies 20, 20, . . . are coupled to the laminated yoke body 10.

Figure 23C:
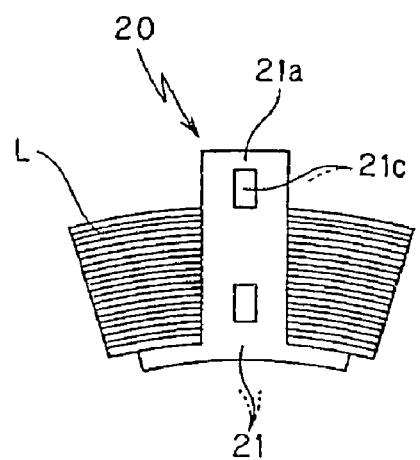

After manufacturing the laminated magnetic bodies 20 as described above, coils L are wound around the laminated magnetic bodies 20 by the use of a specific apparatus (not shown) as shown in FIG. 23C. As well as directly winding the coils L around the laminated magnetic bodies 20, a bobbin (not shown) on which the coils L are wound may be mounted on the laminated magnetic bodies 20 in an additional process.

Here, since the laminated magnetic bodies 20 are separated from the laminated yoke body 10 at the time of winding the coils L around the laminated magnetic bodies 20, the winding work of the coils L around the laminated magnetic bodies 20 is very easy. Accordingly, it is possible to wind the coils L with a high density and an excellent proportion.

Figure 24A:
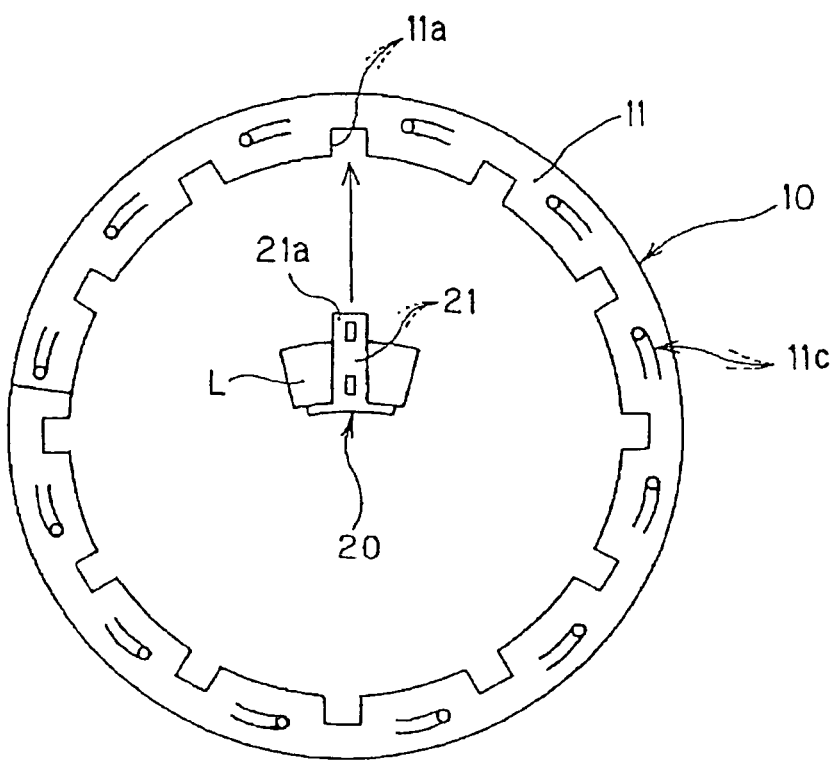
FIGS. 24A and 24B are conceptual diagrams illustrating a procedure of manufacturing the laminated stator core shown in FIG. 18.
Figure 24B:
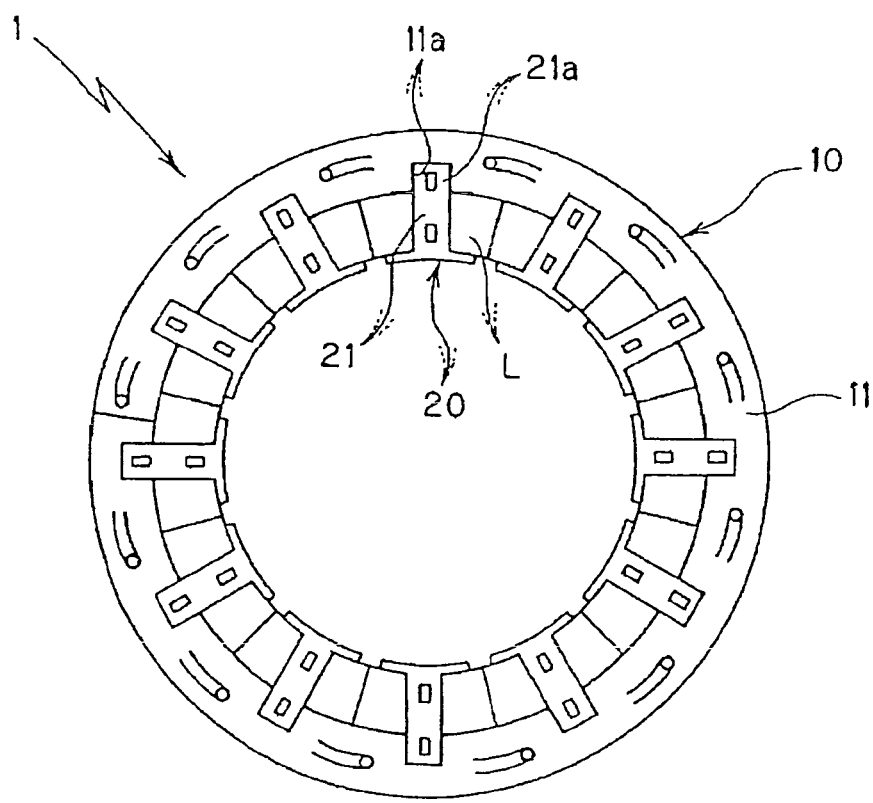

After completing the winding of the coils L on a predetermined number of laminated magnetic bodies 20, the laminated magnetic bodies 20 are coupled to the laminated core body 10 by inserting the convex connection portions 21a of the laminated magnetic bodies 20 into the concave connection portions 11a of the laminated yoke body 10 along the diameter direction of the laminated yoke body 10, as shown in FIGS. 24A and 24B.

As described above, by inserting the convex connection portions 21a of the laminated magnetic bodies 20 into the concave connection portions 11a of the laminated yoke body 10 and coupling the laminated yoke body 10 and the laminated magnetic bodies 20 to each other, the laminated stator core 1 having a predetermined shape is manufactured and a stator of an electric motor is completed in which the coils L are wound on the laminated magnetic bodies 20, 20, . . . of the laminated stator core 1.

In this way, by the use of the method of manufacturing a laminated stator core according to the present invention, it is possible to manufacture a laminated stator core 1 excellent in shaping precision and electrical characteristic.

Fifth Embodiment

Figure 26A:
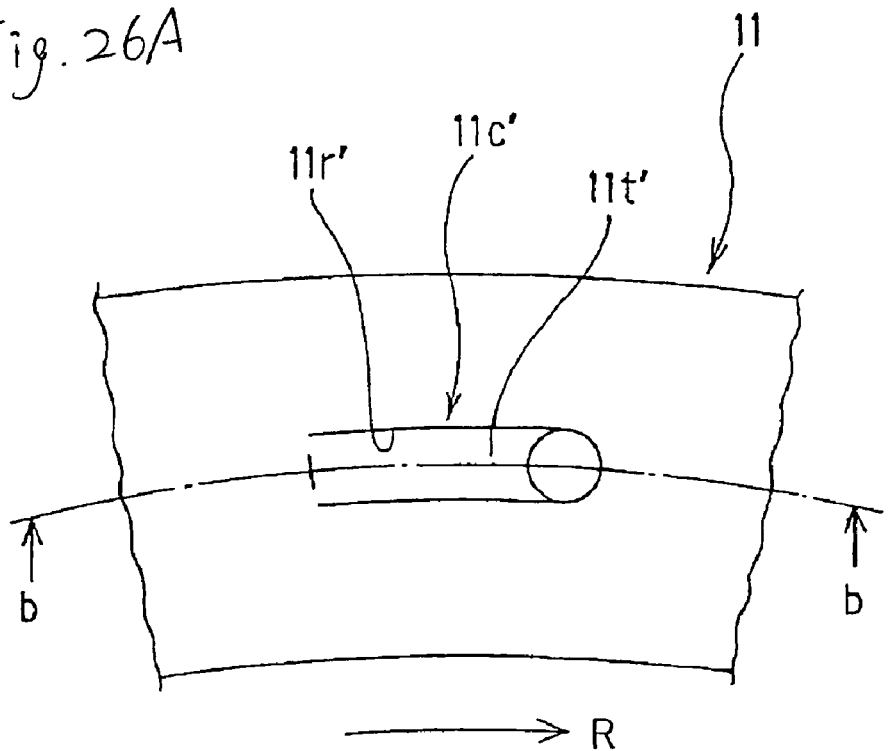
FIGS. 26A and 26B are a partial plan view and a partial cross-sectional view illustrating an arc-shaped caulking portion of a band-shaped yoke core piece.
Figure 26B:
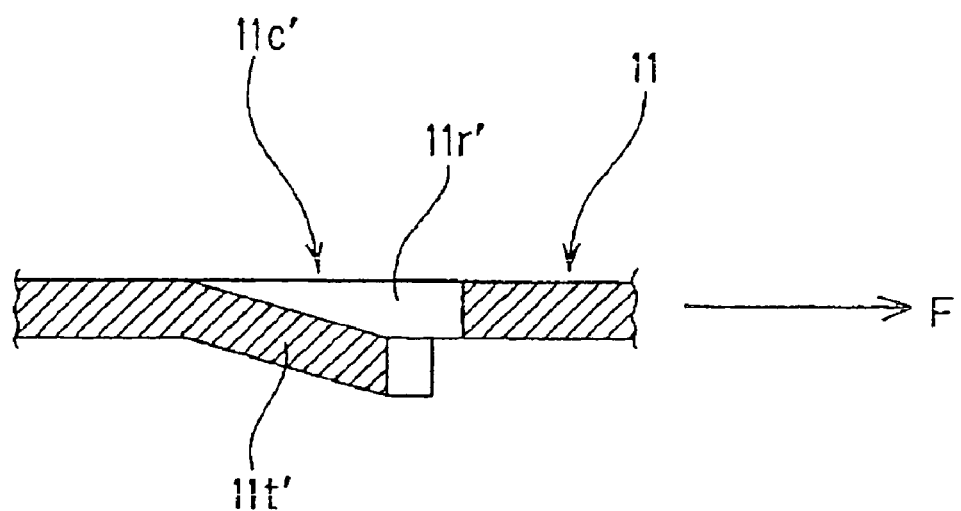
Figure 27A:
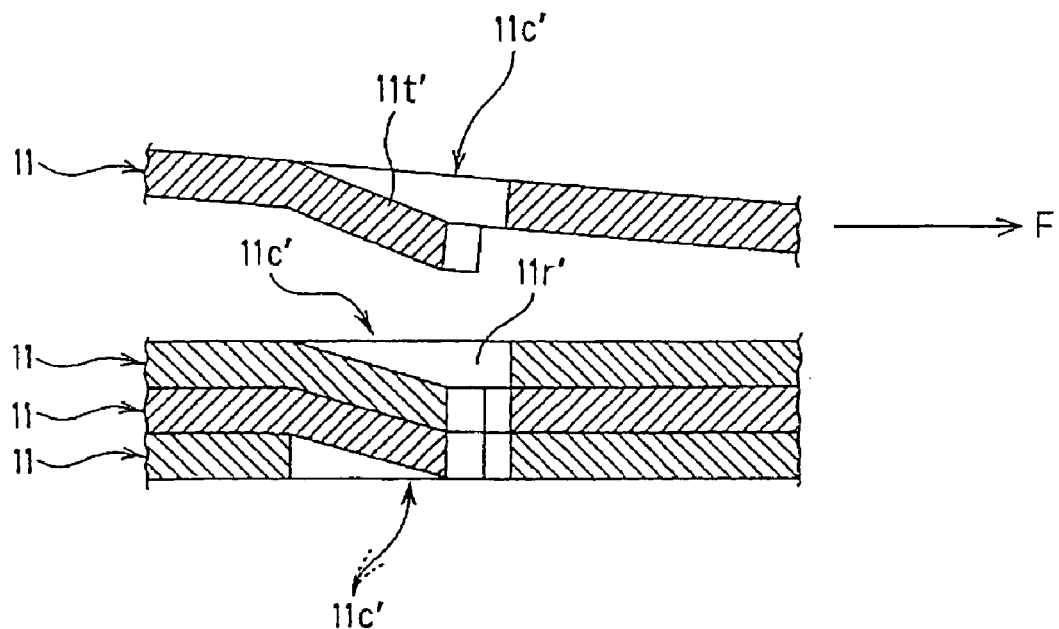
FIGS. 27A and 27B are conceptual diagrams illustrating a state that the arc-shaped caulking portions are coupled to each other.
Figure 27B:
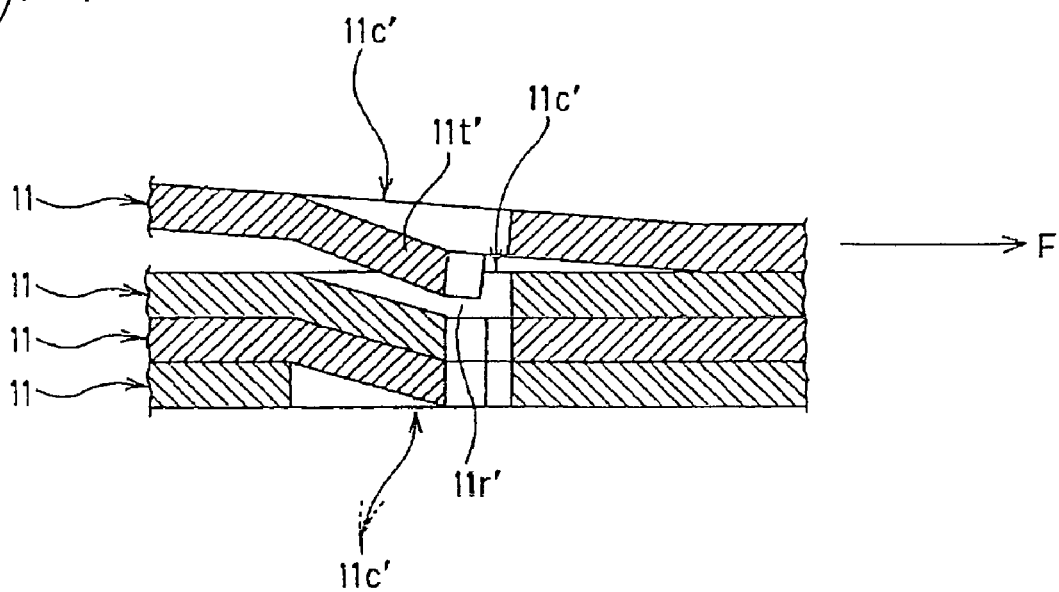
Figure 28A:
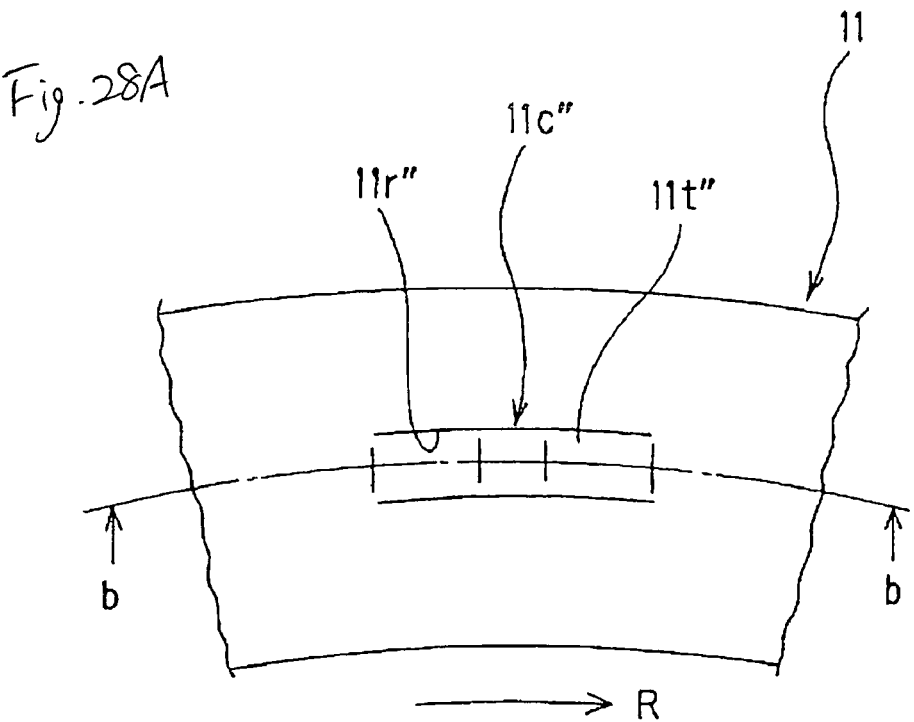
FIGS. 28A and 28B are a partial plan view and a partial cross-sectional view illustrating a modification of the arc-shaped caulking portion in the band-shaped yoke core piece.
Figure 28B:
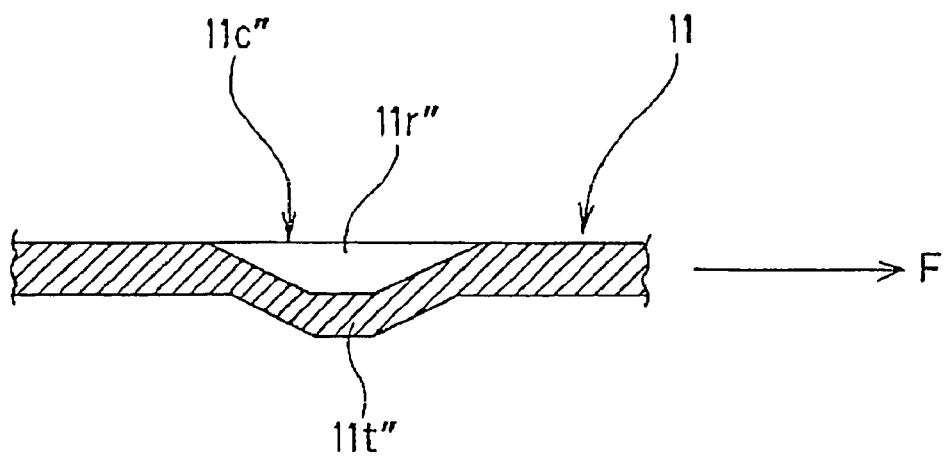

FIGS. 26 to 28 show another example of the band-shaped yoke core piece 11, wherein arc-shaped caulking portions 11c', 11c', . . . are arranged with a predetermined pitch in the central area in the width direction of the band-shaped yoke core piece 11.

As shown in FIG. 26, each arc-shaped caulking portion 11c' has a caulking tongue 11t' protruded downwardly by means of a half blanking and a caulking groove 11r' formed at the back side of the caulking tongue lt.

The arc-shaped caulking portion 11c' (including the caulking tongue 11t' and the caulking groove 11r') has a plane shape curved in the winding direction (arrow direction R), that is, in the direction in which the band-shaped yoke core pieces 11 are wound in the subsequent process.

As shown in FIG. 26, in the arc-shaped caulking portions 11c', caulking tongues 11t' are downwardly tilted in the direction opposite to the winding direction (arrow direction F) when the band-shaped yoke core piece 11' is wound in the subsequent process.

Here, the pitch of the arc-shaped caulking portions 11c', 11c', . . . is set so that the arc-shaped caulking portions 11c' are overlapped with each other when the band-shaped yoke core piece 11' is wound in a spiral shape in the subsequent process.

Figure 25A:
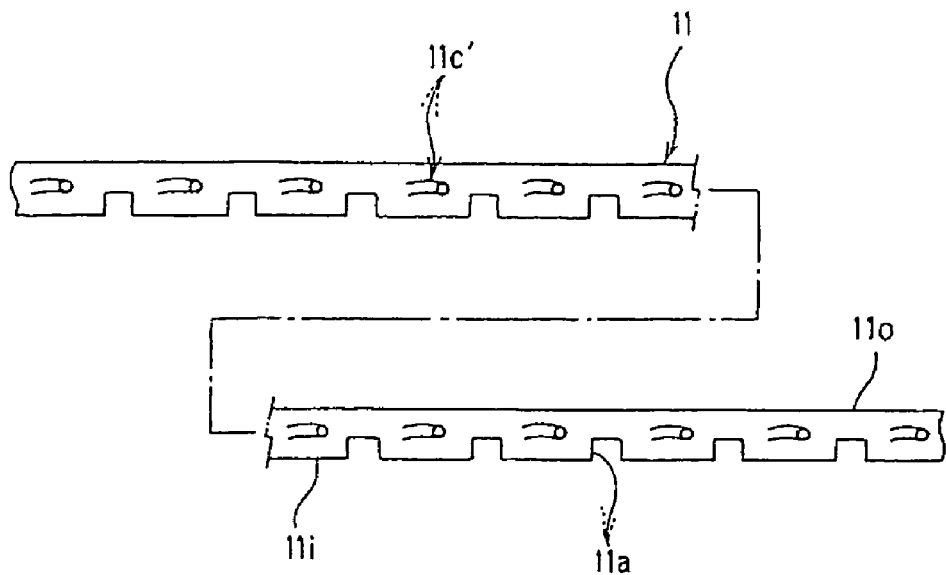
FIGS. 25A and 25B are conceptual diagrams illustrating a procedure of manufacturing a laminated yoke body having different shapes of arc-shaped caulking portions and FIG. 25C is a partial plan view illustrating an example of a band-shaped yoke core piece.
Figure 25B:
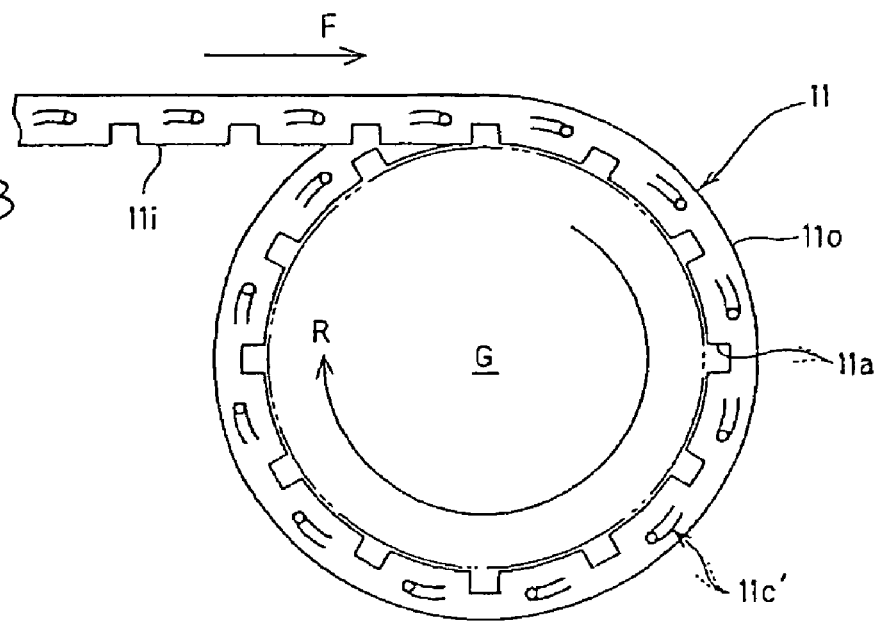
Figure 25C:
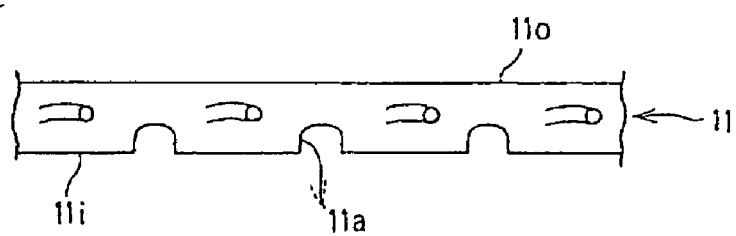

The band-shaped yoke core piece 11 is taken into a manufacturing apparatus (not shown) and as shown in FIG. 25B, the laminated yoke body 10 having a predetermined shape (see FIG. 25B) is formed by winding and laminating the band-shaped yoke core piece 11 in a spiral shape and coupling the laminated band-shaped yoke core piece by the use of the arc-shaped caulking portions 11c', 11c', . . . in a caulking manner.

Here, by arranging the arc-shaped caulking portions 11c' formed in the band-shaped yoke core piece 11 in a plane shape curved in the winding direction (arrow direction R), the caulking tongues 11t' of the arc-shaped caulking portions 11c' in an upper layer are inserted into the caulking grooves 11r' of the arc-shaped caulking portions 11c' in a lower layer so as to induce the winding of the band-shaped yoke core piece 11 at the time of winding and laminating the band-shaped yoke core piece 11 in a spiral shape. Accordingly, the shaping property of the band-shaped yoke core piece 11 at the time of winding is enhanced and it is thus possible to form the laminated yoke body 10 in a circular shape.

The caulking tongues 11t' of the arc-shaped caulking portions 11c' are tilted downwardly in the winding direction (arrow direction F) of the band-shaped yoke core piece 11. Accordingly, when the band-shaped yoke core piece 11 is wound in a spiral shape and laminated in a caulking manner, as shown in FIGS. 27A and 27B, the caulking tongues 11t' in an upper layer are slowly inserted into the caulking grooves 11r' in a lower layer from the front end to the base end, so the entire caulking tongues 11t' are smoothly and completely inserted into the caulking grooves 11r'. As a result, it is possible to form the laminated yoke body 10 having a large coupling strength.

FIG. 28 shows another example of the band-shaped yoke core piece 11, wherein caulking portions 11c'', 11c'', . . . are arranged with a predetermined pitch in the central portion in the width direction of the band-shaped yoke core piece 11.

Each arc-shaped caulking portion 11c has a caulking tongue 11t protruded downwardly by means of a half blanking and a caulking groove 11r formed at the back side of the caulking tongue 11t and has a plane shape curved in the winding direction (arrow direction R), that is, in the direction in which the band-shaped yoke core pieces 11 are wound in the subsequent process.

The caulking tongues 11t" of the arc-shaped caulking portions 11c" have an inverted trapezoid shape including a portion tilted downwardly in the winding direction (arrow direction F) when the band-shaped yoke core piece 11 is wound in the subsequent process and a portion tilted downwardly in the direction opposite to the winding direction (arrow direction F).

The pitch of the arc-shaped caulking portions 11c", 11c", . . . is set so that the caulking portions 11c" are overlapped with each other when the band-shaped yoke core piece 11 is wound in a spiral shape in the subsequent process.

By arranging the arc-shaped caulking portions 11c" formed in the band-shaped yoke core piece 11 in a plane shape curved in the winding direction (arrow direction R), the shaping property of the band-shaped yoke core piece 11 at the time of winding is enhanced and it is thus possible to form the laminated yoke body 10 in a circular shape.

Since the caulking tongues 11t" of the arc-shaped caulking portions 11c" are formed in an inverted trapezoid shape, the caulking tongues 11t" serves as a combination of the arc-shaped caulking portion 11c shown in FIG. 22 and the arc-shaped caulking portion 11c" shown in FIG. 27 when the band-shaped yoke core piece 11 is wound in a spiral shape and laminated in a caulking manner. Accordingly, the entire caulking tongues 11t" are smoothly and completely inserted into the caulking grooves 11r", so it is possible to form the laminated yoke body 10 having a large coupling strength.

In the above-mentioned embodiments, the laminated stator core including the laminated yoke body having a ring shape and the twelve laminated magnetic bodies is exemplified. However, the present invention is not limited to the manufacturing the above-mentioned laminated stator core, but may apply effectively to methods of manufacturing laminated stator cores having various structures.

Sixth Embodiment

FIGS. 29 to 36 show a method of manufacturing a laminated stator core according to a sixth embodiment of the present invention. The laminated stator core 1 manufactured according to the sixth embodiment includes an outer laminated yoke body 10 having a ring shape and a predetermined number (twelve in the sixth embodiment) of inner yoke-attachment laminated magnetic sub-bodies 20, 20, . . . coupled to the inner circumference of the outer laminated yoke body 10.

The outer laminated yoke body 10 (hereinafter, referred to as laminated yoke body 10) has a cylinder shape constituting the outer circumference of a yoke portion in the laminated stator core 1. The laminated yoke body is manufactured by winding and laminating band-shaped yoke core sub-pieces 11, which are formed by punching a band-shaped steel plate (metal plate), in a spiral shape and coupling them to each other in a caulking manner (caulking lamination) as described later.

Arc-shaped caulking portions 11c, 11c, . . . to be described later are formed in the band-shaped yoke core sub-pieces 11 (referred to as yoke core pieces 11) and the laminated yoke core pieces 11 are coupled to each other through the use of the caulking portions 11c, 11c, . . . in a caulking manner.

On the other hand, each inner yoke-attachment laminated magnetic sub-body 20 (hereinafter, referred to as laminated magnetic body 20) has an inner yoke sub-portion 20y, which is formed by dividing the inner half in a unit of magnetic poles when the yoke portion of the laminated yoke body 10 is divided into two halves in the width direction, and a magnetic portion 20t protruded from the inner yoke sub-portion 20y. The laminated magnetic body is manufactured by laminating a predetermined number of inner yoke-attachment magnetic core sub-pieces 21, 21, . . . , which are formed by punching a band-shaped steel plate (metal plate), and coupling them to each other in a caulking manner (caulking lamination). Reference numeral 21c in the figures denotes caulking portions formed in the inner yoke-attachment magnetic core sub-pieces 21 (hereinafter, referred to as magnetic core pieces 21).

By connecting a predetermined number of laminated magnetic bodies 20, 20, which are arranged in a ring shape in the inner circumference of the laminated yoke body 10, to each other, the laminated stator core 1 having a predetermined shape is manufactured in which a predetermined number of magnetic pole portions are protruded in the inner radius direction of the yoke portion.

A method of manufacturing the laminated stator core according to the present invention will be now described in detail by exemplifying a procedure of manufacturing the laminated stator core 1.

Figure 31A:
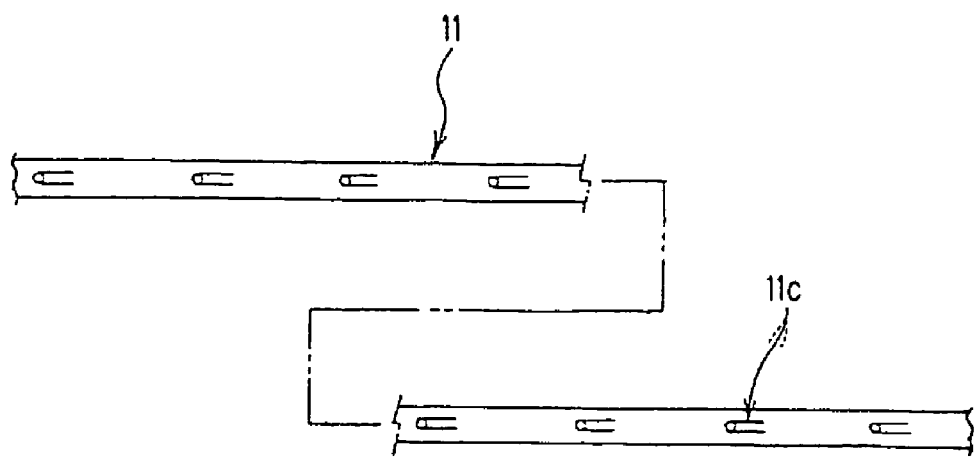
FIGS. 31A and 31B are conceptual diagrams illustrating a procedure of manufacturing the outer laminated yoke body of the laminated stator core shown in FIG. 29.

First, as shown in FIG. 31A, the yoke core pieces 11 are formed by punching a band-shaped steel plate (metal plate) not shown.

The yoke core pieces 11 have a shape that the outer half is developed in a straight line when the yoke portion of the laminated stator core 1 is divided into two halves in the width direction, that is, a band shape extending straightly with a small width. Caulking portions 11c, 11c, . . . are arranged with a predetermined pitch in the central area in the width direction of the yoke core pieces 11.

Figure 29A:
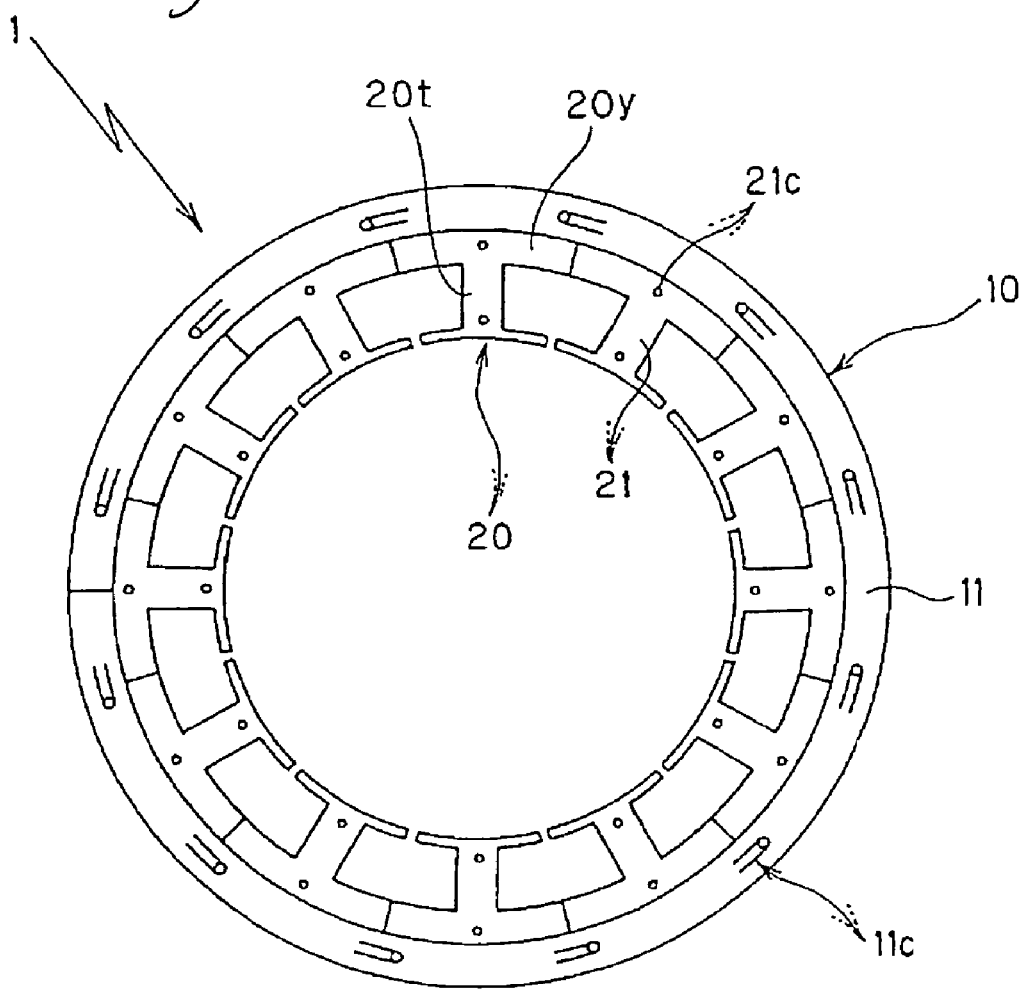
FIGS. 29A and 29B are an entire plan view and an entire side view illustrating a laminated stator core manufactured by the use of a method according to an embodiment of the present invention.
Figure 29B:
Figure 30A:
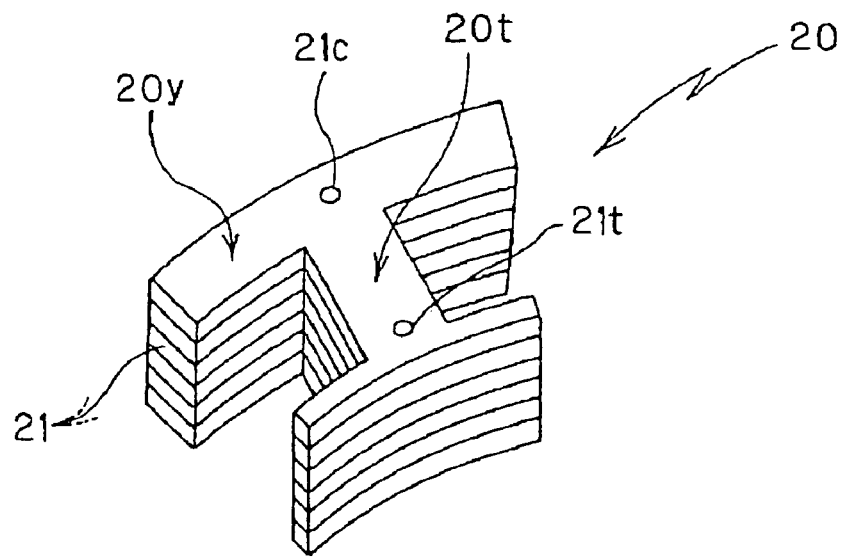
FIGS. 30A and 30B are perspective views illustrating appearances of inner yoke-attachment laminated magnetic sub-bodies and an outer laminated yoke body constituting the laminated stator core shown in FIG. 29.
Figure 32A:
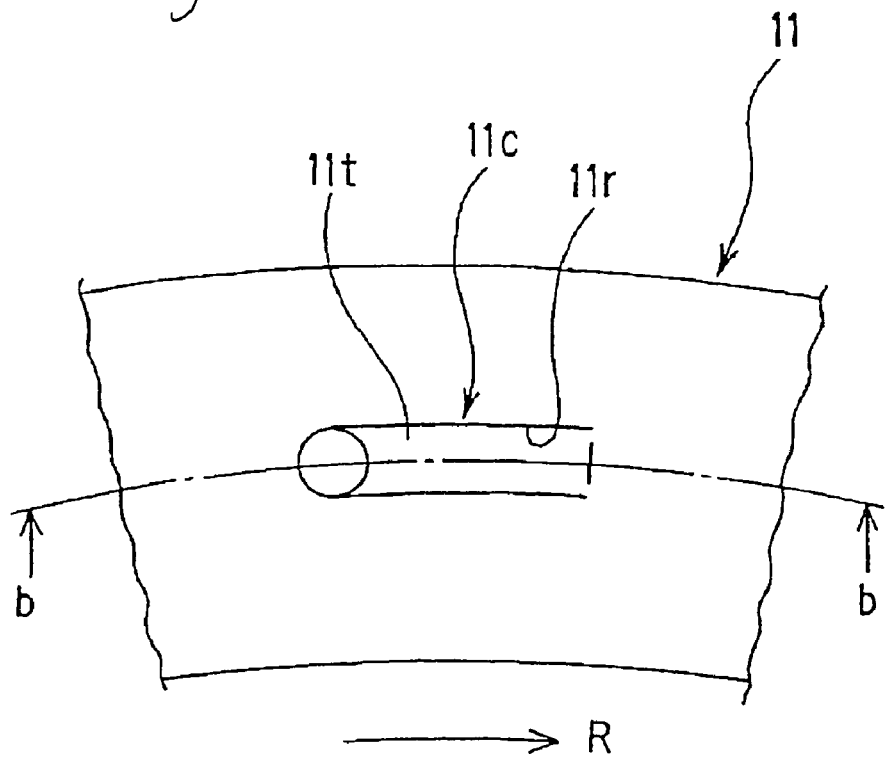
FIGS. 32A and 32B are a partial plan view and a partial cross-sectional view illustrating a caulking portion of a band-shaped yoke core sub-piece, respectively.
Figure 32B:
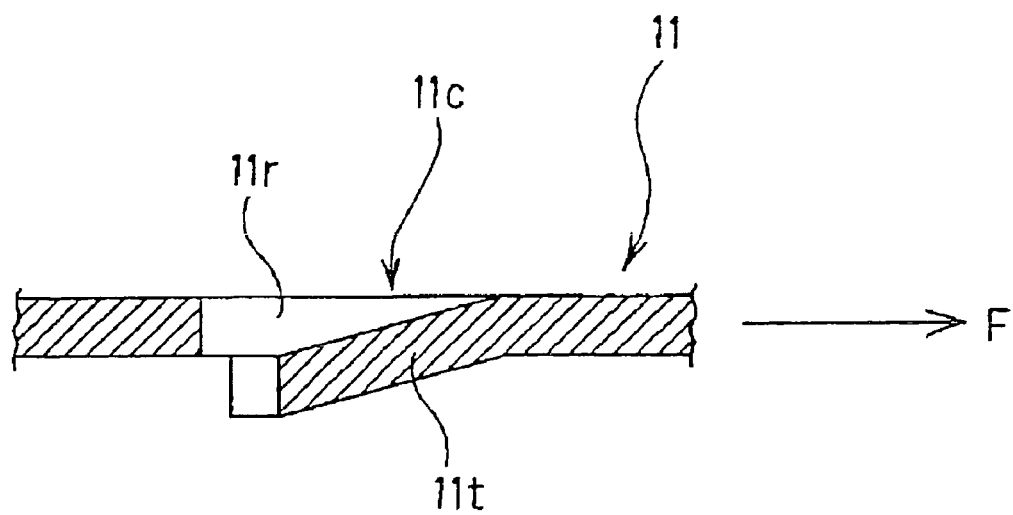

The caulking portions 11c have a plane shape curved in the winding direction (arrow direction R) shown in FIG. 32, that is, in the direction in which the yoke core pieces 11 are wound in the subsequent process, more specifically, in the circumference direction in which the caulking portions 11c, 11c, . . . are arranged in the completed laminated yoke body 10 (see FIGS. 29 and 30). Each caulking portion has a caulking tongue 11t protruded downwardly through a half blanking and a caulking groove 11r formed at the back side of the caulking tongue 11t.

The pitch of the caulking portions 11c, 11c, . . . is set so that the caulking portions 11c are overlapped with each other when the yoke core pieces 11 are wound and laminated in a spiral shape in the subsequent process. In each caulking portion 11c, a caulking tongue 11t is tilted downwardly in the direction opposite to the winding direction (arrow direction F) when the yoke core pieces 11 are wound in the subsequent process.

After forming the band-shaped yoke core piece 11 by punching a band-shaped steel plate (metal plate), the band-shaped yoke core piece 11 is taken into a manufacturing apparatus (not shown). Then, as shown in FIG. 31B, the laminated yoke body 10 (see FIG. 30B) is formed by winding and laminating the band-shaped yoke core piece 11 in a spiral shape and coupling the laminated band-shaped yoke core piece by the use of the caulking portions 1c, 11c, . . . in a caulking manner.

Figure 30B:
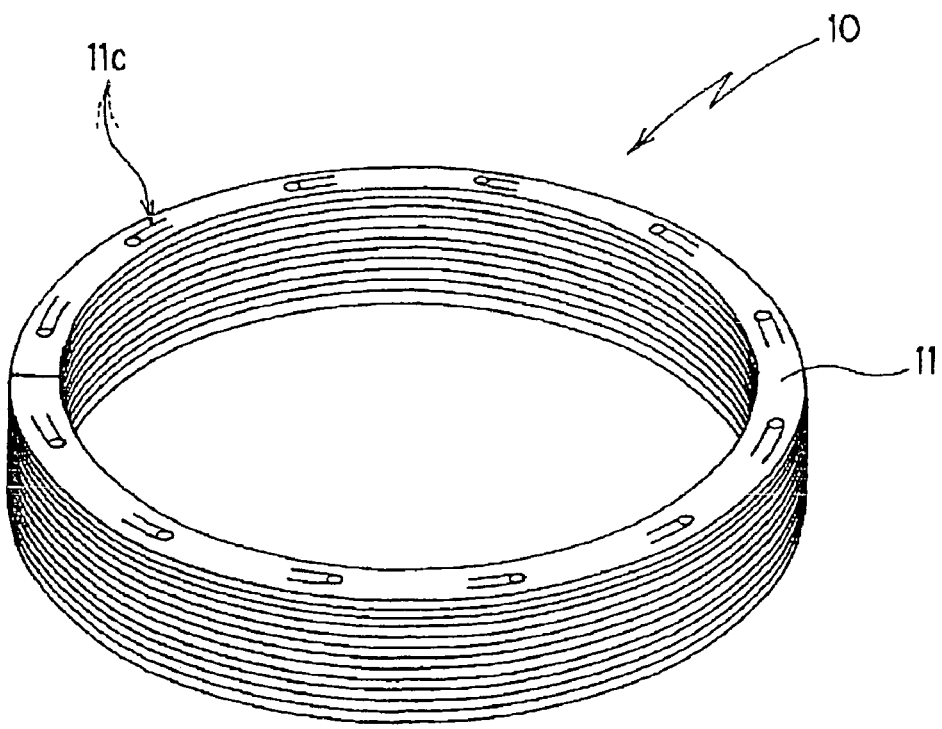
Figure 31B:
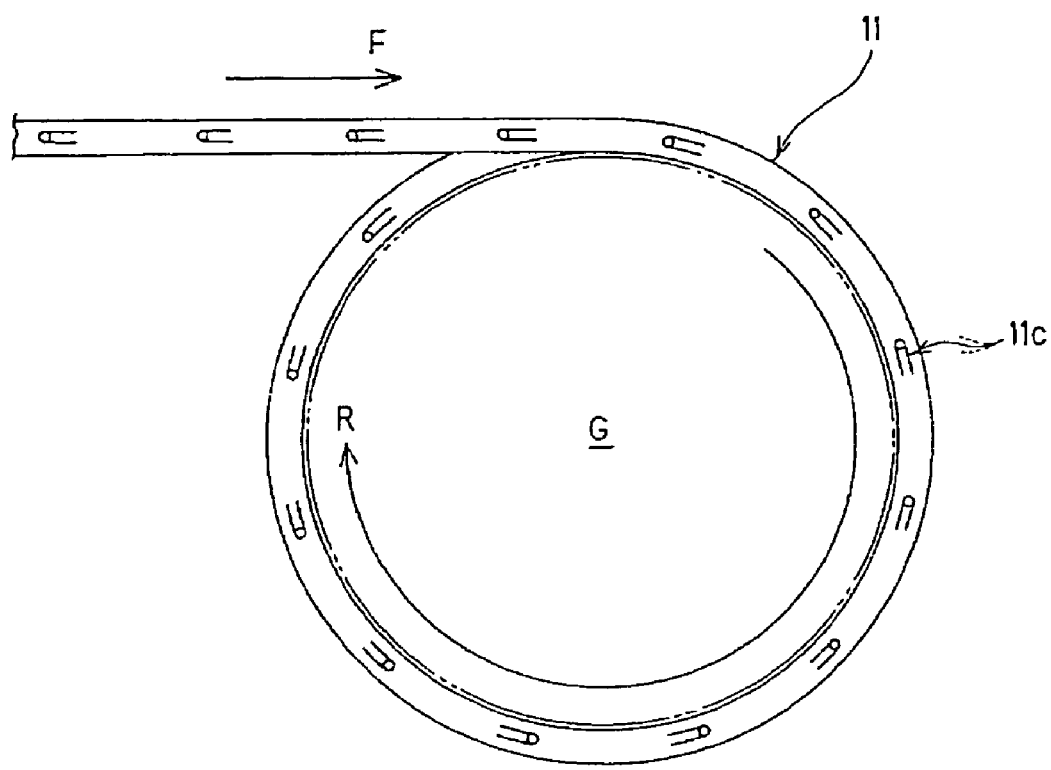

Specifically, the laminated yoke body 10 is manufactured, as shown in FIG. 30B, by suspending one end of the band-shaped yoke core piece 11 on a winding guide G of the manufacturing apparatus, winding the band-shaped yoke core piece 11 around the winding guide G rotating in the arrow direction R while taking the band-shaped yoke core piece 11 into the winding guide G in the arrow direction F, and coupling the laminated band-shaped yoke core piece 11 by the use of the caulking portions 11c, 11c, . . . in a caulking manner.

Here, since the band-shaped yoke core piece 11 constituting the laminated yoke body 10 has a band shape with a small width as described above, the bending processability thereof is very excellent. Accordingly, it is possible to form the laminated yoke body 10, in which the band-shaped yoke core piece 11 is wound, in a circular shape.

By locally pressing the outer circumference of the yoke core piece 11 and stretching it in the longitudinal direction when winding the yoke core piece 11, it is possible to further enhance the bending processability at the time of winding.

By arranging the arc-shaped caulking portions 11c formed in the band-shaped yoke core piece 11 in a plane shape curved in the winding direction (arrow direction R), the caulking tongues 11t of the arc-shaped caulking portions 11c in an upper layer are inserted into the caulking grooves 11r of the arc-shaped caulking portions 11c in a lower layer so as to induce the winding of the band-shaped yoke core piece 11 at the time of winding and laminating the band-shaped yoke core piece 11 in a spiral shape. Accordingly, the shaping property of the band-shaped yoke core piece 11 at the time of winding is enhanced and it is thus possible to form the laminated yoke body 10 in a circular shape.

The caulking tongues 11t of the arc-shaped caulking portions 11c are tilted downwardly in the direction opposite to the winding direction (arrow direction F) of the band-shaped yoke core piece 11. Accordingly, when the band-shaped yoke core piece 11 is wound in a spiral shape and laminated in a caulking manner, the caulking tongues 11t in an upper layer are slowly inserted into the caulking grooves 11r in a lower layer from the base end to the front end and the entire caulking tongues 11t are completely inserted into the caulking grooves 11r. As a result, it is possible to form the laminated yoke body 10 having a large coupling strength.

Figure 33A:
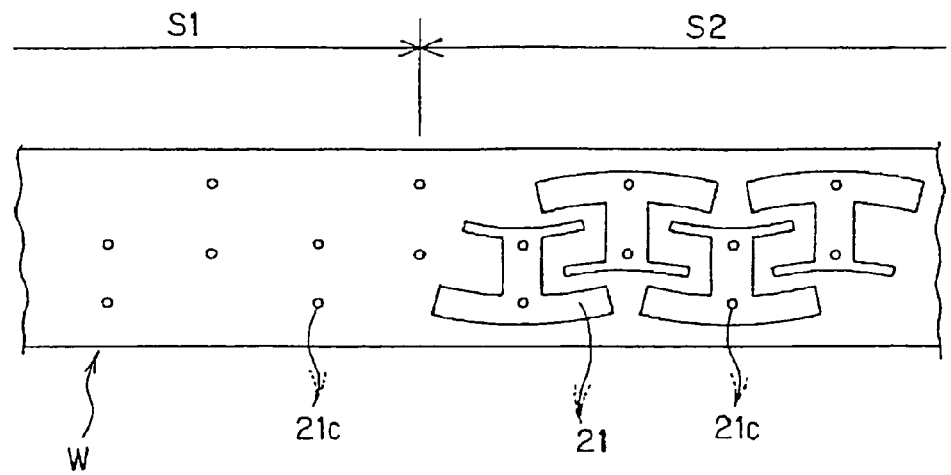
FIGS. 33A, 33B, and 33C are conceptual diagrams illustrating a procedure of manufacturing the inner yoke-attachment laminated magnetic sub-body of the laminated stator core shown in FIG. 29.
Figure 33B:
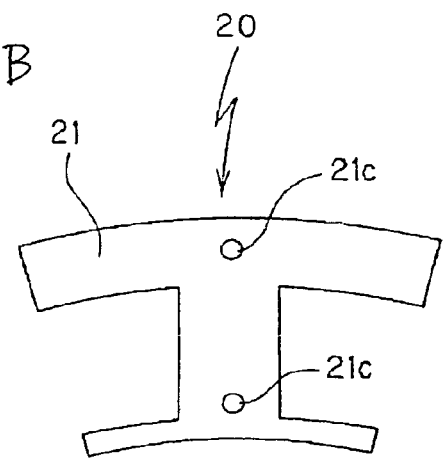

On the other hand, as shown in FIG. 33A, the laminated magnetic body 20 is formed out of a band-shaped steel plate (metal plate) W by the use of machining stations S1 and S2 of a transfer press (not shown). That is, caulking portions 21c are formed by the use of the machining station S1 and the laminated magnetic body 20 (see FIG. 33B) is manufactured by performing a blanking/caulking process to the magnetic core pieces 21 by the use of the machining station S2. The procedure of manufacturing the laminated magnetic body 20 by the use of the transfer press is not limited to the above-mentioned embodiment, but may be established properly.

Here, since each laminated magnetic body 20 is formed by laminating the magnetic core pieces 21, 21, . . . in a caulking manner as described above, the laminated magnetic body 20 is manufactured without departure between the laminated magnetic core pieces 21. Accordingly, the laminated stator core 1 in which the laminated magnetic bodies 20 are coupled to the laminated yoke body 10 has very excellent shaping precision.

Since the laminated magnetic bodies 20 are formed independently of the laminated yoke body 10, the yield of forming the magnetic core pieces 21, 21, . . . out of an electromagnetic steel plate (metal plate) W is enhanced. Therefore, it is possible to prevent increase in manufacturing cost.

Figure 33C:
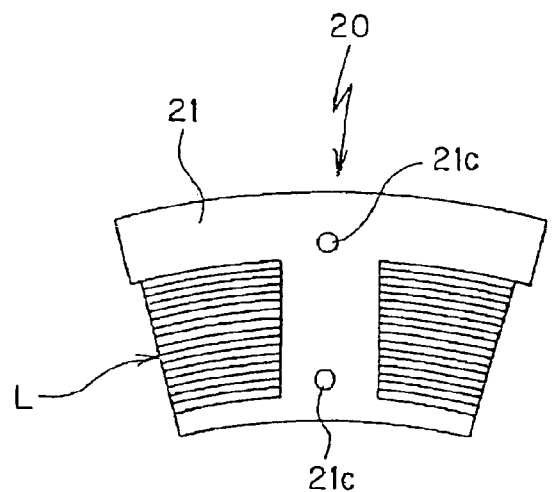

After manufacturing the laminated magnetic bodies 20 as described above, coils L are wound around the laminated magnetic bodies 20 by the use of a specific apparatus (not shown) as shown in FIG. 33C. As well as directly winding the coils L around the laminated magnetic bodies 20, a bobbin (not shown) on which the coils L are wound may be mounted on the laminated magnetic bodies 20 in an additional process.

Here, since the laminated magnetic bodies 20 are separated from the laminated yoke body 10 at the time of winding the coils L around the laminated magnetic bodies 20, the winding work of the coils L around the laminated magnetic bodies 20 is very easy. Accordingly, it is possible to wind the coils L with a high density and an excellent proportion.

Figure 34:
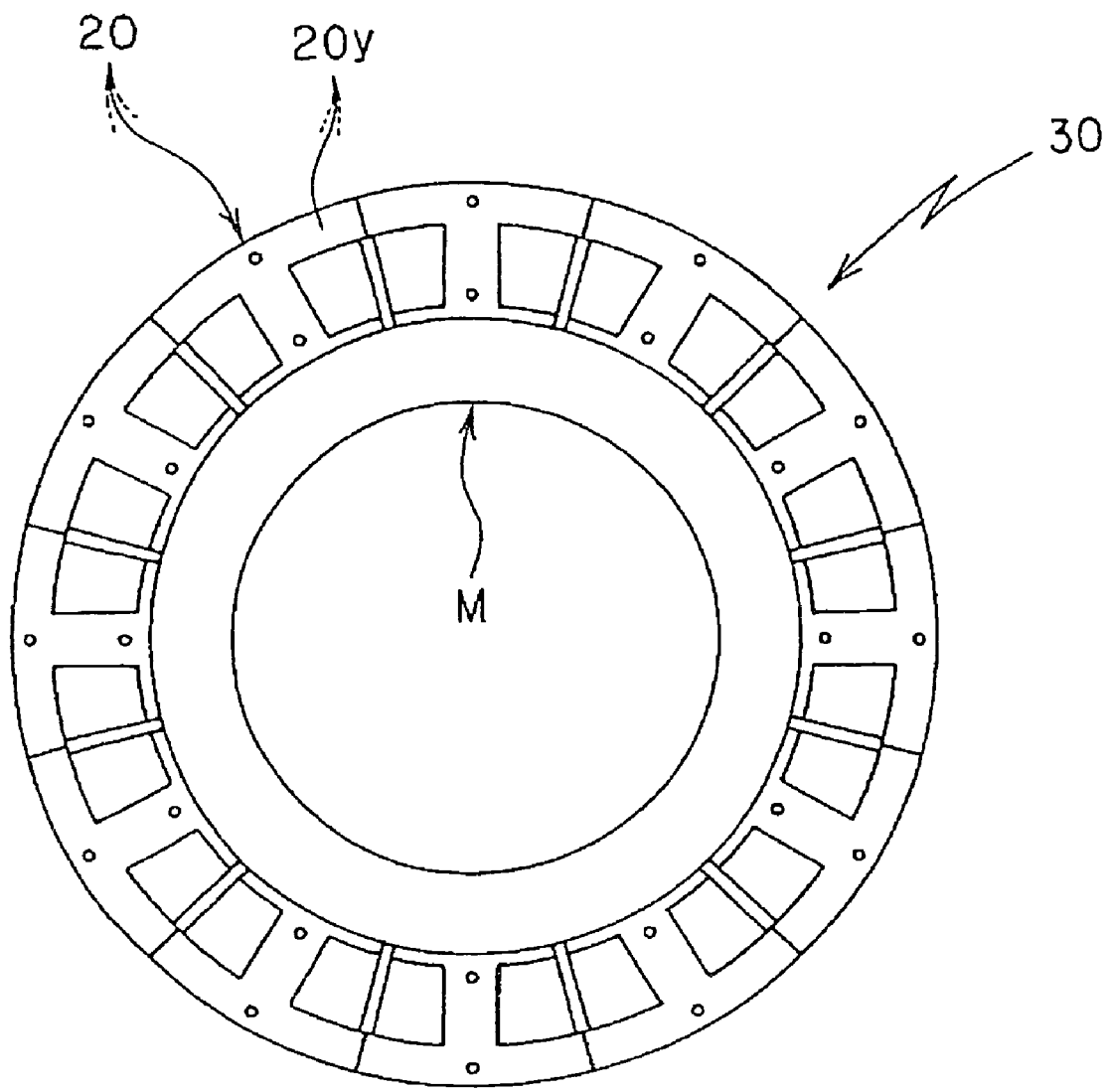
FIG. 34 is a conceptual diagram illustrating a procedure of manufacturing the laminated stator core shown in FIG. 29.

After completing the winding of the coils L on the respective laminated magnetic bodies 20, an intermediate assembly 30 in which the yoke sub-portions 20y, 20y, . . . form a ring shape is formed, as shown in FIG. 34, by arranging a predetermined number of laminated magnetic bodies 20 around a ring-shaped electromagnet (magnetic adsorptive supporting means) M and connecting the ends of the inner yoke sub-portions 20y (hereinafter, referred to as yoke sub-portions 20y) to each other.

At this time, the laminated magnetic bodies 20, 20, . . . arranged around the electromagnet M are temporarily held in a ring shape very easily with the magnetic adsorptive force from the inner circumference resulting from the electromagnet M.

As described above, the laminated magnetic bodies 20, 20, . . . and the laminated yoke body 10 are coupled to each other, by shrink-fitting the laminated yoke body 10 to the outer circumference of the intermediate assembly 30, as shown in FIG. 35, after forming the intermediate assembly 30 including a predetermined number of laminated magnetic bodies 20, 20, . . . .

At this time, since the intermediate assembly 30 is formed in which the predetermined number of laminated magnetic bodies 20, 20, . . . are temporarily held from the inner circumference by the electromagnet M, it is possible to very easily shrink-fit the laminated yoke body 10 to the outer circumference of the intermediate assembly 30.

As described above, by shrink-fitting the laminated yoke body 10 to the outer circumference of the intermediate assembly 30 and then separating the electromagnet M therefrom, the laminated stator core 1 having a predetermined shape is manufactured and a stator of an electric motor is completed in which the coils L are wound on the laminated magnetic bodies 20, 20, . . . of the laminated stator core 1, as shown in FIG. 36.

Here, since the laminated yoke body 10 and the intermediate assembly 30, that is, the predetermined number of laminated magnetic bodies 20, 20, . . . , are coupled to each other strongly and satisfactorily by means of the shrink fitting, the shaping precision of the laminated stator core 1 is very excellent.

In this way, by the use of the method of manufacturing a laminated stator core according to the present invention, it is possible to manufacture a laminated stator core 1 excellent in shaping precision and electrical characteristic.

Figure 37A:
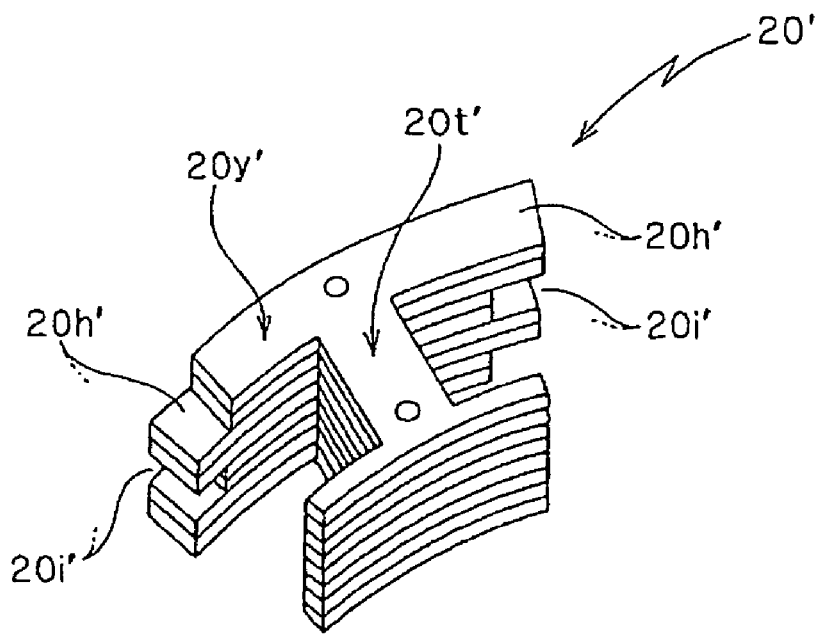
FIGS. 37A and 37B are a perspective view illustrating another example of the inner yoke-attachment laminated magnetic sub-body and a plan view illustrating a state that a coil is wound thereon.
Figure 37B:
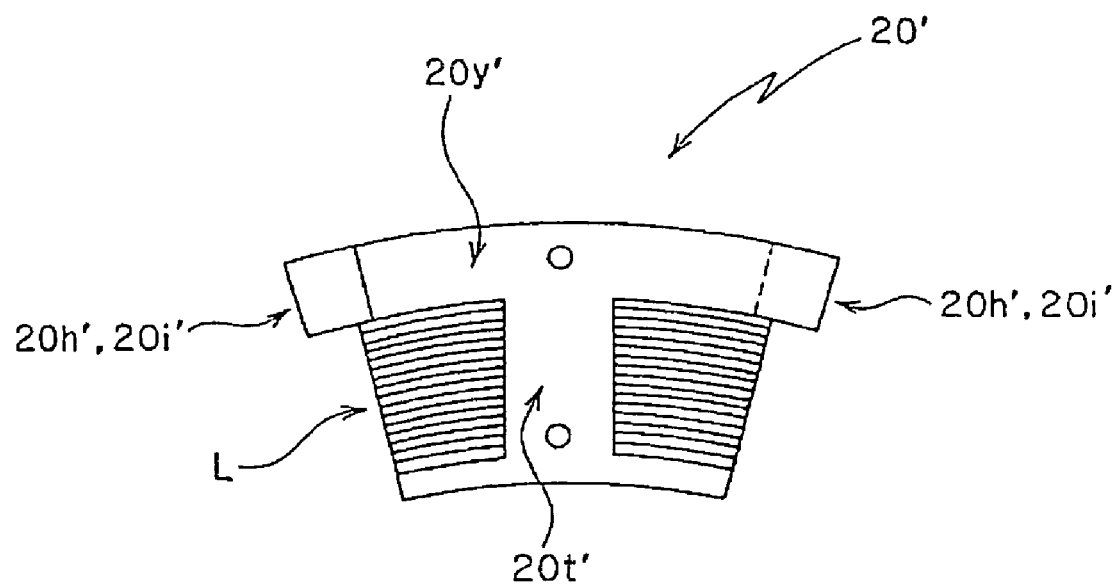
Figure 38A:
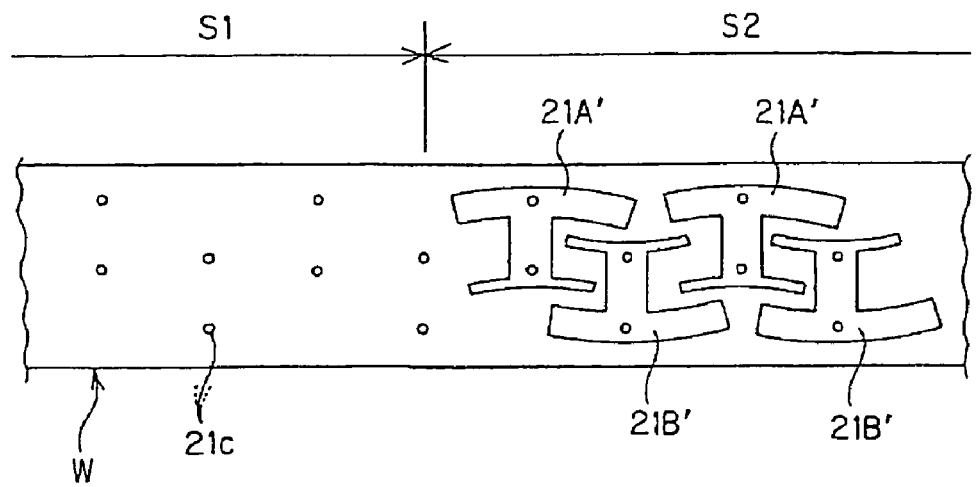
FIGS. 38A, 38B, and 38C are plan views illustrating a procedure of forming inner yoke-attachment magnetic core sub-pieces constituting the inner yoke-attachment laminated magnetic sub-body and illustrating two kinds of inner yoke-attachment magnetic core sub-pieces.
Figure 38B:
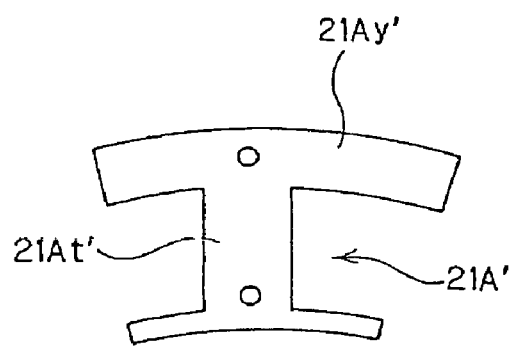
Figure 38C:
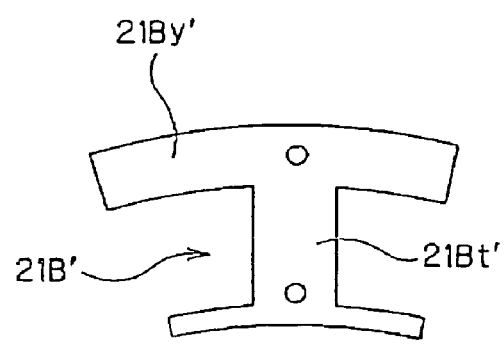
Figure 39A:
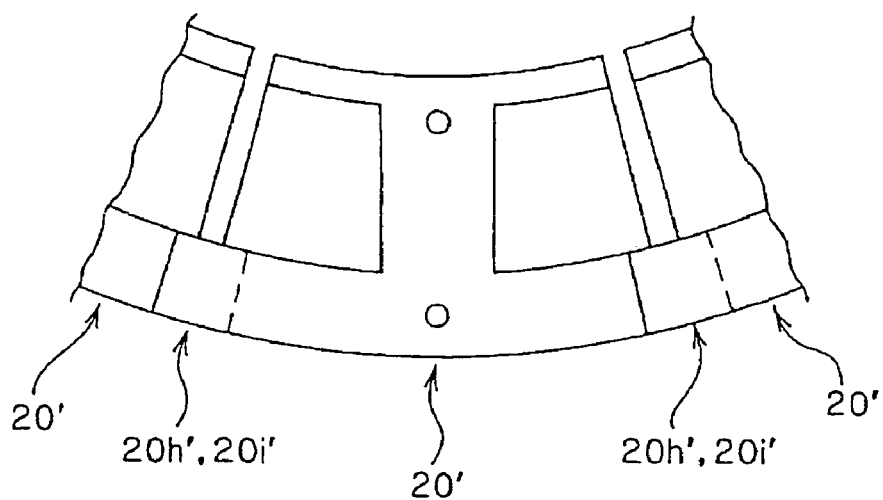
FIGS. 39A and 39B are a partial plan view and a partial cross-sectional view of an intermediate assembly illustrating a coupling state of the inner yoke-attachment laminated magnetic sub-body shown in FIG. 37, respectively.
Figure 39B:
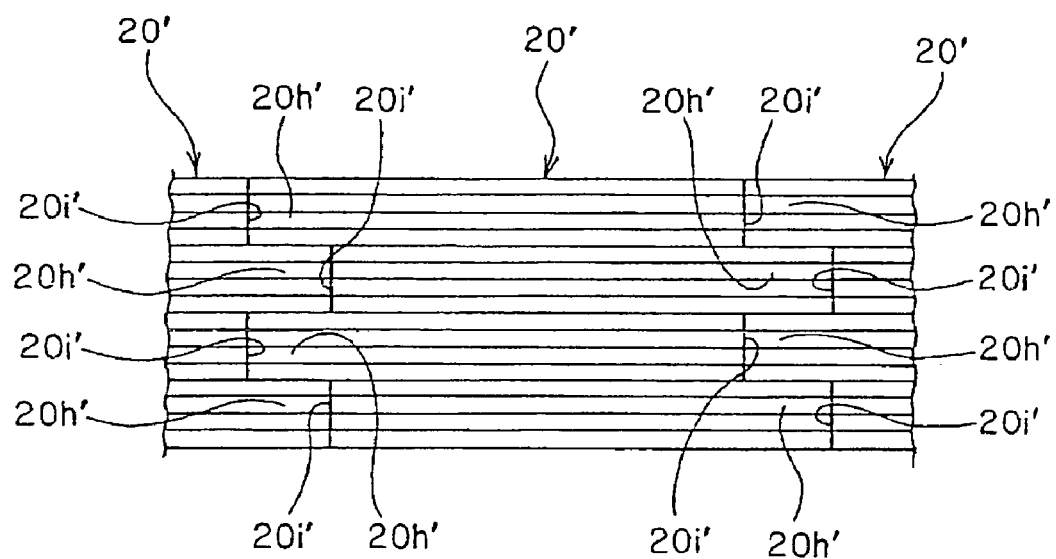

FIGS. 37 to 39 show another example of the laminated magnetic body constituting the laminated stator core. Here, the laminated magnetic body 20' has a magnetic pole portion 20t' and an inner yoke sub-portion 20y' and a convex engagement portion 20h' and a concave engagement portion 20i' are formed at both ends of the inner yoke sub-portion 20y'.

As shown in FIG. 38A, the laminated magnetic body 20' is formed by laminating and coupling a predetermined number of magnetic core pieces 21A' and magnetic core pieces 21B' formed by punching a band-shaped steel plate (metal plate) W, that is, magnetic core pieces 21A' and magnetic core pieces 21B' in which the lateral lengths of the inner yoke sub-portions 21Ay' and 21By' from the magnetic pole portions 21At' and 21Bt' are different from each other as shown in FIGS. 38B and 38C, in a caulking manner by the use of machining stations S1 and S2 of a transfer press.

As described above, in the state that the intermediate assembly 30 (see FIG. 34) is formed by a predetermined number of laminated magnetic bodies 20', the laminated magnetic bodies 20' can be strongly connected to each other, as shown in FIG. 39, by inserting the convex engagement portion 20h' of a laminated magnetic body 20' into the concave engagement portion 20i' of the laminated magnetic body 20' adjacent thereto. Accordingly, it is possible to greatly enhance the mechanical strength of the laminated stator core and to maintain the shaping precision of the laminated stator core.

In the above-mentioned embodiments, the laminated stator core including the laminated yoke body having a ring shape and the twelve laminated magnetic bodies is exemplified. However, the present invention is not limited to the manufacturing the above-mentioned laminated stator core, but may apply effectively to methods of manufacturing laminated stator cores having various structures.

Seventh Embodiment

FIGS. 40 to 46 show a method of manufacturing a laminated stator core according to a seventh embodiment of the present invention. The laminated stator core 1 manufactured according to the seventh embodiment includes an outer laminated yoke body 10 having a ring shape and a predetermined number (twelve in the seventh embodiment) of inner yoke-attachment laminated magnetic sub-bodies 20, 20, . . . coupled to the inner circumference of the outer laminated yoke body 10.

The outer laminated yoke body 10 (hereinafter, referred to as the laminated yoke body 10) has a cylinder shape constituting the outer circumference of a yoke portion in the laminated stator core 1. The laminated yoke body is manufactured by winding and laminating band-shaped yoke core sub-pieces 11, which are formed by punching a band-shaped steel plate (metal plate), in a spiral shape and coupling them to each other in a caulking manner (caulking lamination) as described later. A predetermined number (twelve in the seventh embodiment) of concave connection portions 11a, 11a, . . . are formed in the inner circumferential edge of the laminated yoke body 10.

Arc-shaped caulking portions 11c, 11c, . . . to be described later are formed in the band-shaped yoke core sub-pieces 11 (referred to as yoke core pieces 11) and the laminated yoke core pieces 11 are coupled to each other through the use of the caulking portions 11c, 11c, . . . in a caulking manner.

On the other hand, each inner yoke-attachment laminated magnetic sub-body 20 (hereinafter, referred to as laminated magnetic body 20) has an inner yoke sub-portion 20y, which is formed by dividing the inner half in a unit of magnetic pole when the yoke portion of the laminated yoke body 10 is divided into two halves in the width direction, and a magnetic pole portion 20t protruded from the inner yoke sub-portion 20y. A convex connection portion 21a is formed at the backside of the inner yoke sub-portion 20y (hereinafter, referred to as yoke sub-portion 20y).

As described later, the laminated magnetic-pole body 10 is constructed by laminating and coupling a predetermined number of inner yoke-attachment magnetic core sub-pieces 21, 21, . . . , which is formed by punching a band-shaped steel plate (metal plate), to each other in a caulking manner (caulking lamination). Reference numeral 21c in the figures denotes a caulking portion formed in each inner yoke-attachment magnetic core sub-piece 21 (hereinafter, referred to as magnetic core piece 21).

By connecting a predetermined number of laminated magnetic bodies 20, 20, . . . , which are arranged in a ring shape in the inner circumference of the laminated yoke body 10, to each other, the laminated stator core 1 having a predetermined shape is manufactured in which a predetermined number of magnetic pole portions are protruded in the inner radius direction of the yoke portion.

The method of manufacturing the laminated stator core according to the present invention will be now described in detail by exemplifying a procedure of manufacturing the laminated stator core 1.

Figure 42A:
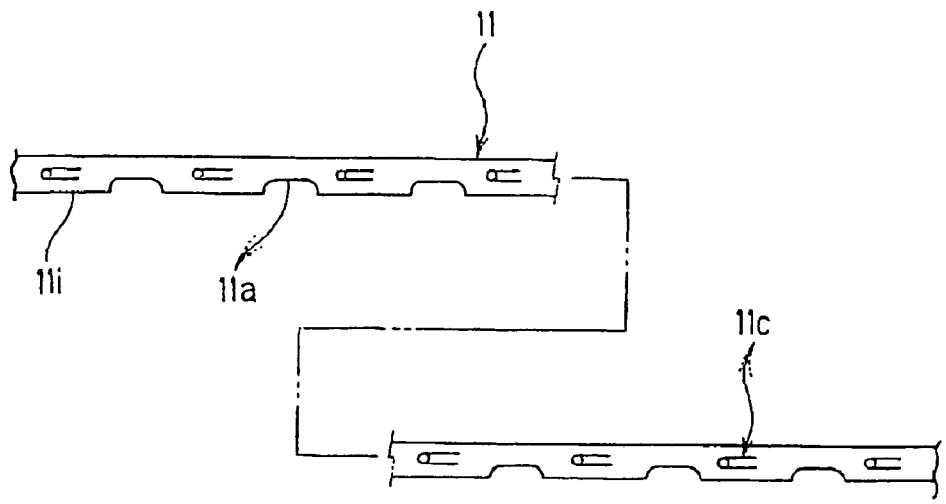
FIGS. 42A and 42B are conceptual diagrams illustrating a procedure of manufacturing the outer laminated yoke body of the laminated stator core shown in FIG. 40.

First, as shown in FIG. 42A, the yoke core pieces 11 are formed by punching a band-shaped steel plate (metal plate) not shown.

The yoke core pieces 11 have a shape that the outer half is developed in a straight line when the yoke portion of the laminated stator core 1 is divided into two halves in the width direction, that is, a band shape extending straightly with a small width. Caulking portions 11c, 11c, . . . are arranged with a predetermined pitch in the central area in the width direction of the yoke core pieces 11. Concave connection portions 11a, 11a, . . . are arranged with a predetermined pitch in the inner circumferential edge 11i thereof, that is, in the portion constituting the inner circumference of the laminated yoke body 10 (see FIG. 41) when the yoke core pieces are wound in the subsequent process.

Here, the pitch of the caulking portions 11c, 11c, . . . is set so that the caulking portions 11c are overlapped with each other when the yoke core pieces 11 are wound and laminated in a spiral shape in the subsequent process. Similarly, the pitch of the concave connection portions 11a, 11a, . . . is set so that the concave connection portions 11a are overlapped with each other when the yoke core pieces 11 are wound and laminated in a spiral shape in the subsequent process.

Figure 40A:
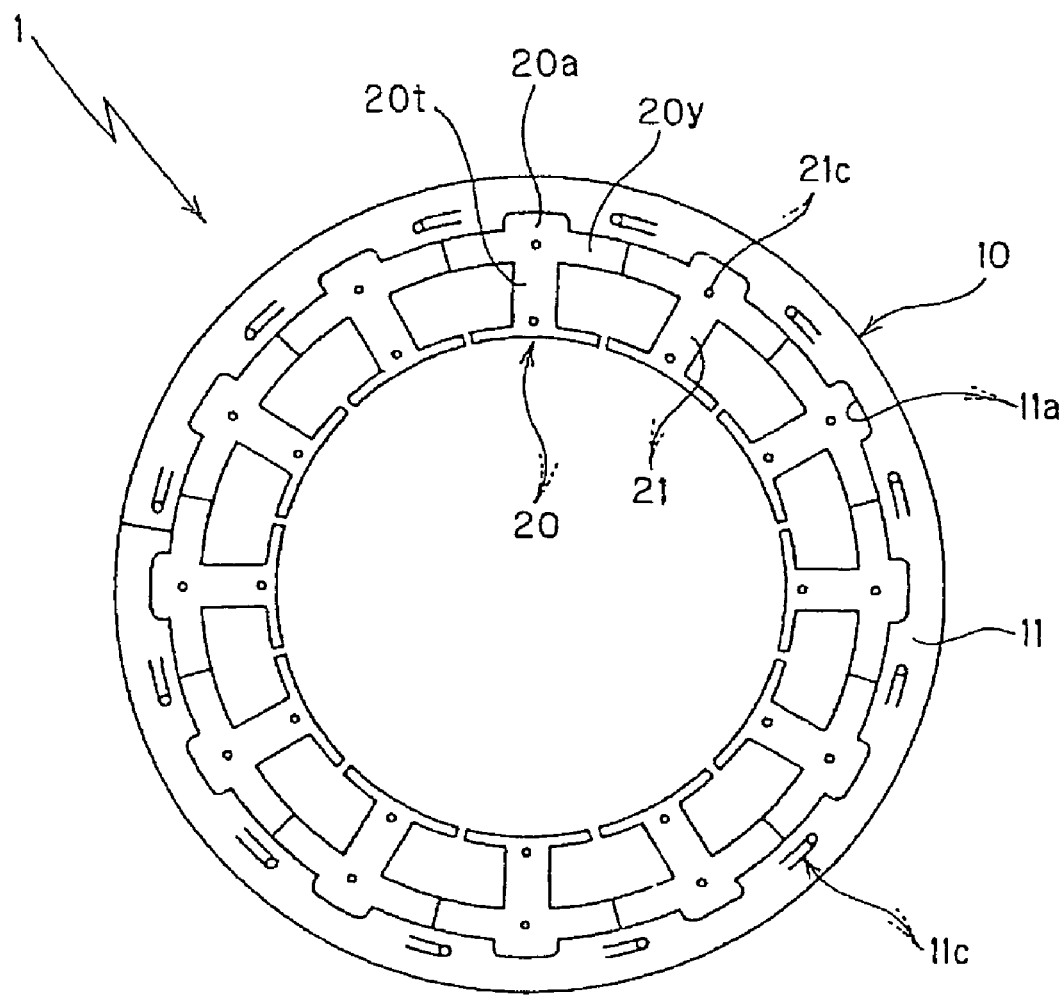
FIGS. 40A and 40B are an entire plan view and an entire side view illustrating an example of a laminated stator core manufactured by the use of the method according to the present invention, respectively.
Figure 40B:
Figure 41A:
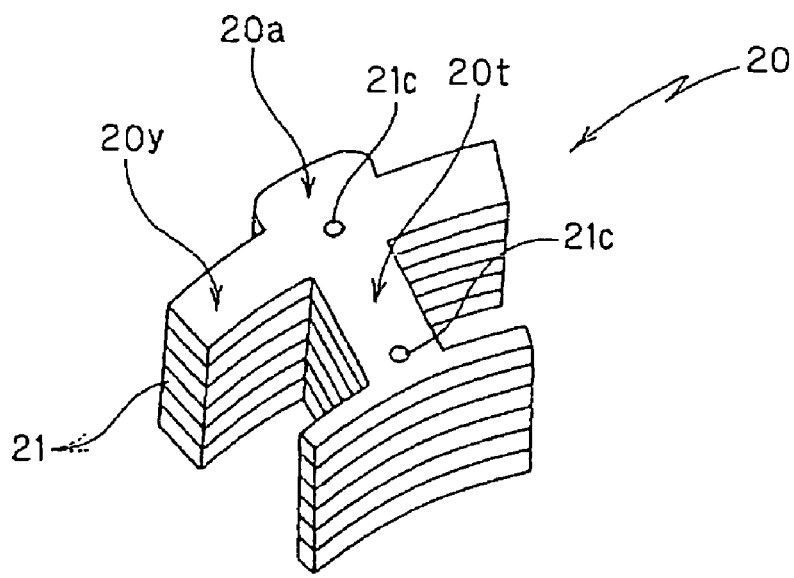
FIGS. 41A and 41B are perspective views illustrating appearances of an inner yoke-attachment laminated magnetic sub-body and an outer laminated yoke body constituting the laminated stator core shown in FIG. 40.
Figure 43A:
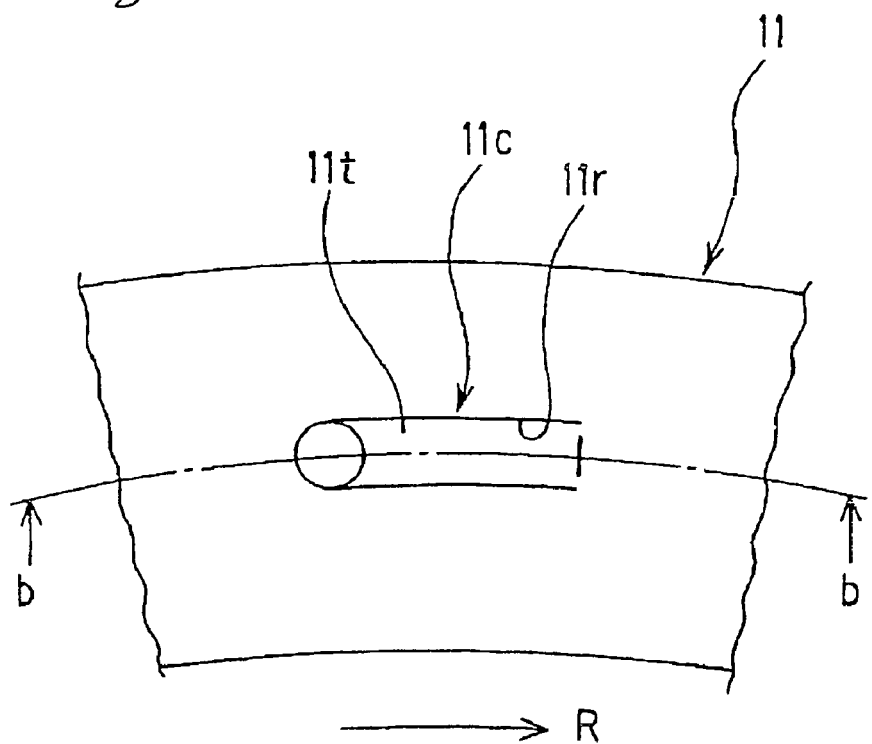
FIGS. 43A and 43B are a partial plan view and a partial cross-sectional view illustrating the caulking portion of a band-shaped yoke core sub-piece, respectively.
Figure 43B:
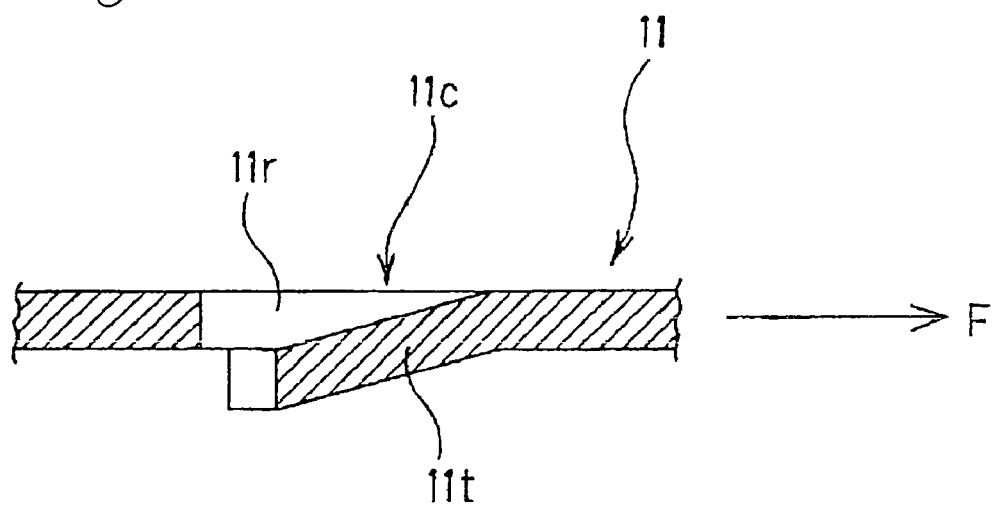

The caulking portions 11c have a plane shape curved in the winding direction (arrow direction R) shown in FIG. 43, that is, in the direction in which the yoke core pieces 11 are wound in the subsequent process, more specifically, in the circumference direction in which the caulking portions 11c, 11c, . . . are arranged in the completed laminated yoke body 10 (see FIGS. 40 and 41).

Each caulking portion 11c has a caulking tongue 11t protruded downwardly by means of a half blanking and a caulking groove 11r formed at the back side of the caulking tongue 11t, as shown in FIG. 43. The caulking tongue 11t is tilted downwardly in the direction opposite to the winding direction (arrow direction F) when the yoke core pieces 11 are wound in the subsequent process.

After forming the band-shaped yoke core piece 11 by punching a band-shaped steel plate (metal plate), the band-shaped yoke core piece 11 is taken into a manufacturing apparatus (not shown). Then, as shown in FIG. 42B, the laminated yoke body 10 (see FIG. 41B) is formed by winding and laminating the band-shaped yoke core piece 11 in a spiral shape and coupling the laminated band-shaped yoke core piece by the use of the caulking portions 11c, 11c, . . . in a caulking manner.

Figure 41B:
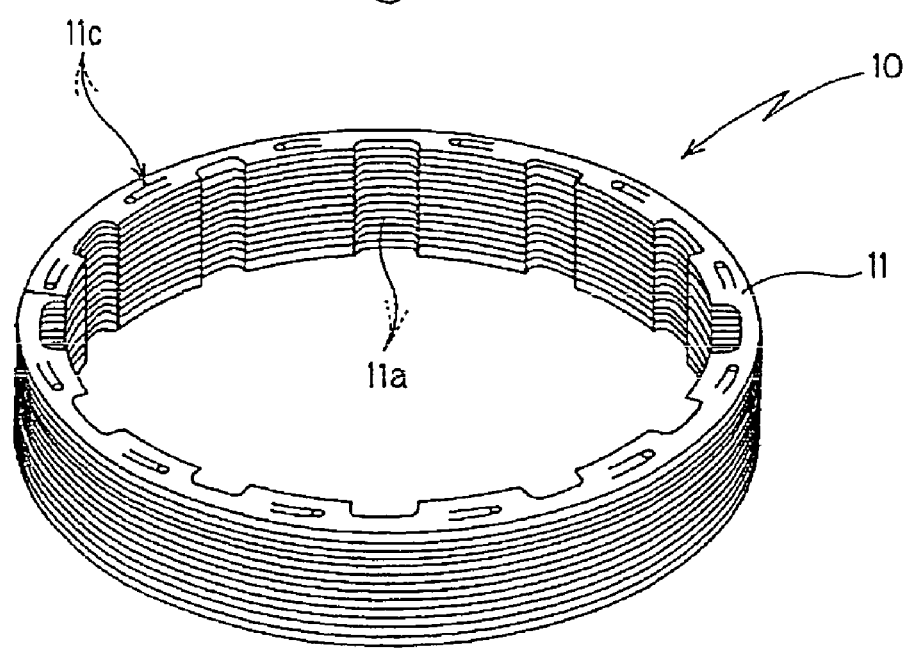
Figure 42B:
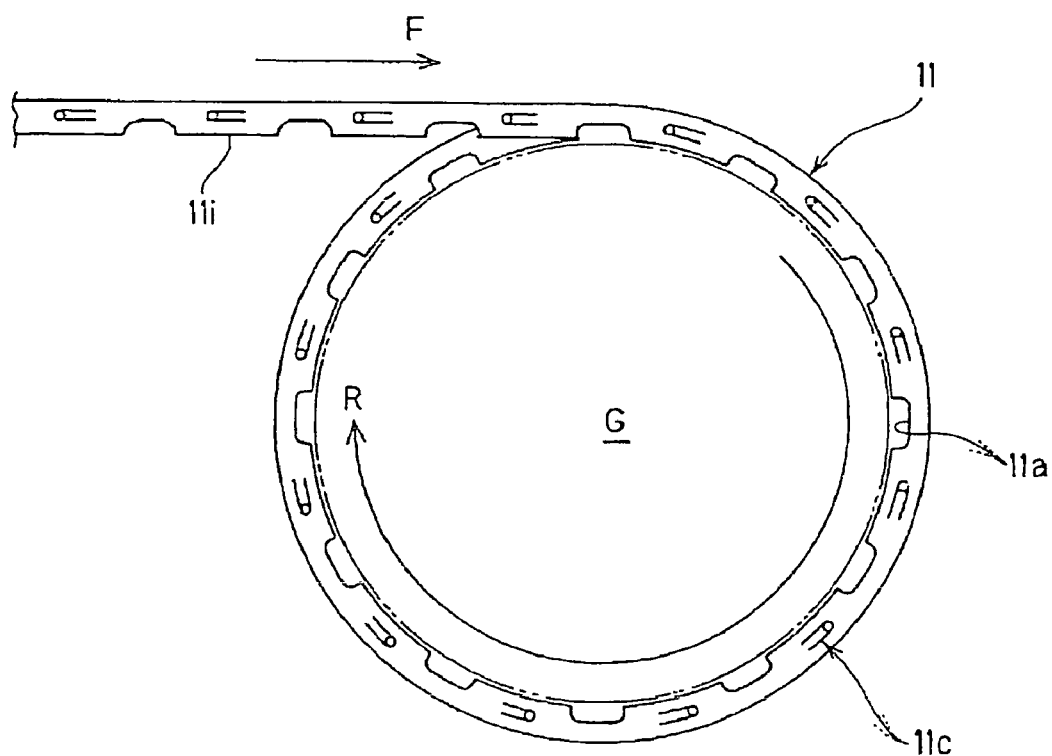

Specifically, the laminated yoke body 10 is manufactured, as shown in FIG. 41B, by suspending one end of the band-shaped yoke core piece 11 on a winding guide G of the manufacturing apparatus, winding the band-shaped yoke core piece 11 around the winding guide G rotating in the arrow direction R while taking the band-shaped yoke core piece 11 into the winding guide G in the arrow direction F, and coupling the laminated band-shaped yoke core piece 11 by the use of the caulking portions 11c, 11c, . . . in a caulking manner.

Here, since the band-shaped yoke core piece 11 constituting the laminated yoke body 10 has a band shape with a small width as described above and the concave connection portions 11a, 11a, . . . are formed in the inner circumferential edge 11i thereof, bending processability thereof is very excellent. Accordingly, it is possible to form the laminated yoke body 10, in which the band-shaped yoke core piece 11 is wound, in a circular shape.

As shown in FIGS. 41 and 42, by forming the edges of the concave connection portion 11a of the yoke core piece 11 into a round shape, it is possible to further enhance the bending processability (winding formability).

By locally pressing the outer circumference of the yoke core piece 11 and stretching it in the longitudinal direction when winding the yoke core piece 11, it is possible to further enhance the bending processability at the time of winding.

By arranging the arc-shaped caulking portions 11c formed in the band-shaped yoke core piece 11 in a plane shape curved in the winding direction (arrow direction R), the caulking tongues 11t of the arc-shaped caulking portions 11c in an upper layer are inserted into the caulking grooves 11r of the arc-shaped caulking portions 11c in a lower layer so as to induce the winding of the band-shaped yoke core piece 11 at the time of winding and laminating the band-shaped yoke core piece 11 in a spiral shape. Accordingly, the shaping property of the band-shaped yoke core piece 11 at the time of winding is enhanced and it is thus possible to form the laminated yoke body 10 in a circular shape.

The caulking tongues 11t of the arc-shaped caulking portions 11c are tilted downwardly in the direction opposite to the winding direction (arrow direction F) of the band-shaped yoke core piece 11. Accordingly, when the band-shaped yoke core piece 11 is wound in a spiral shape and laminated in a caulking manner, the caulking tongues 11t in an upper layer are slowly inserted into the caulking grooves 11r in a lower layer from the base end to the front end and the entire caulking tongues 11t are completely inserted into the caulking grooves 11r. As a result, it is possible to form the laminated yoke body 10 having a large coupling strength.

Figure 44A:
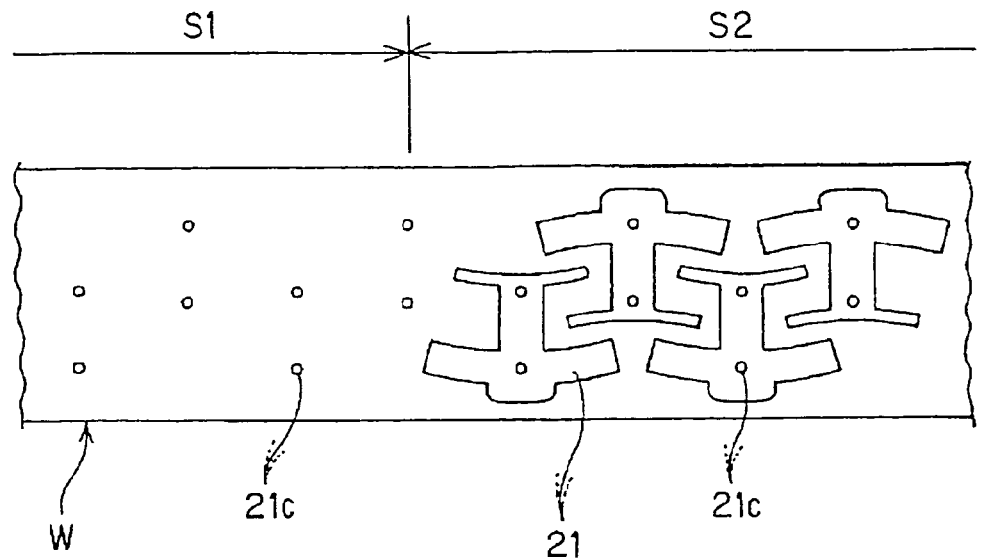
FIGS. 44A, 44B and 44C are conceptual diagrams illustrating a procedure of manufacturing the inner yoke-attachment laminated magnetic sub-body of the laminated stator core shown in FIG. 40.
Figure 44B:
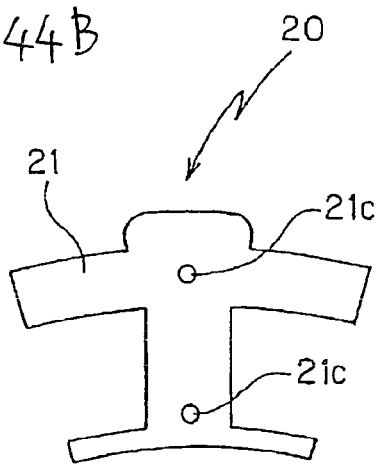

On the other hand, as shown in FIG. 44A, the laminated magnetic body 20 is formed from a band-shaped steel plate (metal plate) W by the use of machining stations S1 and S2 of a transfer press (not shown). That is, the caulking portions 21c are formed by use of the machining station S1 and the laminated magnetic body 20 (see FIG. 44B) is manufactured by shaping and laminating the magnetic core pieces 21 in a caulking manner by the use of the machining station S2. The procedure of manufacturing the laminated magnetic body 20 by the use of the transfer press is not limited to the above-mentioned embodiment, but may be set up properly.

Here, since the laminated magnetic body 20 is formed by laminating the magnetic core pieces 21, 21, . . . in a caulking manner as described above, the laminated magnetic body 20 is manufactured without departure between the laminated magnetic core pieces 21. Accordingly, the laminated stator core 1 in which the laminated magnetic bodies 20 are coupled to the laminated yoke body 10 has very excellent shaping precision.

Since the laminated magnetic bodies 20 are formed independently of the laminated yoke body 10, the yield of forming the magnetic core pieces 21, 21, . . . out of an electromagnetic steel plate (metal plate) W is enhanced. Therefore, it is possible to prevent increase in manufacturing cost.

Figure 44C:
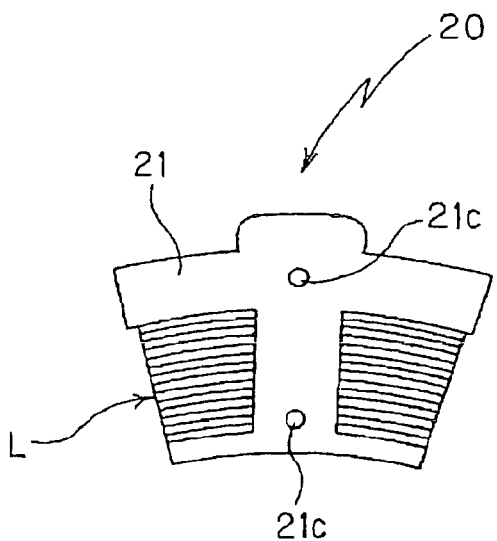

After manufacturing the laminated magnetic bodies 20 as described above, coils L are wound around the laminated magnetic bodies 20 by the use of a specific apparatus (not shown) as shown in FIG. 44C. As well as directly winding the coils L around the laminated magnetic bodies 20, a bobbin (not shown) on which the coils L are wound may be mounted on the laminated magnetic bodies 20 in an additional process.

Here, since the laminated magnetic bodies 20 are separated from the laminated yoke body 10 at the time of winding the coils L around the laminated magnetic bodies 20, the winding work of the coils L around the laminated magnetic bodies 20 is very easy. Accordingly, it is possible to wind the coils L with a high density and an excellent proportion.

Figure 45:
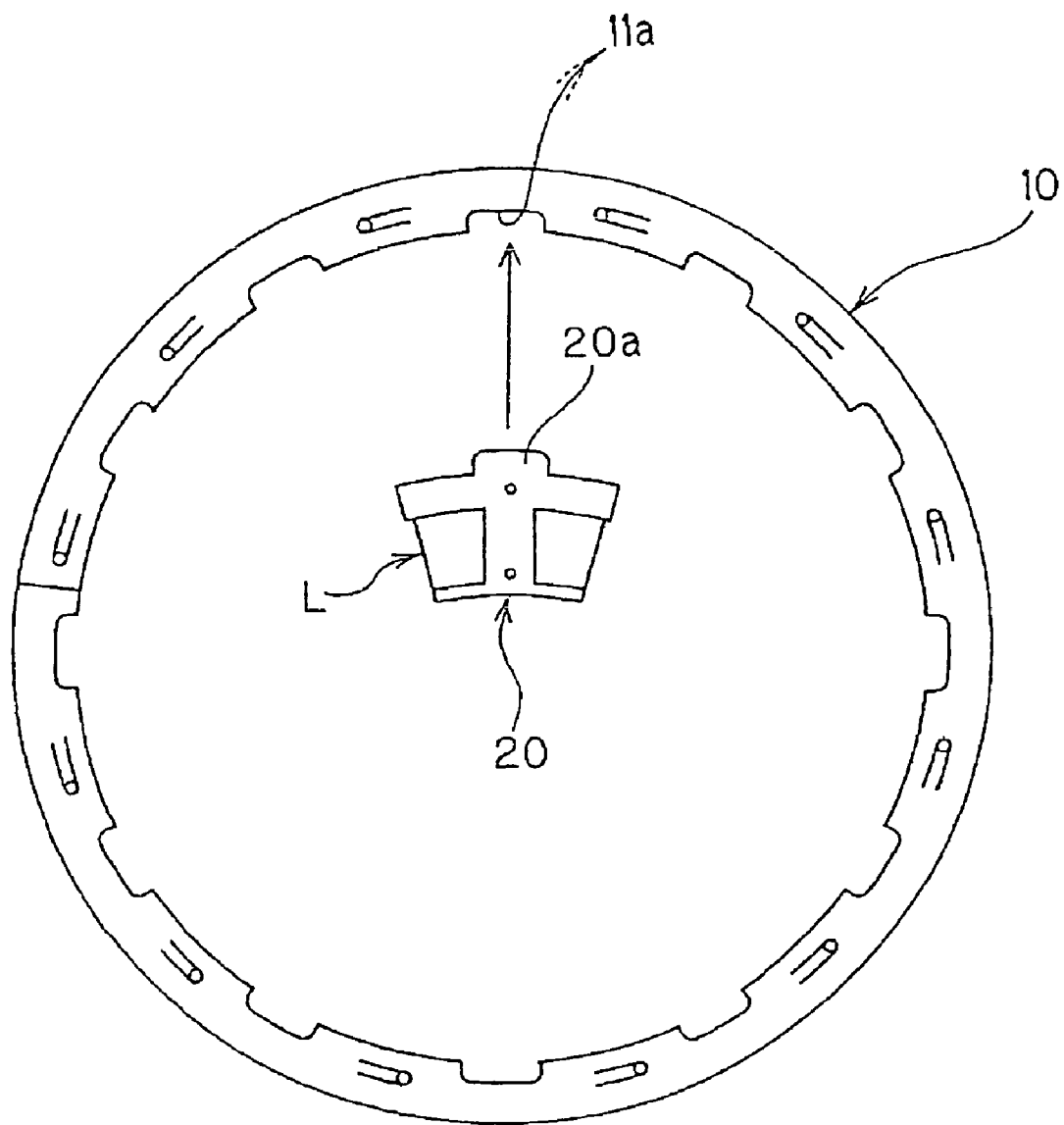
FIG. 45 is a conceptual diagram illustrating a manufacturing procedure according to the present invention.

After completing the winding of the coils L on a predetermined number of laminated magnetic bodies 20, the laminated magnetic bodies 20 are coupled to the laminated core body 10 by inserting the convex connection portions 21a of the laminated magnetic bodies 20 into the concave connection portions 11a of the laminated yoke body 10 along the diameter direction of the laminated yoke body 10, as shown in FIG. 45.

Figure 46:
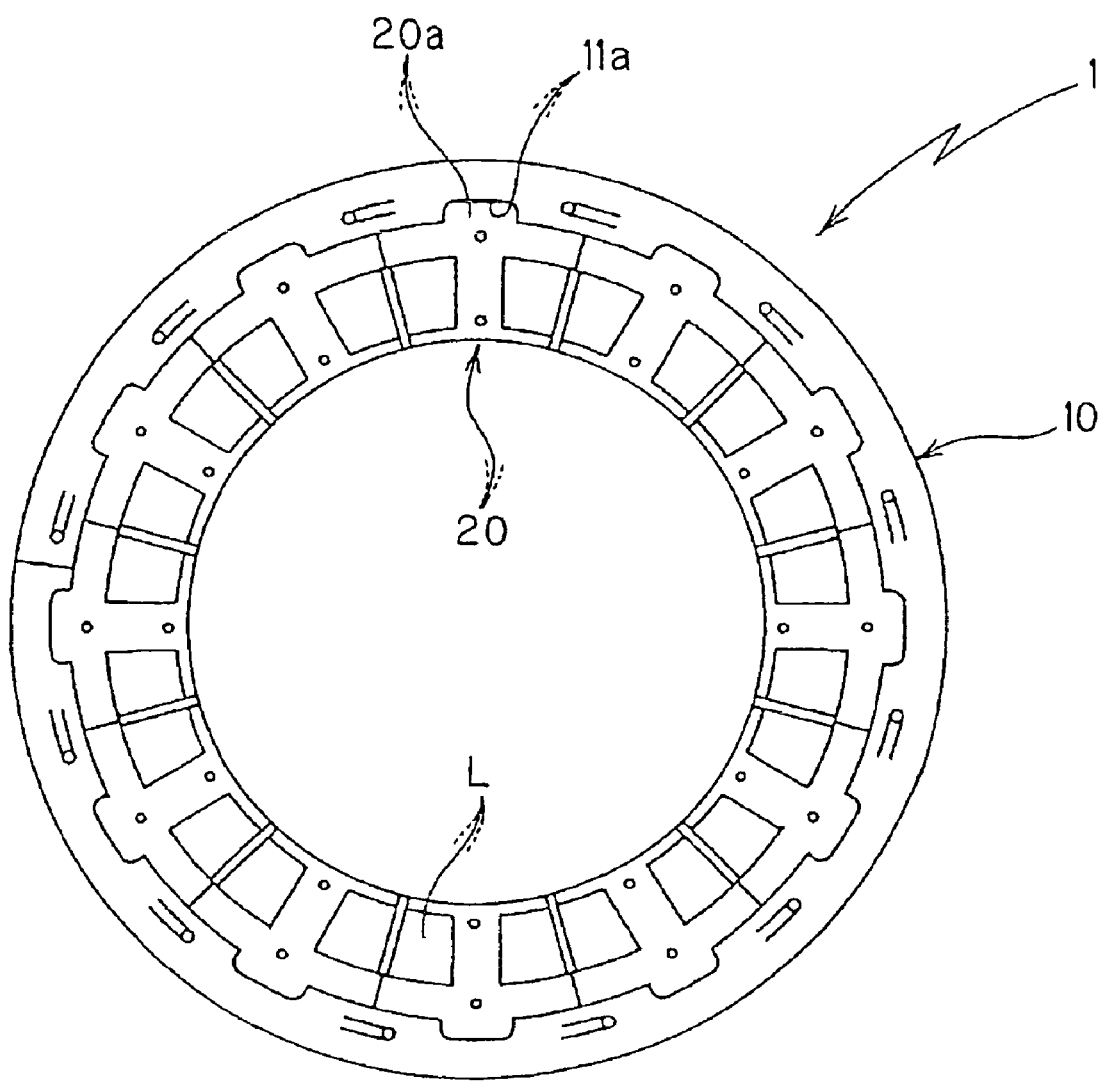
FIG. 46 is a conceptual diagram illustrating a manufacturing procedure according to the present invention.

As described above, by inserting the convex connection portions 21a of the laminated magnetic bodies 20 into the concave connection portions 11a of the laminated yoke body 10 and coupling the laminated yoke body 10 and the laminated magnetic bodies 20 to each other, the laminated stator core 1 having a predetermined shape is manufactured and a stator of an electric motor is completed in which the coils L are wound on the laminated magnetic bodies 20, 20, . . . of the laminated stator core 1, as shown in FIG. 46.

Here, since the laminated yoke body 10 and the respective laminated magnetic bodies 20, 20, . . . are strongly and satisfactorily coupled to each other by inserting the convex connection portions 21a of the laminated magnetic bodies 20 into the concave connection portions 11a of the laminated yoke body 10, the shaping precision of the laminated stator core is very excellent.

In this way, by the use of the method of manufacturing a laminated stator core according to the present invention, it is possible to manufacture a laminated stator core 1 excellent in material yield, shaping precision, and electrical characteristic.

Figure 47:
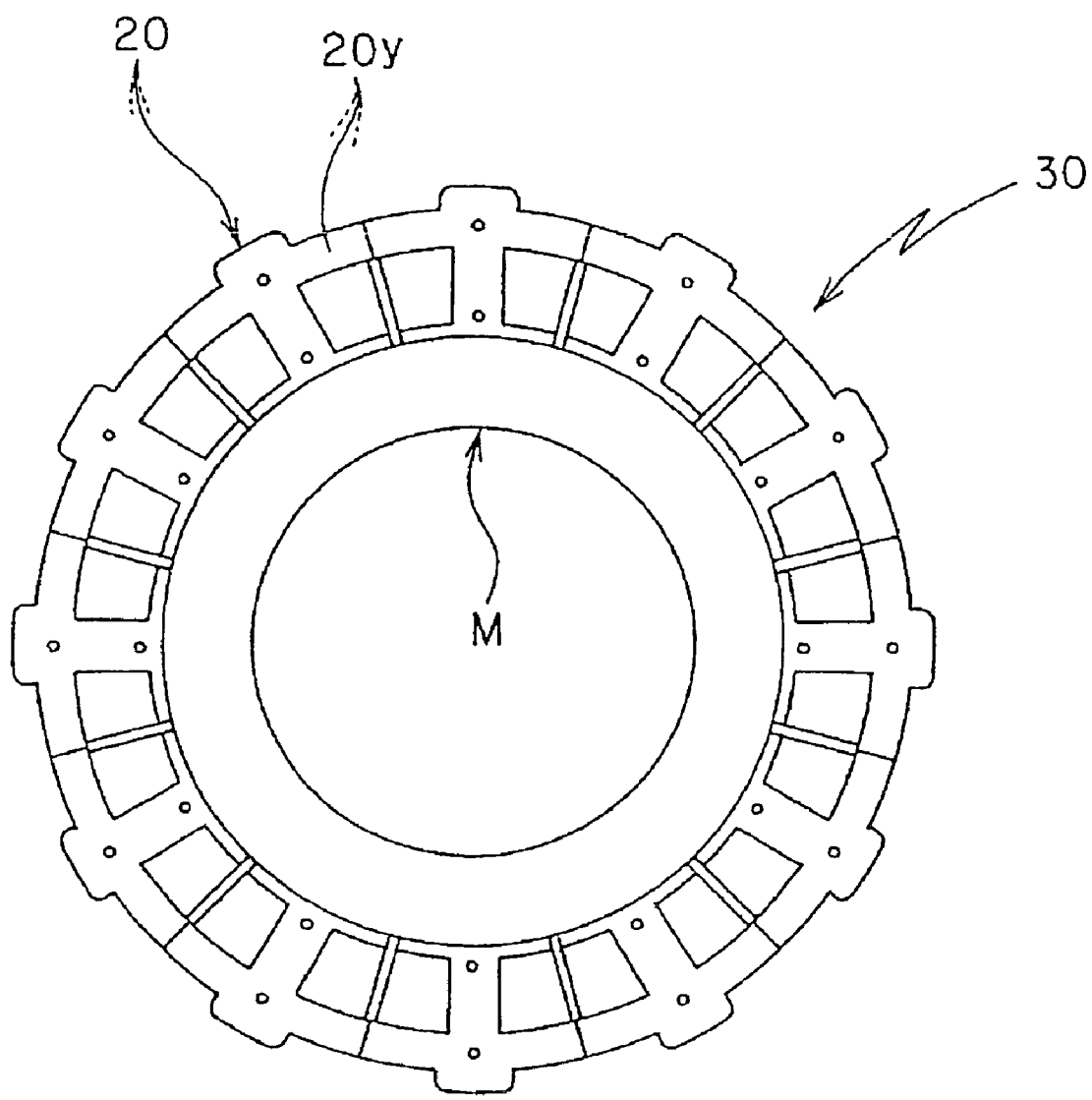
FIG. 47 is a conceptual diagram illustrating a manufacturing procedure according to the present invention.

On the other hand, after completing the winding of the coils L on the respective laminated magnetic bodies 20, an intermediate assembly 30 in which the yoke sub-portions 20y, 20y, . . . form a ring shape is formed, as shown in FIG. 47, by arranging a predetermined number of laminated magnetic bodies 20 around a ring-shaped electromagnet (magnetic adsorptive supporting means) M and connecting the ends of the inner yoke sub-portions 20y (hereinafter, referred to as yoke sub-portions 20y) to each other.

At this time, the laminated magnetic bodies 20, 20, . . . arranged around the electromagnet M are temporarily held in a ring shape very easily with the magnetic adsorptive force from the inner circumference resulting from the electromagnet M.

Figure 48:
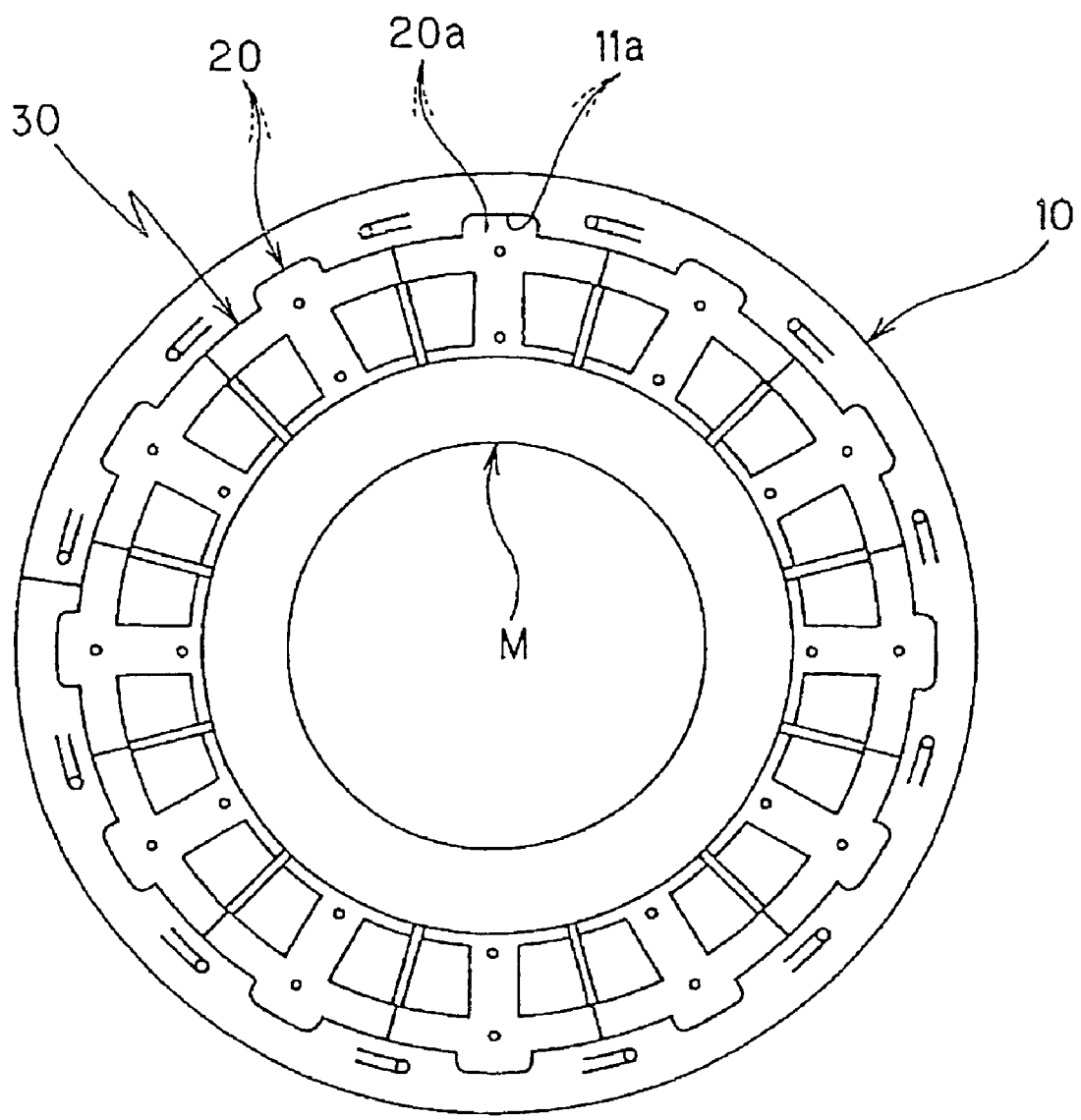
FIG. 48 is a conceptual diagram illustrating a manufacturing procedure according to the present invention.

As described above, the laminated magnetic bodies 20, 20, . . . and the laminated yoke body 10 are coupled to each other, by shrink-fitting the laminated yoke body 10 to the outer circumference of the intermediate assembly 30 and inserting the convex connection portions 21a of the laminated magnetic bodies 20 into the concave connection portions 11a of the laminated yoke body, as shown in FIG. 48, after forming the intermediate assembly 30 including a predetermined number of laminated magnetic bodies 20, 20, . . . .

At this time, since the intermediate assembly 30 is formed in which the predetermined number of laminated magnetic bodies 20, 20, . . . are temporarily held from the inner circumference by the electromagnet M, it is possible to very easily shrink-fit the laminated yoke body 10 to the outer circumference of the intermediate assembly 30.

As described above, by shrink-fitting the laminated yoke body 10 to the outer circumference of the intermediate assembly 30 and then separating the electromagnet M therefrom, the laminated stator core 1 having a predetermined shape is manufactured and a stator of an electric motor is completed in which the coils L are wound on the laminated magnetic bodies 20, 20, . . . of the laminated stator core 1, as shown in FIG. 7.

Here, since the laminated yoke body 10 and the intermediate assembly 30, that is, a predetermined number of laminated magnetic bodies 20, 20, . . . , are strongly and satisfactorily coupled to each other by shrink-fitting, the shaping precision of the laminated stator core is very excellent.

In addition, since the laminated yoke body 10 and the respective laminated magnetic bodies 20, 20, . . . are strongly and satisfactorily coupled to each other by inserting the convex connection portions 21a of the laminated magnetic bodies 20 into the concave connection portions 11a of the laminated yoke body 10, the shaping precision of the laminated stator core is more excellent.

In this way, by the use of the method of manufacturing a laminated stator core according to the present invention, it is possible to manufacture a laminated stator core 1 excellent in material yield, shaping precision, and electrical characteristic.

Figure 49A:
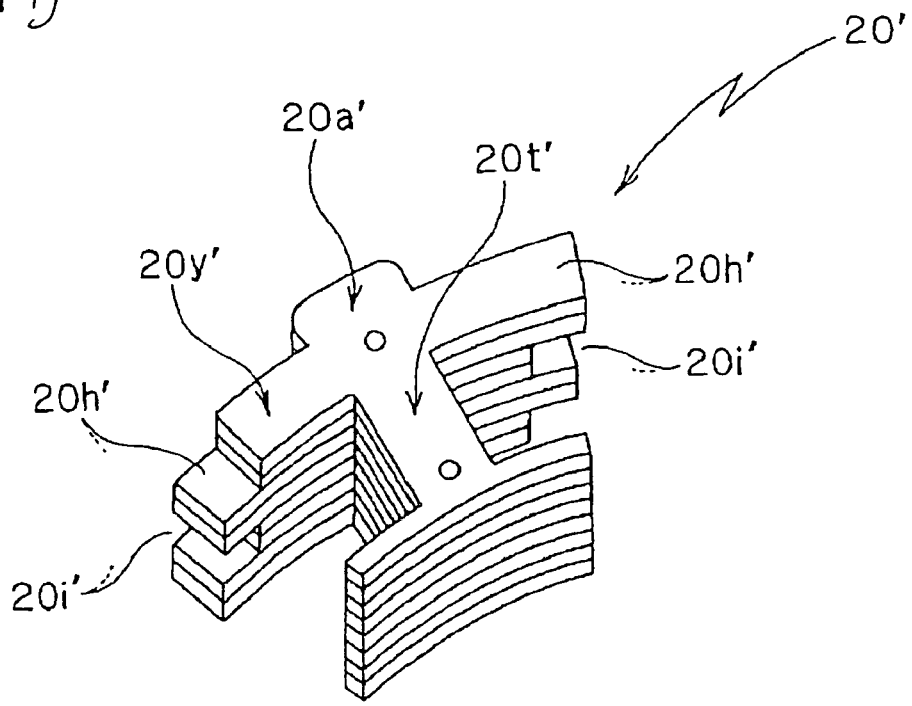
FIGS. 49A and 49B are a perspective view illustrating another example of the inner yoke-attachment laminated magnetic sub-body and a plan view illustrating a state that a coil is wound thereon, respectively.
Figure 49B:
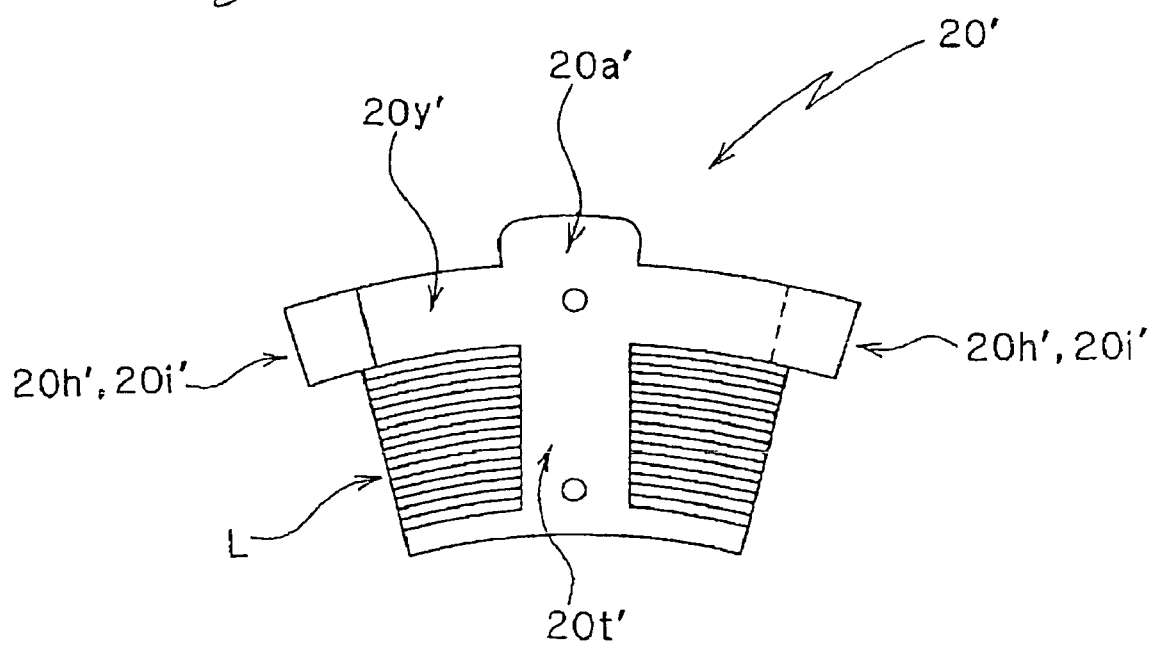
Figure 50A:
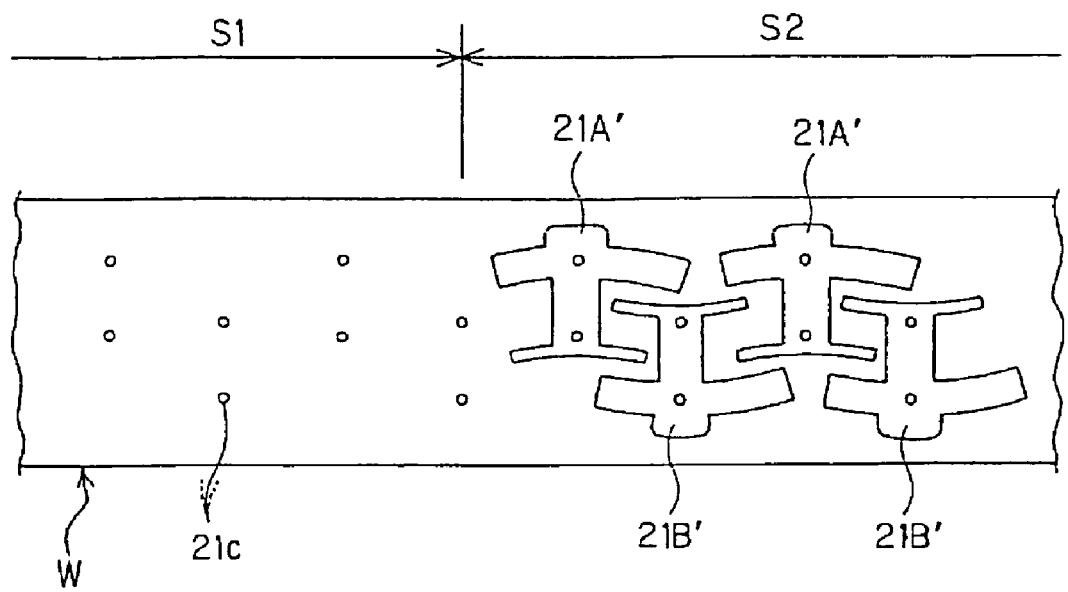
FIGS. 50A, 50B, and 50C are plan views illustrating a procedure of forming inner yoke-attachment magnetic core sub-pieces constituting the inner yoke-attachment laminated magnetic sub-body shown in FIG. 49 and illustrating two kinds of inner yoke-attachment magnetic core sub-pieces.
Figure 50B:
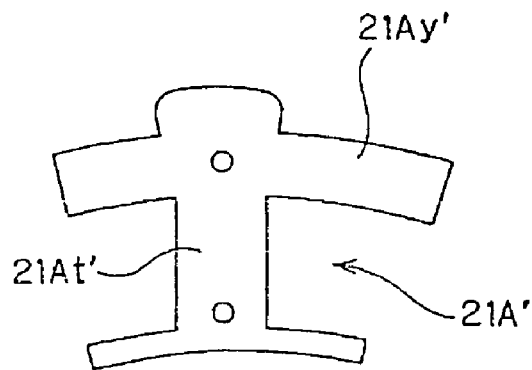
Figure 50C:
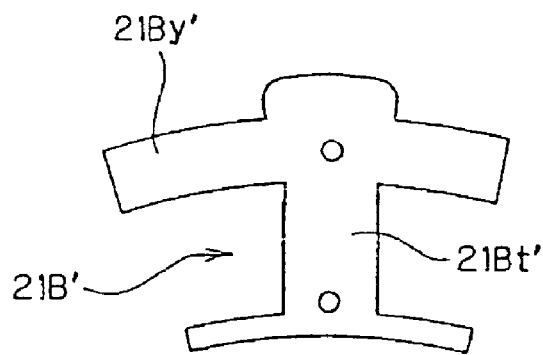
Figure 51A:
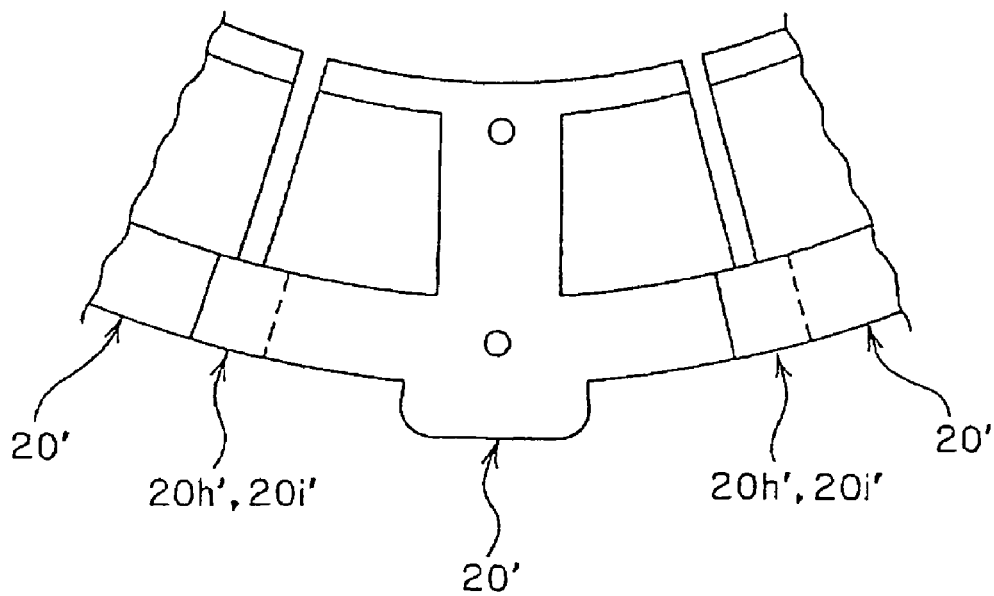
FIGS. 51A and 51B are a partial plan view and a partial cross-sectional view of an intermediate assembly illustrating a coupling state of the inner yoke-attachment laminated magnetic sub-body shown in FIG. 10, respectively.
Figure 51B:
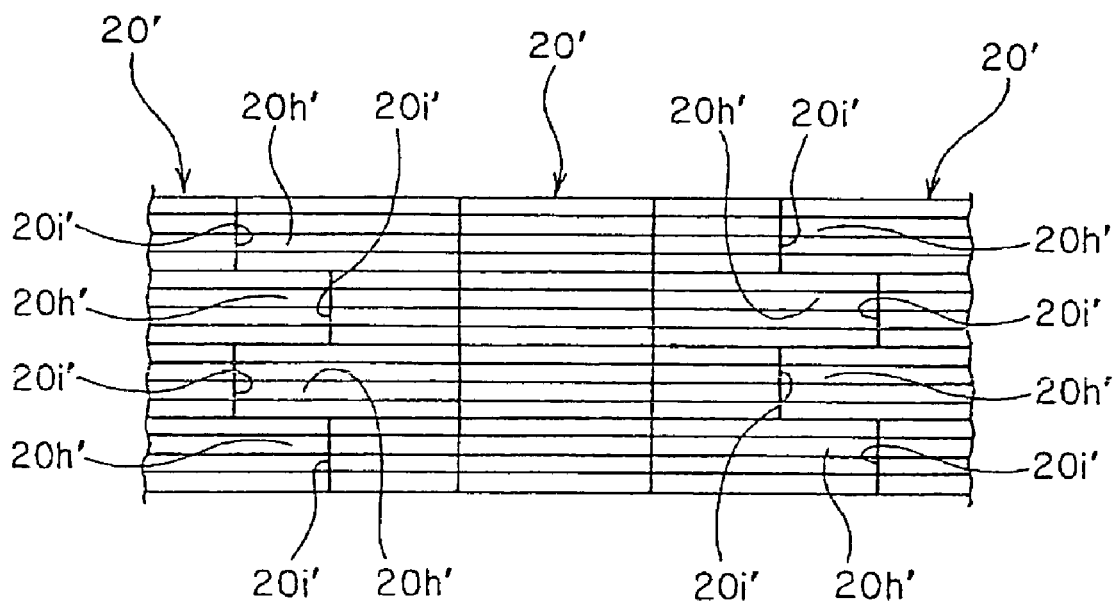

FIGS. 49 to 51 show another example of the laminated magnetic body constituting the laminated stator core. Here, the laminated magnetic body 20' has a magnetic pole portion 20t', an inner yoke sub-portion 20y', a convex connection portion 21a' and a convex engagement portion 20h' and a concave engagement portion 20i' are formed at both ends of the inner yoke sub-portion 20y'.

As shown in FIG. 50A, the laminated magnetic body 20' is formed by laminating and coupling a predetermined number of magnetic core pieces 21A' and magnetic core pieces 21B' formed by punching a band-shaped steel plate (metal plate) W, that is, magnetic core pieces 21A' and magnetic core pieces 21B' in which the lateral lengths of the inner yoke sub-portions 21Ay' and 21By' from the magnetic pole portions 21At' and 21Bt' are different from each other as shown in FIGS. 50B and 50C, in a caulking manner by the use of machining stations S1 and S2 of a transfer press.

As described above, in the state that a predetermined number of laminated magnetic bodies 20' are arranged in a ring shape in the inner circumference of the laminated yoke body 10 (see FIG. 46), or in the state that the intermediate assembly 30 (see FIG. 47) is formed by a predetermined number of laminated magnetic bodies 20', the laminated magnetic bodies 20' can be strongly connected to each other, as shown in FIG. 51, by inserting the convex engagement portion 20h' of a laminated magnetic body 20' into the concave engagement portion 20i' of the laminated magnetic body 20' adjacent thereto. Accordingly, it is possible to greatly enhance the mechanical strength of the laminated stator core and to maintain the shaping precision of the laminated stator core.

In the above-mentioned embodiments, the laminated stator core including the laminated yoke body having a ring shape and the twelve laminated magnetic bodies is exemplified. However, the present invention is not limited to the manufacturing the above-mentioned laminated stator core, but may apply effectively to methods of manufacturing laminated stator cores having various structures.

Eighth Embodiment

FIGS. 52 to 56 show a method of manufacturing a laminated rotor core according to an eighth embodiment. The laminated rotor core 1 manufactured according to the eighth embodiment is an element constituting a magnet-attached rotor 100 (see FIG. 56) and has a ring shape including a rotation shaft fitting hole (shaft hole) 10 at the center thereof. Magnet fitting holes 1M, 1M, . . . are arranged all around the outer circumference thereof.

The laminated rotor core 1 is manufactured by winding and laminating a band-shaped core piece 10, which is formed by punching a metal plate as described later, in a spiral shape and coupling the laminated band-shaped core piece in a caulking manner. Reference numeral 10c in the figures denotes a caulking portion formed in the band-shaped core piece 10.

Reference numerals 10p, 10p, . . . in the figures denote pressed portions formed when winding the band-shaped core piece 10 as described later and reference numerals 10n, 10n, . . . in the figures denote cut portions closed when winding the band-shaped core piece 10 as described later.

Now, a method of manufacturing a laminated rotor core according to an embodiment of the present invention will be described in detail by exemplifying the above-mentioned laminated rotor core 1.

Figure 53A:
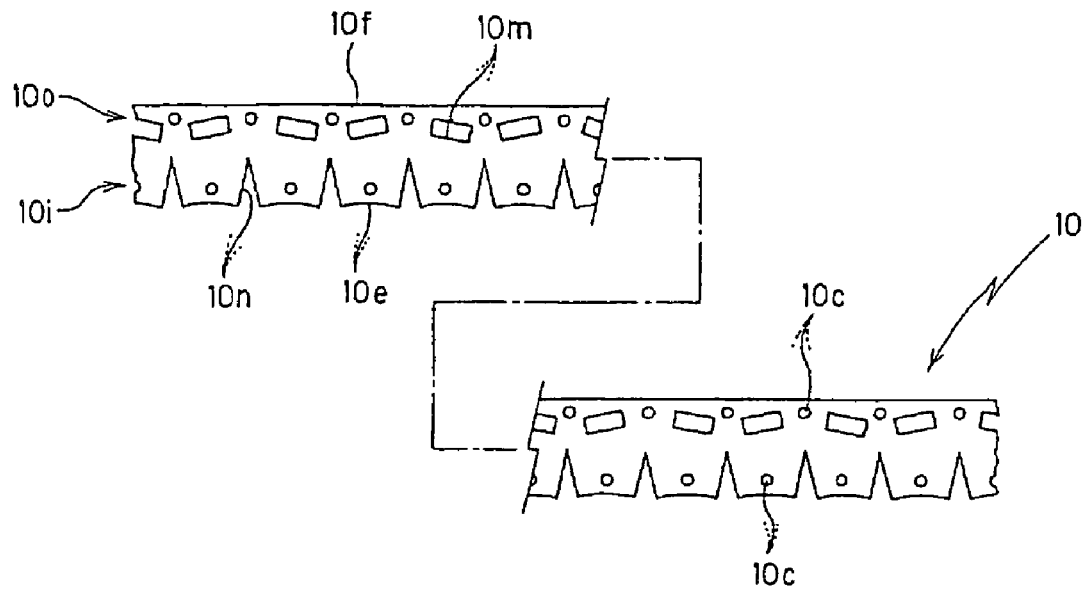
FIGS. 53A and 53B are conceptual diagrams illustrating a procedure of manufacturing the laminated rotor core shown in FIG. 52.

First, as shown in FIG. 53A, the band-shaped core piece 10 is formed by punching a metal plate not shown.

The band-shaped core piece 10 has a shape that the laminated rotor core 1 is developed in a straight line, that is, a band shape extending straightly. Cut portions 10n, 10n, . . . are arranged with a predetermined pitch (interval) in the inner circumferential edge 10i, that is, in a portion constituting the inner circumference of the laminated rotor core 1 (see FIG. 52) when the band-shaped core piece 10 is wound in the subsequent process.

The respective cut portions 10n, 10n, . . . have a V shape opened toward the edge of the band-shaped core piece 10 and the vertex thereof extends to the center area in the width direction of the band-shaped core piece 10.

Figure 54:
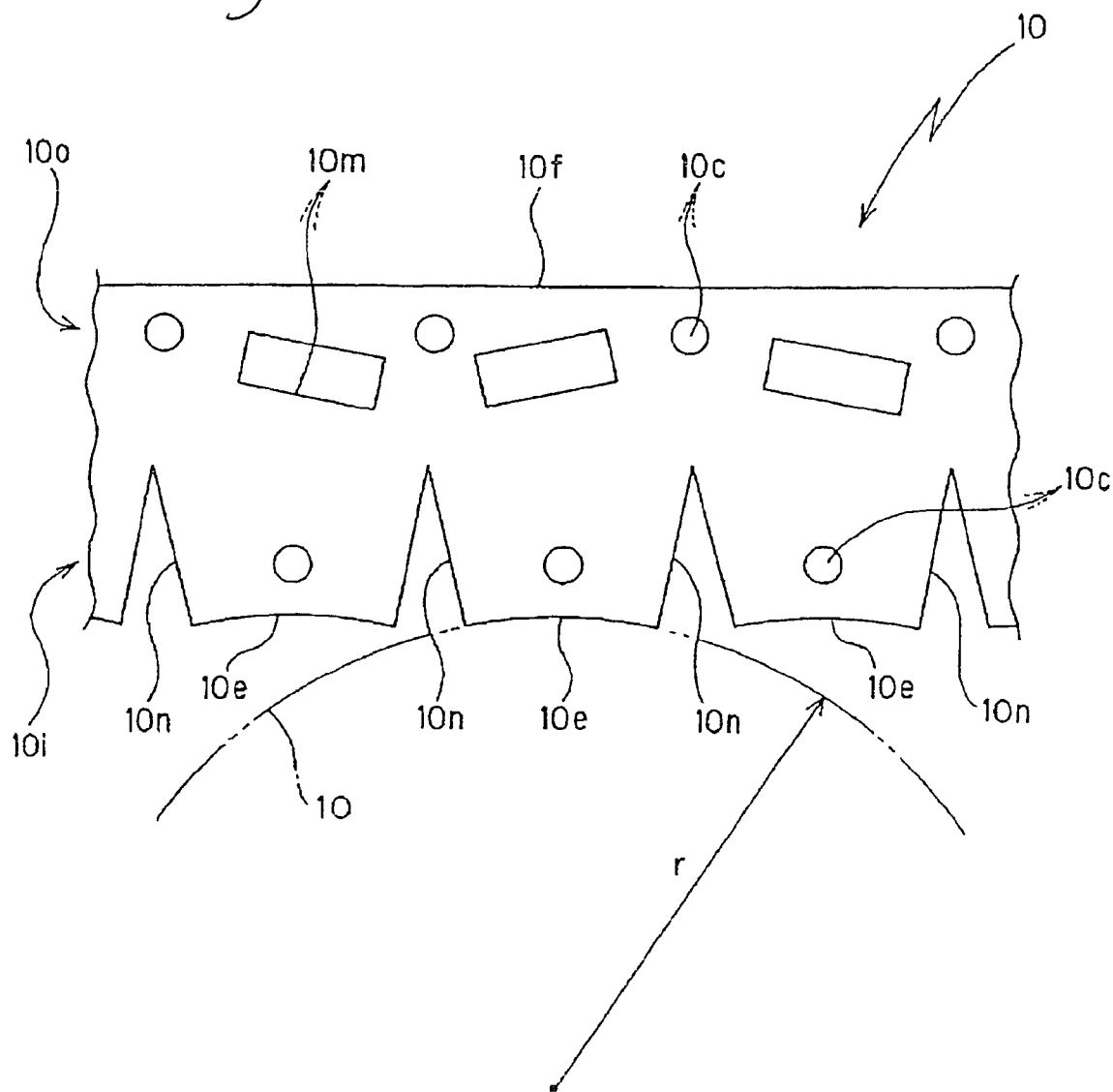
FIG. 54 is a partial plan view illustrating a band-shaped core piece constituting the laminated rotor core shown in FIG. 52.

The inner circumferential edge portion 10e between the adjacent cut portions 10n formed in the inner circumferential edge 10i has an arc shape corresponding to the inner circumference of the rotation shaft fitting hole (shaft hole) 10 in the completed laminated rotor core 1 (see FIG. 52), that is, an arc shape having the radius r of the rotation shaft fitting hole 10 as a radius of curvature as shown in FIG. 54.

Caulking portions 10c, 10c, . . . are arranged with a predetermined pitch in the inner circumferential edge 10i and the outer circumferential edge 10o of the band-shaped core piece 10. The formation pitch of the caulking portions 10c, 10c, . . . is set so that the caulking portions 10c are overlapped with each other when the band-shaped core piece 10 is wound and laminated in a spiral shape in the subsequent process.

Rectangular magnet fitting holes 10m, 10m, . . . are formed with a predetermined pitch (interval) in the intermediate portion in the width direction of the bad-shaped core piece 10, specifically, in a portion close to the outer circumferential edge 10o in the intermediate portion. The formation pitch of the magnet fitting holes 10m, 10m, . . . is set so that the magnet fitting holes 10m are overlapped with each other to form a penetrated mage not fitting hole 10M (see FIG. 52) when the band-shaped core piece 10 is wound and laminated in a spiral shape in the subsequent process.

Here, the formation pitch (interval) of the cut portions 10n or the size (size in the width direction of the band-shaped core piece 10 and spread angle of the V shape) of the cut portions 10n in the band-shaped core piece 10 and the formation pitch (interval) or shape of the magnet fitting holes 10m can be set properly based on specifications of the laminated rotor core 1 to be manufactured.

After forming the band-shaped core piece 10 by punching a metal plate as described above, the band-shaped core piece 10 is taken into a manufacturing apparatus (not shown). Then, as shown in FIG. 53B, the laminated rotor core 1 (see FIG. 52) is manufactured by locally pressing the outer circumferential edge 10o of the band-shaped core piece 10 to roll the band-shaped core piece, winding and laminating the band-shaped core piece 10 in a spiral shape, and coupling the laminated band-shaped yoke core piece by the use of the caulking portions 10c, 10c, . . . in a caulking manner.

Specifically, the band-shaped core piece 10 is bent by suspending one end of the band-shaped core piece 10 on a winding guide G of the manufacturing apparatus and winding the band-shaped core piece 10 on the winding guide G rotating in the arrow direction R while taking the band-shaped core piece 10 into the winding guide G in the arrow direction F.

Figure 53B:
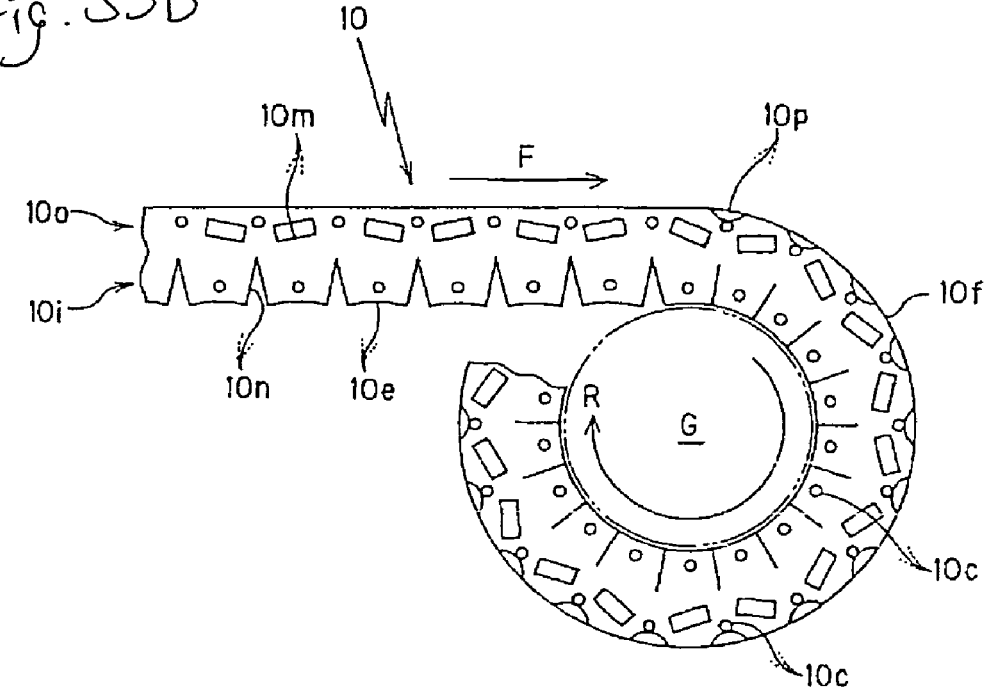

At this time, before bending the band-shaped core piece 10 by winding the band-shaped core piece on the winding guide G, the outer circumferential edge 10o is locally pressed to roll the band-shaped core piece, as shown in FIG. 53B, by forming by pressing pressed portions 10p in the outer circumferential edge 10o of the band-shaped core piece 10.

Figure 55A:
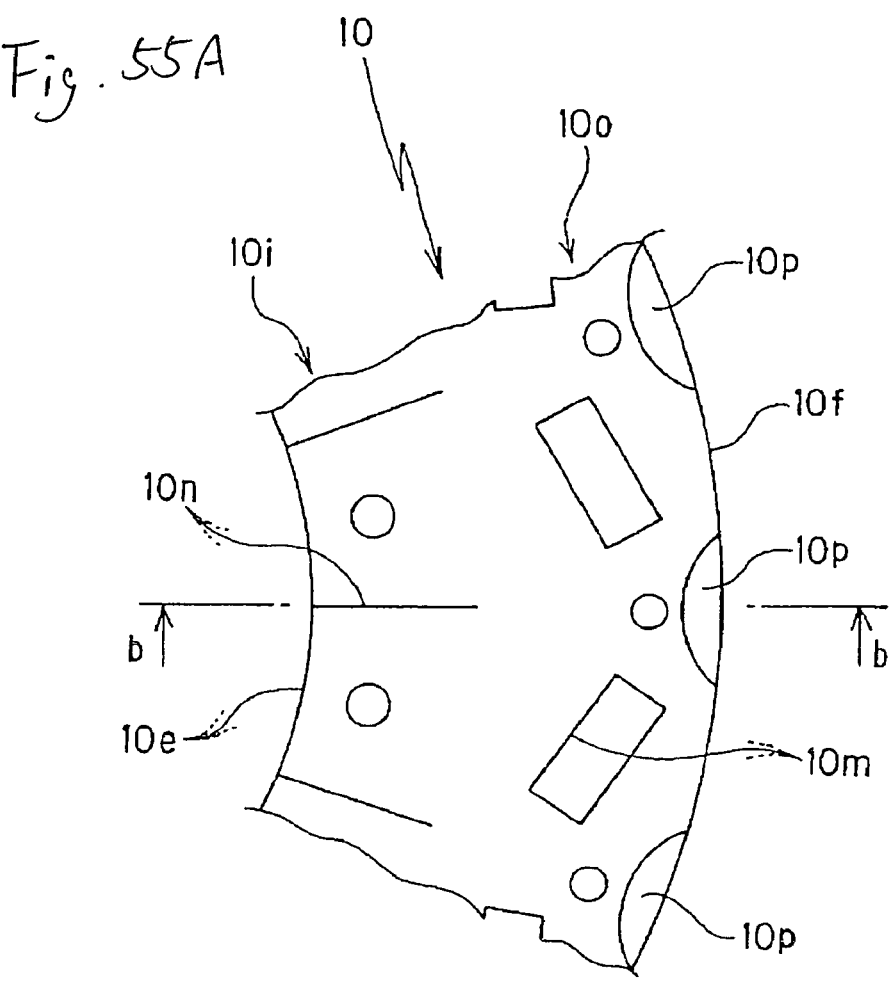
FIGS. 55A and 55B are a partial plan view and a partial cross-sectional view illustrating a band-shaped core piece constituting the laminated rotor core shown in FIG. 52, respectively.
Figure 55B:
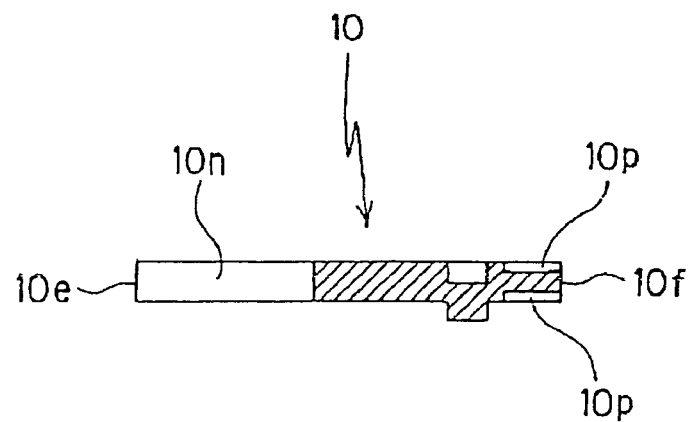

Here, the pressed portions 10p have a semi-circular shape as shown in FIG. 55 and are formed in the outer circumferential edge portion 10f of the band-shaped core piece 10. The formation area is widened toward the outer circumferential edge portion 10f.

The pressed portions 10p, 10p, . . . are formed by press with a predetermined pitch (interval) in the outer circumferential edge 10o with movement of the band-shaped core piece 10.

Figure 52:
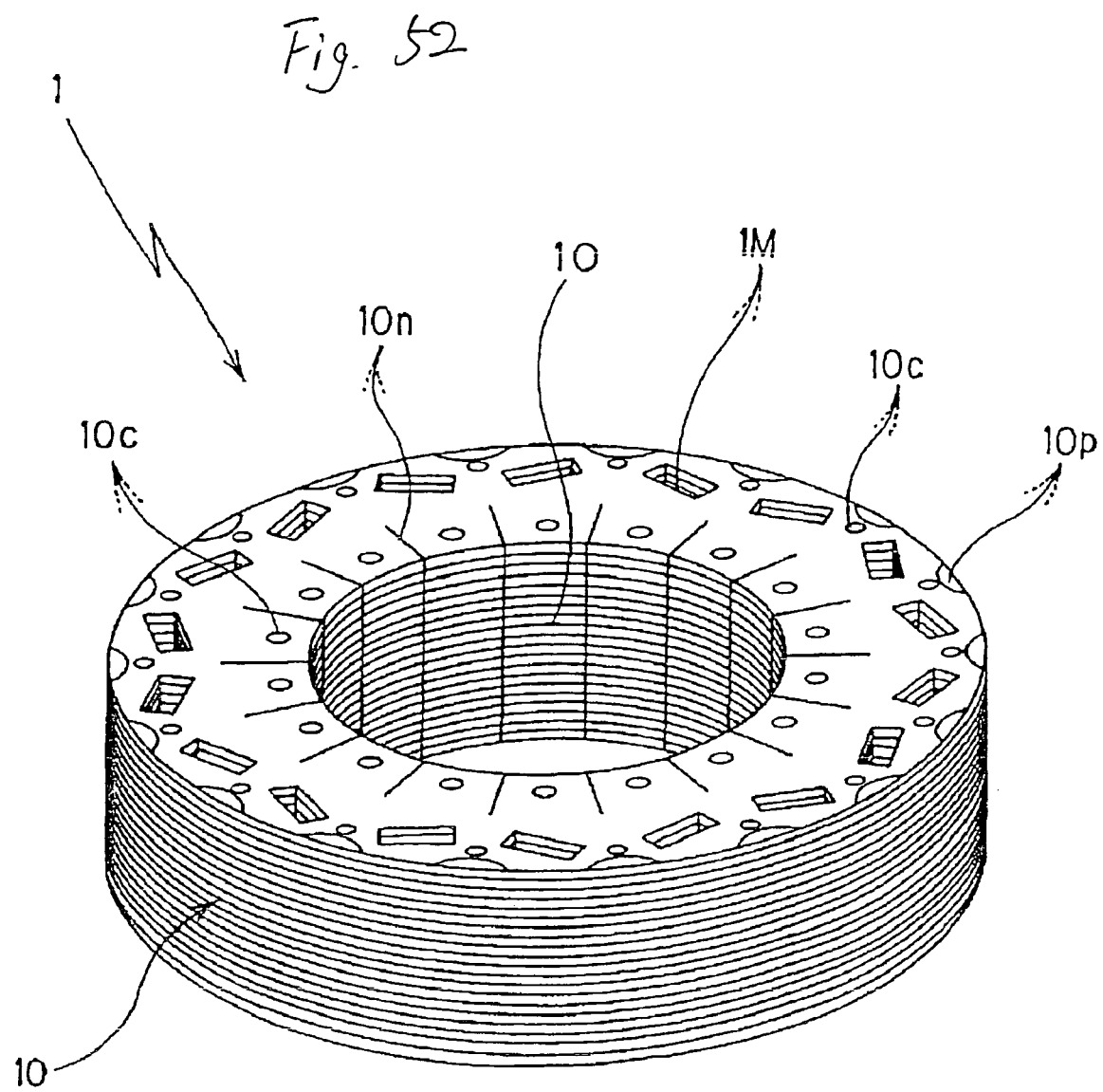
FIG. 52 is a perspective view illustrating an appearance of a laminated rotor core manufactured by the use of a method according to an embodiment of the present invention.

The laminated rotor core 1 having a predetermined shape is manufactured, as shown in FIG. 52, by forming the pressed portions 10p, 10p, . . . in the outer circumferential edge 10o of the band-shaped core piece 10, winding the band-shaped core piece 10 on the winding guide G rotating, and coupling the band-shaped core piece 10 laminated by a predetermined number of layers by the use of the caulking portions 10c, 10c, . . . in a caulking manner.

Since the cut portions 10n, 10n, . . . are formed with a predetermined pitch in the inner circumferential edge 10i, the band-shaped core piece 10 can be easily bent without applying a surface compression to the inner circumferential edge 10i when it is wound in a spiral shape by a manufacturing apparatus (not shown).

When the band-shaped core piece 10 is wound in a spiral shape by the manufacturing apparatus (not shown), the outer circumferential edge 10o is locally pressed to roll the band-shaped core piece due to the pressed portions 10p, 10p, . . . formed in the outer circumferential edge 10o. Accordingly, the band-shaped core piece can be easily bent.

Since magnet fitting holes 10m, 10m, . . . are formed in the intermediate portion in the width direction of the band-shaped core piece 10, the shaping property of the intermediate portion is improved. Accordingly, when the band-shaped core piece is wound in a spiral shape by the manufacturing apparatus (not shown), the band-shaped core piece can be easily bent.

In this way, since the band-shaped core piece 10 is excellent in bending formability when it is wound in a spiral shape, the band-shaped core piece 10 can be wound in a circular shape. Accordingly, it is possible to manufacture a laminated rotor core 1 having excellent shaping precision.

Figure 66A:
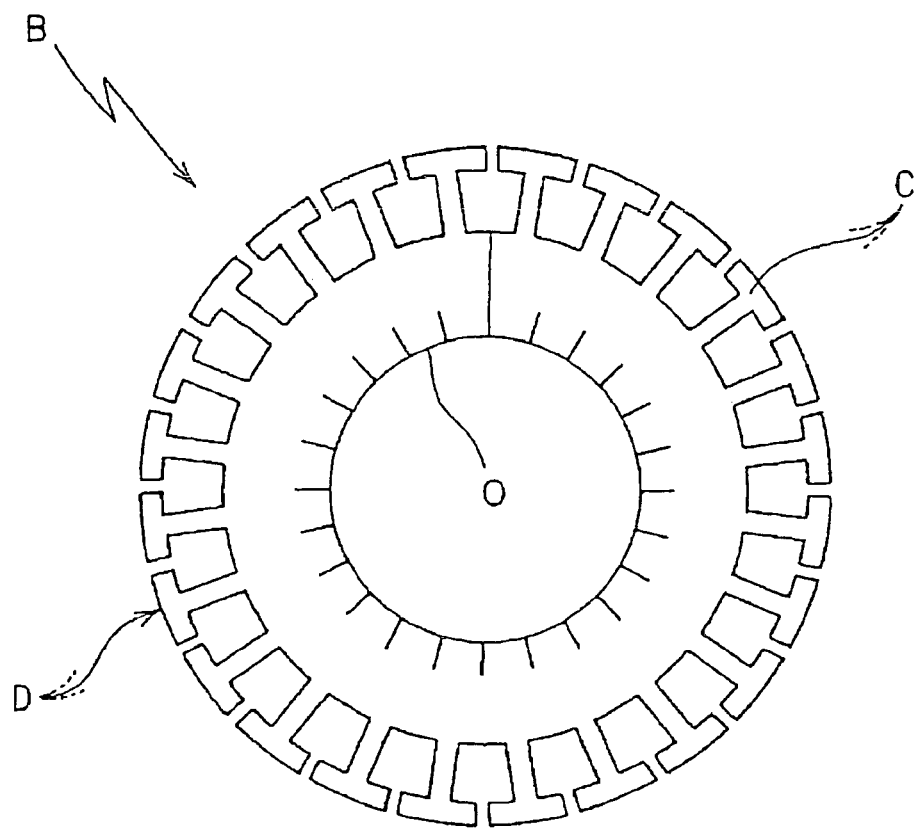
FIG. 66 is a perspective view illustrating an appearance of a laminated rotor core manufactured according to the related art.
Figure 66B:
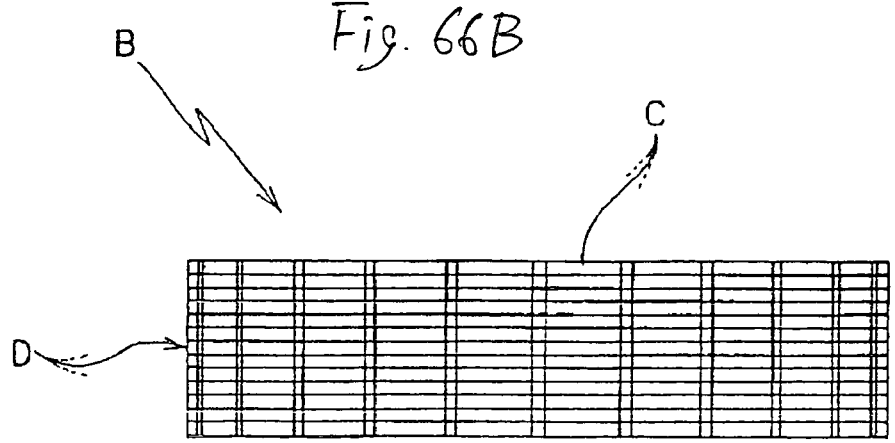
Figure 67A:
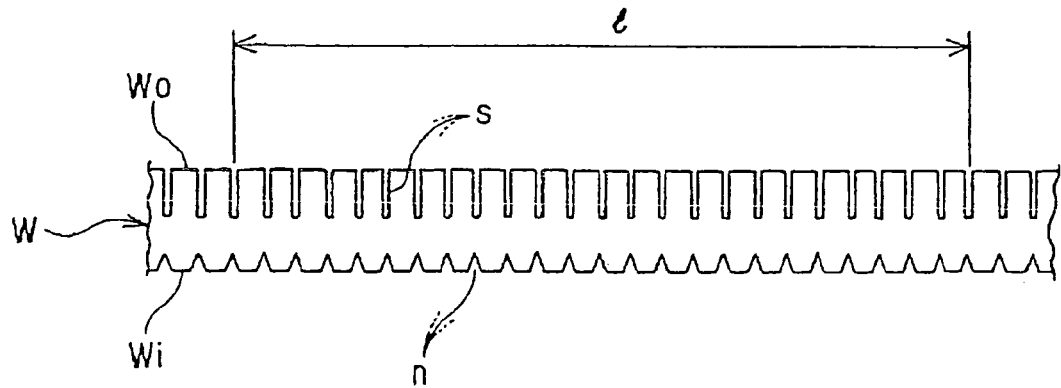
FIGS. 67A, 67B, and 67C are conceptual diagrams illustrating a procedure of manufacturing the laminated rotor core shown in FIG. 66.
Figure 67B:
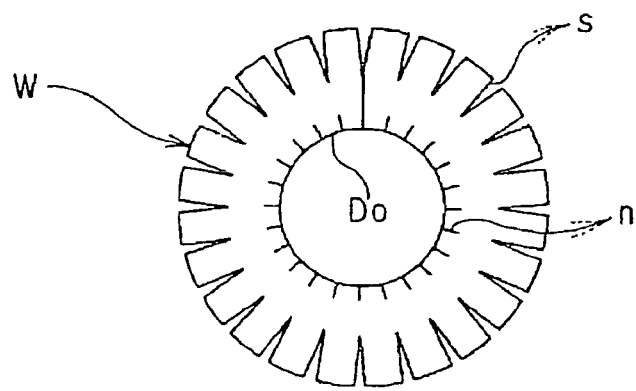
Figure 67C:
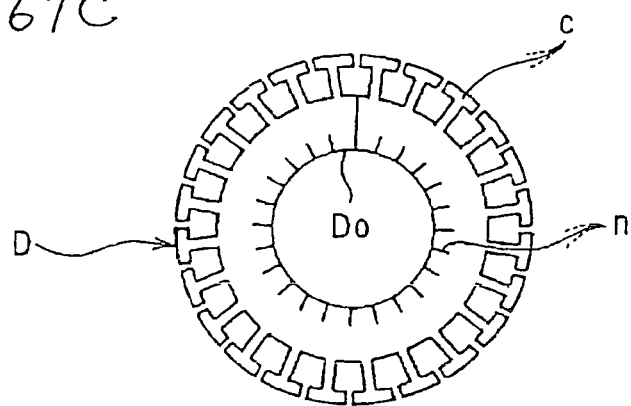

According to the above-mentioned method of manufacturing the laminated rotor core 1, since the laminated rotor core 1 is manufactured by winding and laminating the band-shaped core piece 10 in a spiral shape, it is possible to greatly enhance the productivity of the laminated rotor core 1, in comparison with the conventional manufacturing method in which a rotor core formed by winding a band-shaped plate in a ring shape is laminated sheet by sheet (see FIGS. 66 and 67).

In addition, in the method of manufacturing the laminated rotor core 1 described above, since the shaft hole 10 of the laminated rotor core 1 formed by winding the band-shaped core piece 10 has a circular shape by forming the inner circumferential edge 10e between the cut portions 10n in the band-shaped core piece 10 in an arc shape corresponding to the inner circumference of the shaft hole 10, a re-grinding process is not necessary. Accordingly, it is possible to greatly improve the productivity of the laminated rotor core 1.

Since the resistance (surface compression) at the time of winding the band-shaped core piece 10 in a spiral shape is considerably reduced by forming the cut portions 10n, 10n, . . . in the inner circumferential edge 10i of the band-shaped core piece 10 to extend to the center in the width direction of the band-shaped core piece 10, it is possible to easily wind the band-shaped core piece 10 and to further enhance the shaping precision of the laminated rotor core 1.

Since the outer circumference of the band-shaped core piece 10 is more expanded by press by forming the areas of the pressed portions 10p, 10p, . . . formed in the outer circumferential edge 20o of the band-shaped core piece 10 so that the area is widened toward the outer circumference edge portion 10f, it is possible to easily wind the band-shaped core piece 10. Accordingly, the shaping precision of the laminated rotor core 1 is further enhanced.

Since the pressed portions 1p, 11p, . . . formed by locally pressing the outer circumferential edge 10o of the band-shaped core piece 10 exist not continuously but locally (intermittently), the appearance of the laminated rotor core 1 is not deteriorated. In addition, since dust does not invade the laminated rotor core, it is possible to elongate a lifetime of the laminated rotor core 1.

Figure 56A:
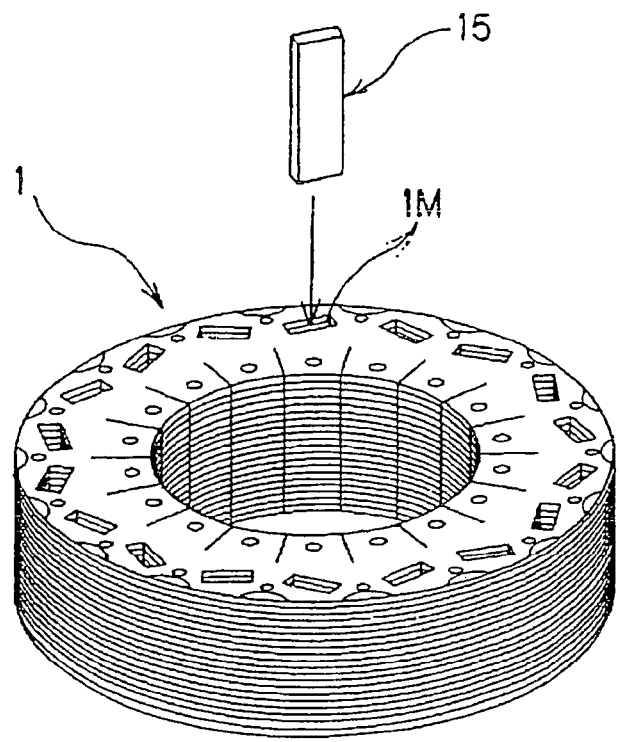
FIGS. 56A and 56B are conceptual diagrams illustrating a procedure of manufacturing a rotor including the laminated rotor core shown in FIG. 52.
Figure 56B:
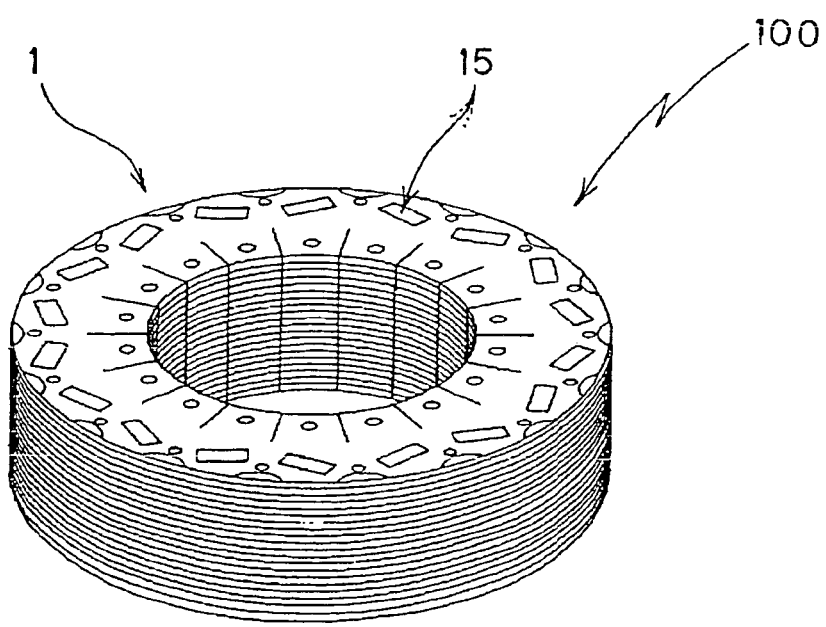

A magnet attached rotor 100 in which magnet blocks 15 are mounted on the laminated rotor core 1 as shown in FIG. 56B is completed by manufacturing the laminated rotor core 1 as described above and inserting the magnet blocks 15, 15, . . . made of ferrite magnet or rare earth magnet into the magnet fitting holes 1M, 1M, . . . of the laminated rotor core 1 as shown in FIG. 56A.

FIGS. 57 to 61 show an example of the method of manufacturing a laminated rotor core according to the present invention. The laminated rotor core 2 manufactured according to the present invention is an element constituting a diecast attached rotor 200 (see FIG. 61) and has a ring shape including a rotation shaft fitting hole (shaft hole) 20. Diecast metal filling holes 2D, 2D, . . . are arranged all around the outer circumference thereof.

The laminated rotor core 2 is manufactured by winding and laminating a band-shaped core piece 20, which is formed by punching a metal plate as described later, in a spiral shape and coupling the laminated band-shaped core piece in a caulking manner. Reference numeral 20c, 20c, . . . in FIG. 57 denote caulking portions formed in the band-shaped core piece 20.

Reference numerals 20p, 20p, . . . in FIG. 57 denote pressed portions formed when winding the band-shaped core piece 20 as described later and reference numerals 20n, 20n, . . . in FIG. 57 denote cut portions closed when winding the band-shaped core piece 20 as described later.

Now, a method of manufacturing a laminated rotor core according to an embodiment of the present invention will be described in detail by exemplifying the above-mentioned laminated rotor core 2.

Figure 58A:
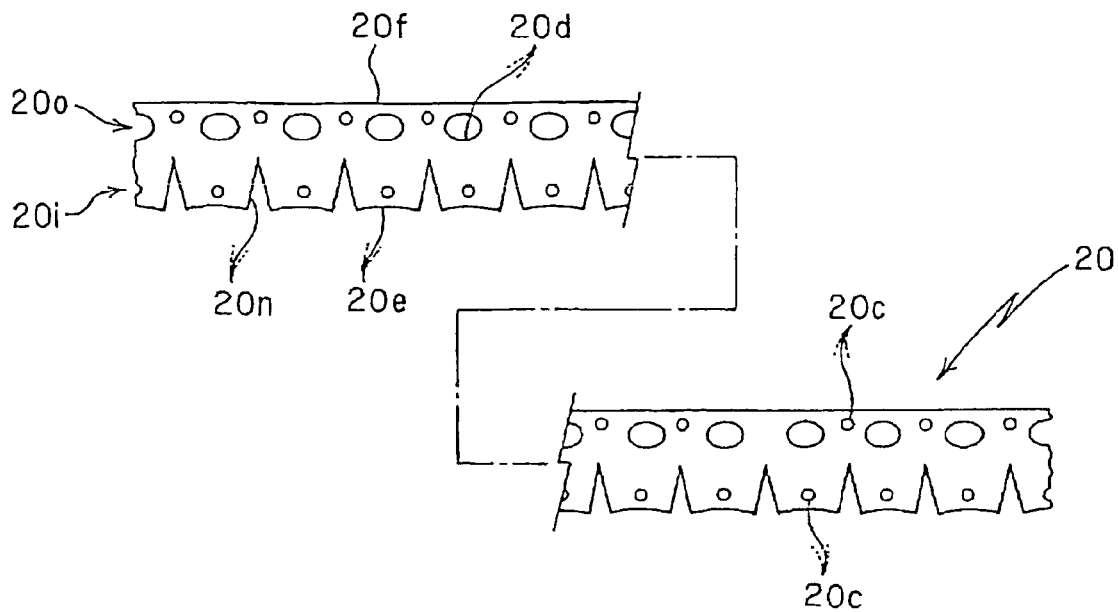
FIGS. 58A and 58B are conceptual diagrams illustrating a procedure of manufacturing the laminated rotor core shown in FIG. 57.

First, as shown in FIG. 58A, the band-shaped core piece 20 is formed by punching a metal plate not shown.

The band-shaped core piece 20 has a shape that the laminated rotor core 2 is developed in a straight line, that is, a band shape extending straightly. Cut portions 20n, 20n, . . . are arranged with a predetermined pitch (interval) in the inner circumferential edge 20i, that is, in a portion constituting the inner circumference of the laminated rotor core 2 (see FIG. 57) when the band-shaped core piece 20 is wound in the subsequent process.

The respective cut portions 20n, 20n . . . have a V shape opened toward the edge of the band-shaped core piece 20 and the vertex thereof extends to the center area in the width direction of the band-shaped core piece 20.

Figure 59:
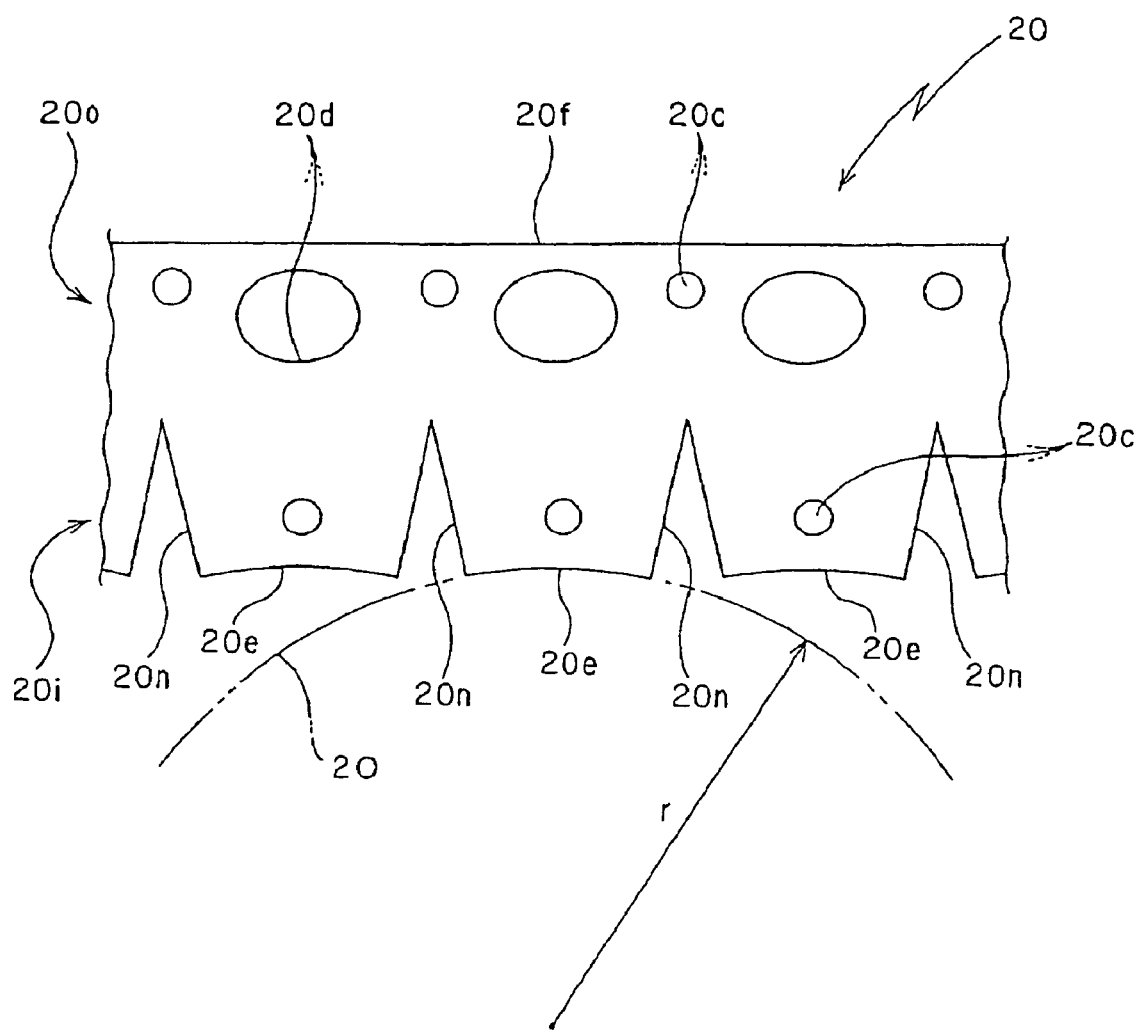
FIG. 59 is a partial plan view illustrating a band-shaped core piece constituting the laminated rotor core shown in FIG. 57.

The inner circumferential edge portion 20e between the adjacent cut portions 20n formed in the inner circumferential edge 20i has an arc shape corresponding to the inner circumference of the rotation shaft fitting hole (shaft hole) 20 in the completed laminated rotor core 2 (see FIG. 57), that is, an arc shape having the radius r of the rotation shaft fitting hole 20 as a radius of curvature as shown in FIG. 59.

Caulking portions 20c, 20c, . . . are arranged with a predetermined pitch in the inner circumferential edge 20i and the outer circumferential edge 20o of the band-shaped core piece 20. The formation pitch of the caulking portions 20c, 20c, . . . is set so that the caulking portions 20c are overlapped with each other when the band-shaped core piece 20 is wound and laminated in a spiral shape in the subsequent process.

Rectangular diecast metal filling holes 20d, 20d, . . . are formed with a predetermined pitch (interval) in the intermediate portion in the width direction of the bad-shaped core piece 20, specifically, in a portion close to the outer circumferential edge 20o in the intermediate portion. The formation pitch of the diecast metal filling holes 20d, 20d, . . . is set so that the diecast metal filling holes 20d are overlapped with each other to form a penetrated diecast metal filling hole 2D (see FIG. 57) when the band-shaped core piece 20 is wound and laminated in a spiral shape in the subsequent process.

Here, the formation pitch (interval) of the cut portions 20n or the size (size in the width direction of the band-shaped core piece 20, spread angle of the V shape) of the cut portions 20n in the band-shaped core piece 20 and the formation pitch (interval) or shape of the diecast metal filling holes 20d can be set properly based on specifications of the laminated rotor core 2 to be manufactured.

After forming the band-shaped core piece 20 by punching a metal plate as described above, the band-shaped core piece 20 is taken into a manufacturing apparatus (not shown). Then, as shown in FIG. 58B, the laminated rotor core 2 (see FIG. 57) is manufactured by locally pressing the outer circumferential edge 20o of the band-shaped core piece 20 to roll the band-shaped core piece, winding and laminating the band-shaped core piece 20 in a spiral shape, and coupling the laminated band-shaped yoke core piece by the use of the caulking portions 20c, 20c, . . . in a caulking manner.

Specifically, the band-shaped core piece 20 is bent by suspending one end of the band-shaped core piece 20 on a winding guide G of the manufacturing apparatus and winding the band-shaped core piece 20 on the winding guide G rotating in the arrow direction R while taking the band-shaped core piece 20 into the winding guide G in the arrow direction F.

Figure 58B:
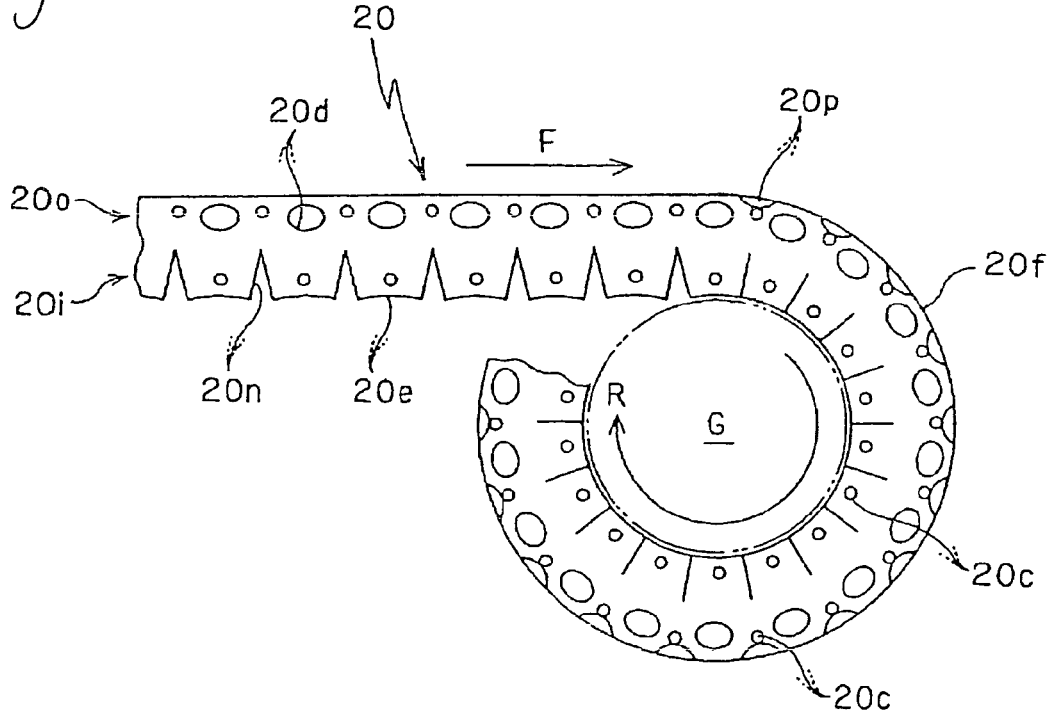

At this time, before bending the band-shaped core piece 20 by winding the band-shaped core piece on the winding guide G, the outer circumferential edge 20o is locally pressed to roll the band-shaped core piece, as shown in FIG. 58B, by forming by pressing pressed portions 20p in the outer circumferential edge 20o of the band-shaped core piece 20.

Figure 60A:
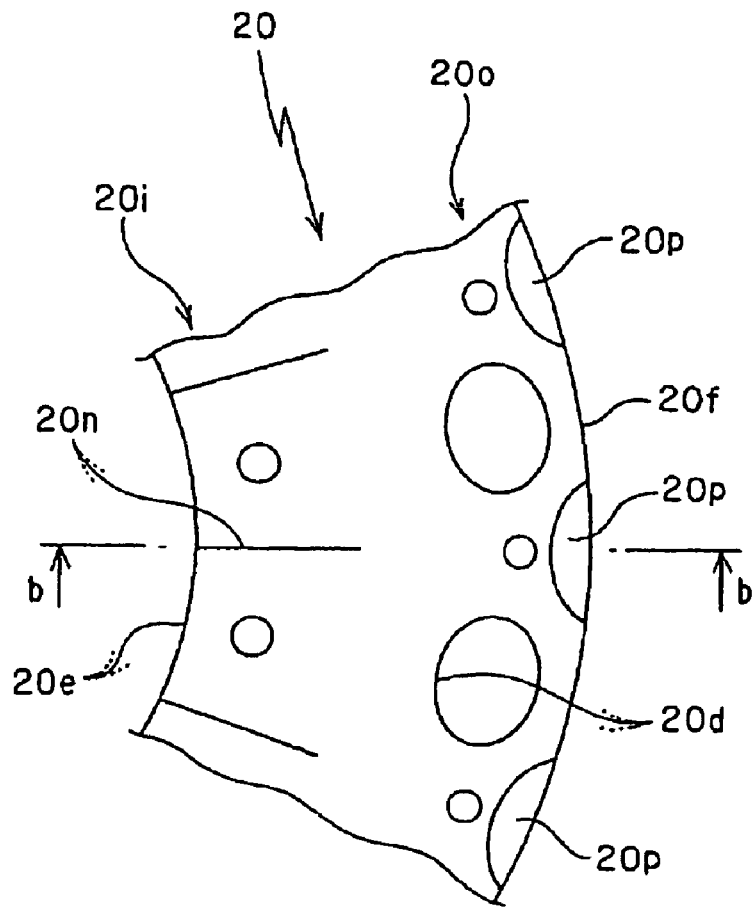
FIGS. 60A and 60B are a partial plan view and a partial cross-sectional view illustrating the band-shaped core piece constituting the laminated rotor core shown in FIG. 57, respectively.
Figure 60B:
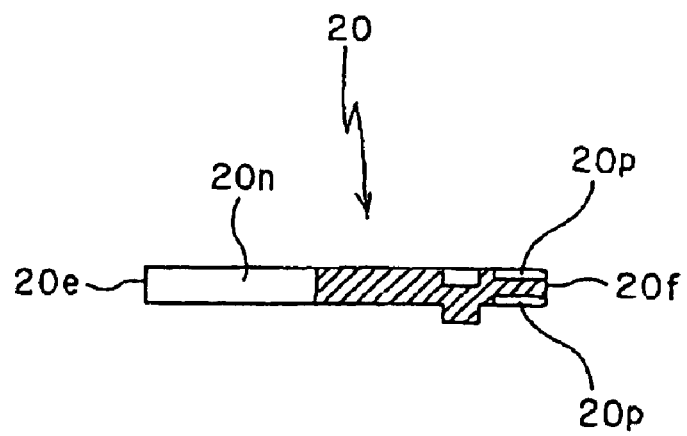

Here, the pressed portions 20p have a semi-circular shape as shown in FIG. 60 and are formed in the outer circumferential edge portion 20f of the band-shaped core piece 20. The formation area is widened toward the outer circumferential edge portion 20f.

The pressed portions 20p, 20p, . . . are formed by press with a predetermined pitch (interval) in the outer circumferential edge 20o with movement of the band-shaped core piece 20.

Figure 57:
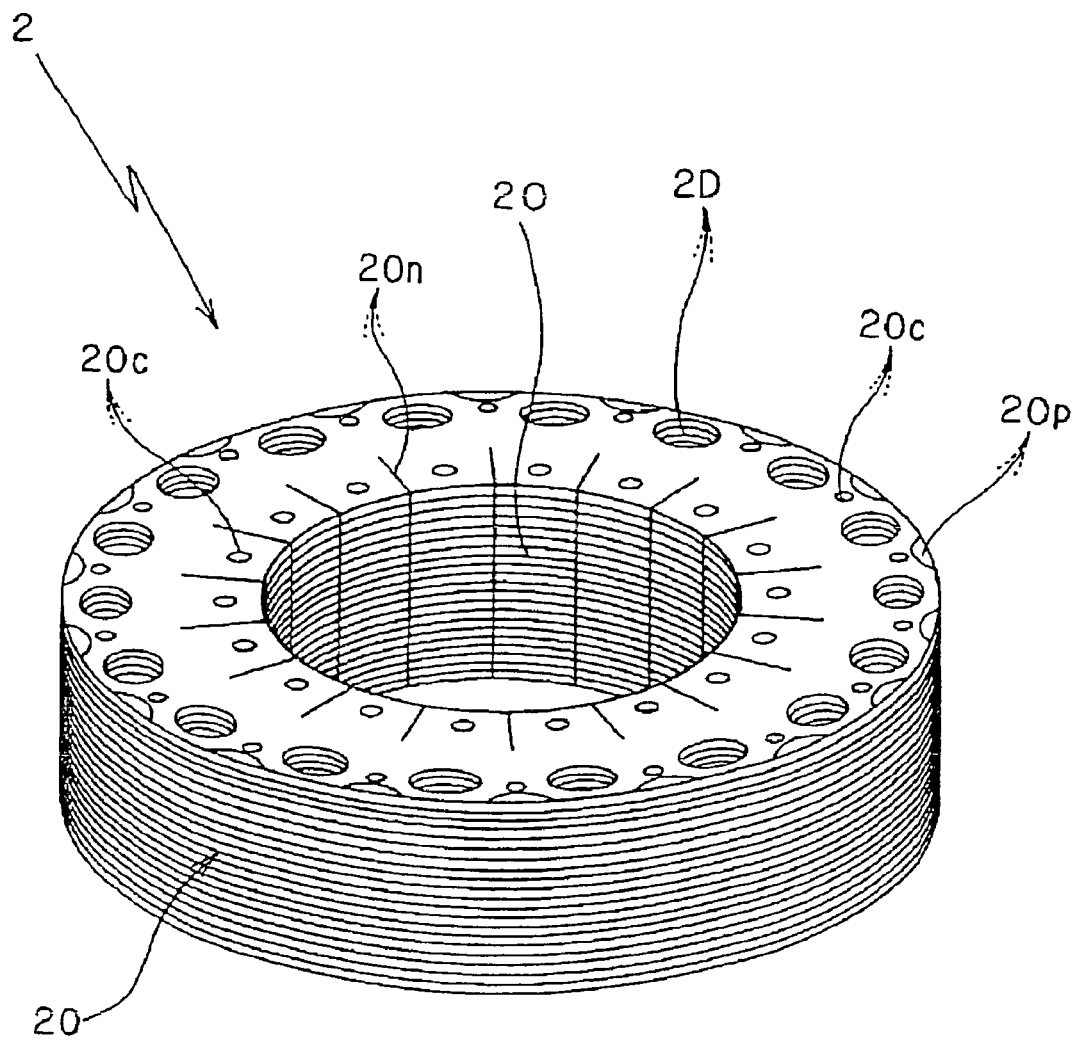
FIG. 57 is a perspective view illustrating an appearance of the laminated rotor core manufactured by the use of a method according to another embodiment of the present invention.

The laminated rotor core 2 having a predetermined shape is manufactured, as shown in FIG. 57, by forming the pressed portions 20p, 20p, . . . in the outer circumferential edge 20o of the band-shaped core piece 20, winding the band-shaped core piece 20 on the winding guide G rotating, and coupling the band-shaped core piece 20 laminated by a predetermined number of layers by the use of the caulking portions 20c, 20c, . . . in a caulking manner.

Since the cut portions 20n, 20n, . . . are formed with a predetermined pitch in the inner circumferential edge 20i, the band-shaped core piece 20 can be easily bent without applying a surface compression to the inner circumferential edge 20i when it is wound in a spiral shape by a manufacturing apparatus (not shown).

When the band-shaped core piece 20 is wound in a spiral shape by the manufacturing apparatus (not shown), the pressed portions 20p, 20p, . . . are formed in the outer circumferential edge 20o. Accordingly, the outer circumferential edge 20o is locally pressed to roll the band-shaped core piece, thereby, easily bending the band-shaped core piece.

In addition, since the diecast metal filling holes 20d, 20d, . . . are formed in the intermediate portion in the width direction of the band-shaped core piece 20, the shaping property of the intermediate portion is improved. Accordingly, it is possible to easily bend the band-shaped core piece 20 when it is wound in a spiral shape by a manufacturing apparatus (not shown).

In this way, since the bending processability of the band-shaped core piece 20 is very excellent when it is wound in a spiral shape, it is possible to wind the band-shaped core piece 20 in a circular shape. Accordingly, it is possible to manufacture the laminated rotor core 2 having excellent shaping precision.

According to the above-mentioned method of manufacturing the laminated rotor core 2, since the laminated rotor core 2 is manufactured by winding and laminating the band-shaped core piece 20 in a spiral shape, it is possible to greatly enhance the productivity of the laminated rotor core 2, in comparison with the conventional manufacturing method in which a rotor core formed by winding a band-shaped plate in a ring shape is laminated sheet by sheet (see FIGS. 66 and 67).

In addition, in the method of manufacturing the laminated rotor core 2 described above, since the shaft hole 20 of the laminated rotor core 2 formed by winding the band-shaped core piece 20 has a circular shape by forming the inner circumferential edge 20e between the cut portions 20n in the band-shaped core piece 20 in an arc shape corresponding to the inner circumference of the shaft hole 20, a re-grinding process is not necessary. Accordingly, it is possible to greatly improve the productivity of the laminated rotor core 2.

Since the resistance (surface compression) at the time of winding the band-shaped core piece 20 in a spiral shape is considerably reduced by forming the cut portions 20n, 20n, . . . in the inner circumferential edge 20i of the band-shaped core piece 20 to extend to the center in the width direction of the band-shaped core piece 20, it is possible to easily wind the band-shaped core piece 210 and to further enhance the shaping precision of the laminated rotor core 2.

Since the outer circumference of the band-shaped core piece 20 is more expanded by press by forming the areas of the pressed portions 20p, 20p, . . . formed in the outer circumferential edge 20o of the band-shaped core piece 20 so that the area is widened toward the outer circumference edge portion 20f, it is possible to easily wind the band-shaped core piece 20. Accordingly, the shaping precision of the laminated rotor core 2 is further enhanced.

Since the pressed portions 20p, 20p, . . . formed by locally pressing the outer circumferential edge 20o of the band-shaped core piece 20 exist not continuously but locally (intermittently), the appearance of the laminated rotor core 2 is not deteriorated. In addition, since dust does not invade the laminated rotor core, it is possible to elongate a lifetime of the laminated rotor core 2.

Figure 61A:
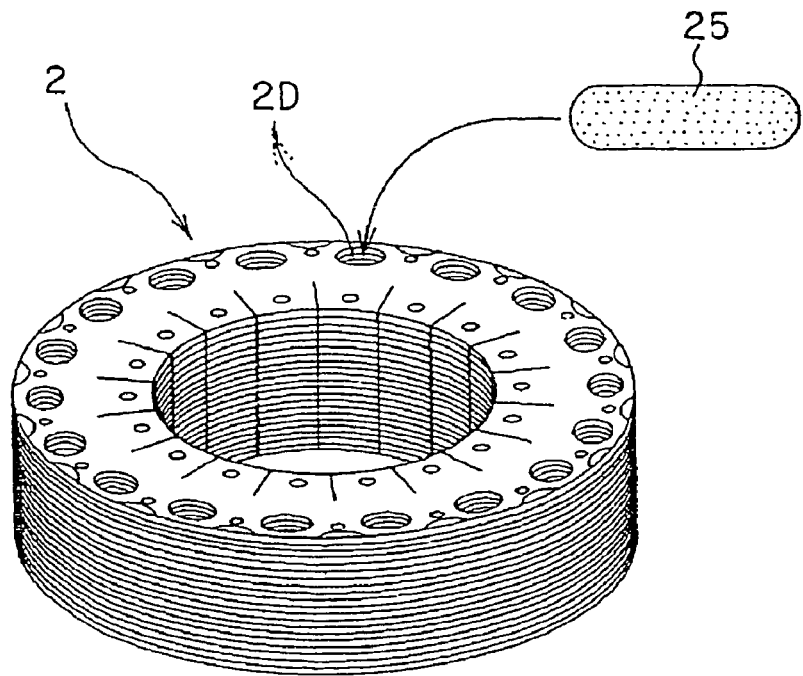
FIGS. 61A and 61B are conceptual diagrams illustrating a procedure of manufacturing a rotor having the laminated rotor core shown in FIG. 6 as an element.
Figure 61B:
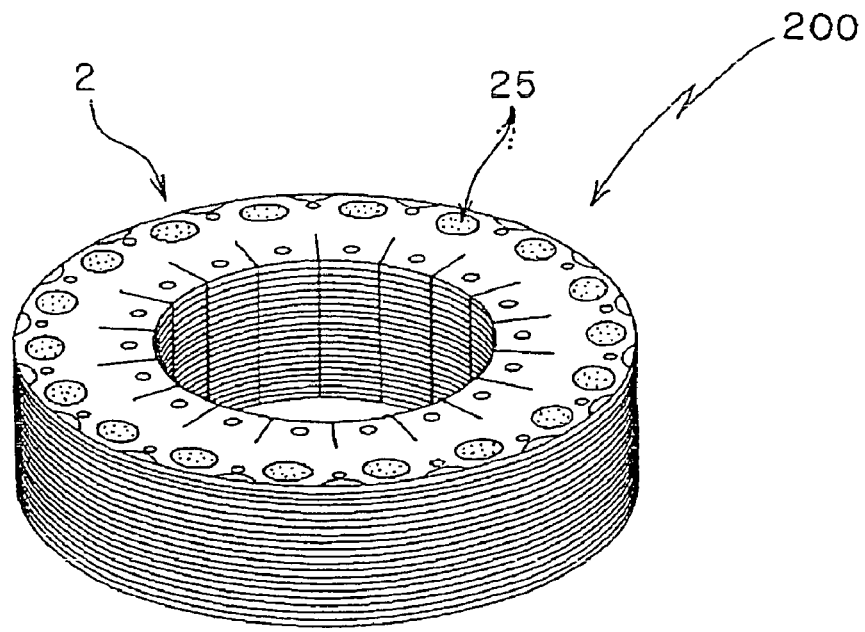
Figure 62A:
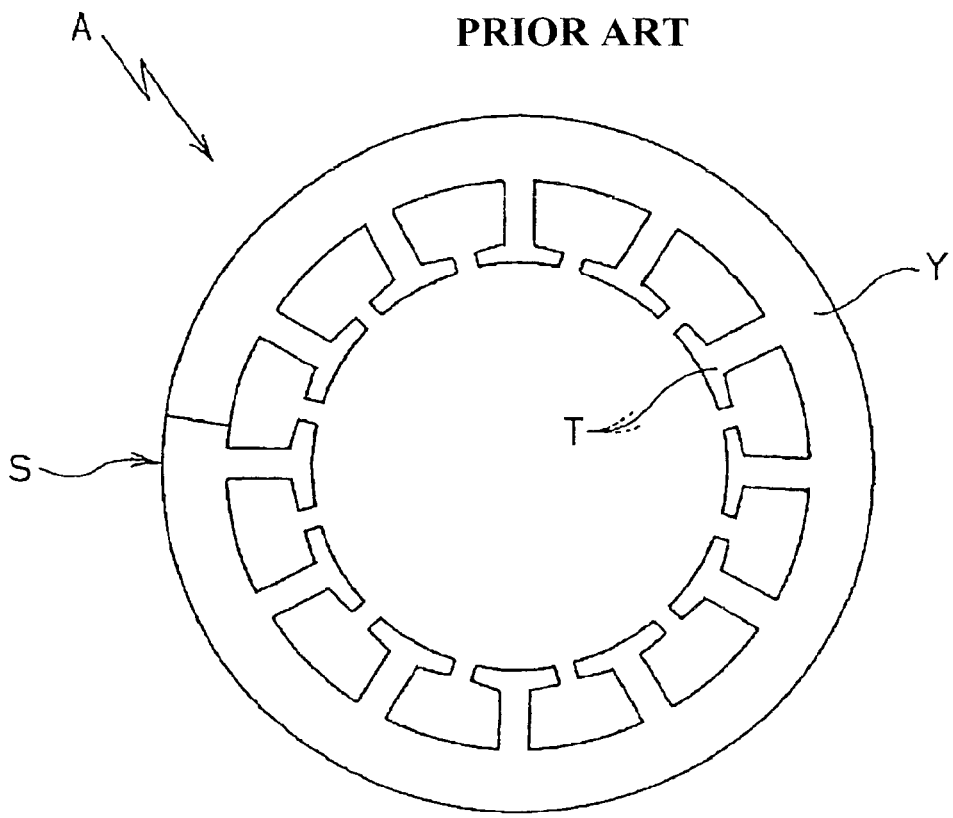
FIGS. 62A and 62B are an entire plan view and a partial cross-sectional view illustrating a laminated stator core manufactured according to the related art, respectively.
Figure 62B:
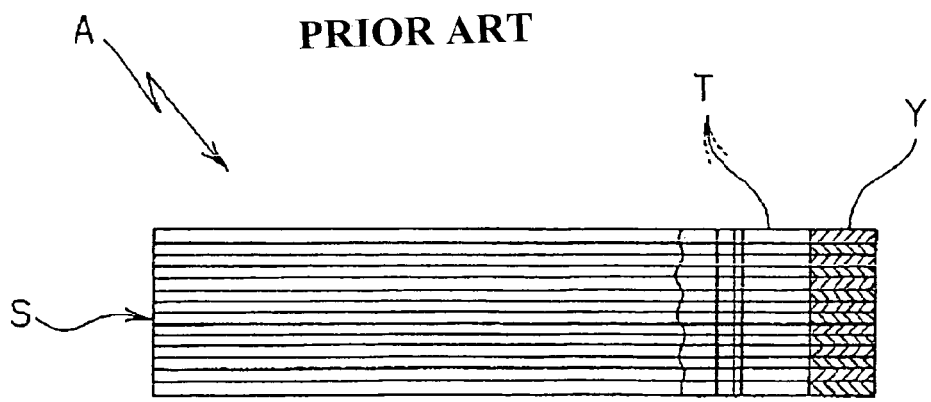
Figure 63:
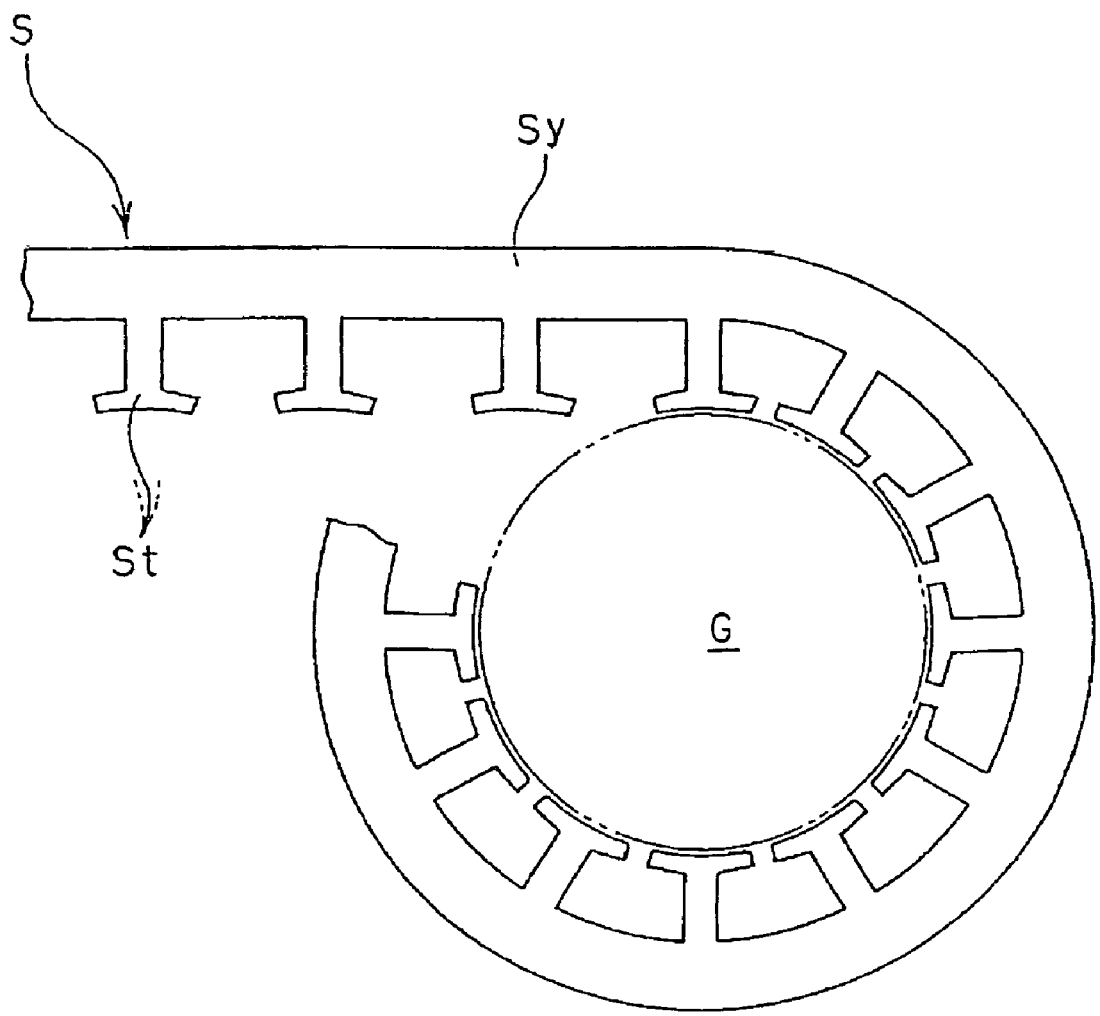
FIG. 63 is a conceptual diagram illustrating a method of manufacturing the laminated stator core shown in FIG. 62.
Figure 64A:
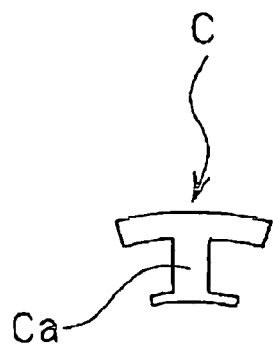
FIGS. 64A, 64B, and 64C are conceptual diagrams illustrating a method of manufacturing another laminated stator core according to the related art.
Figure 64B:
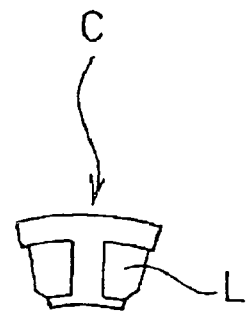
Figure 64C:
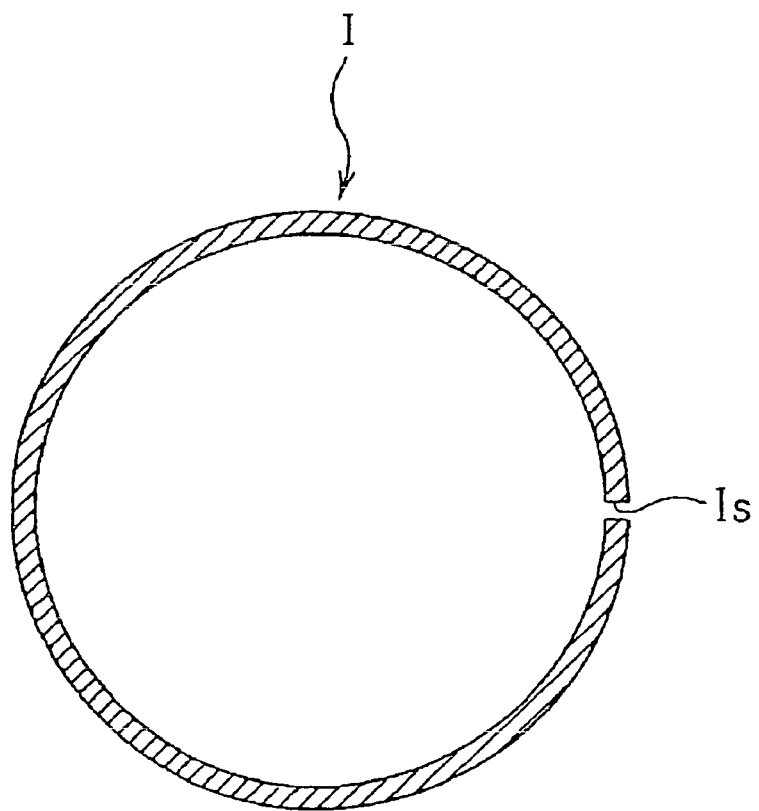
Figure 65A:
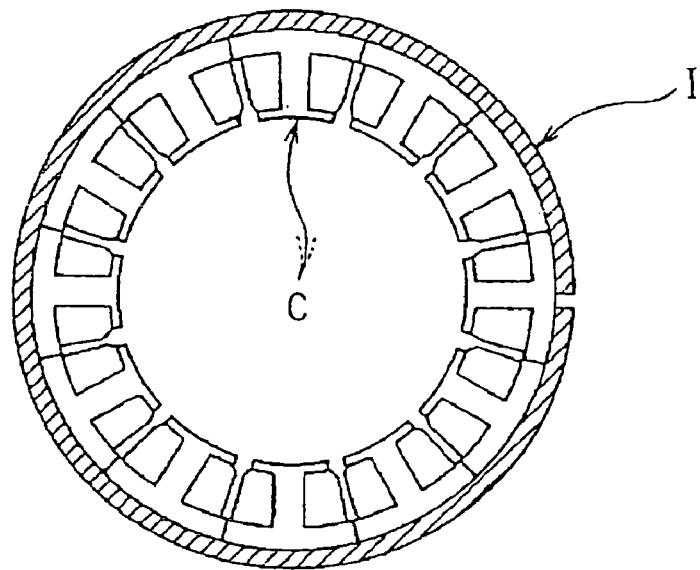
FIGS. 65A and 65B are conceptual diagrams illustrating a method of manufacturing another laminated stator core according to the related art.
Figure 65B:
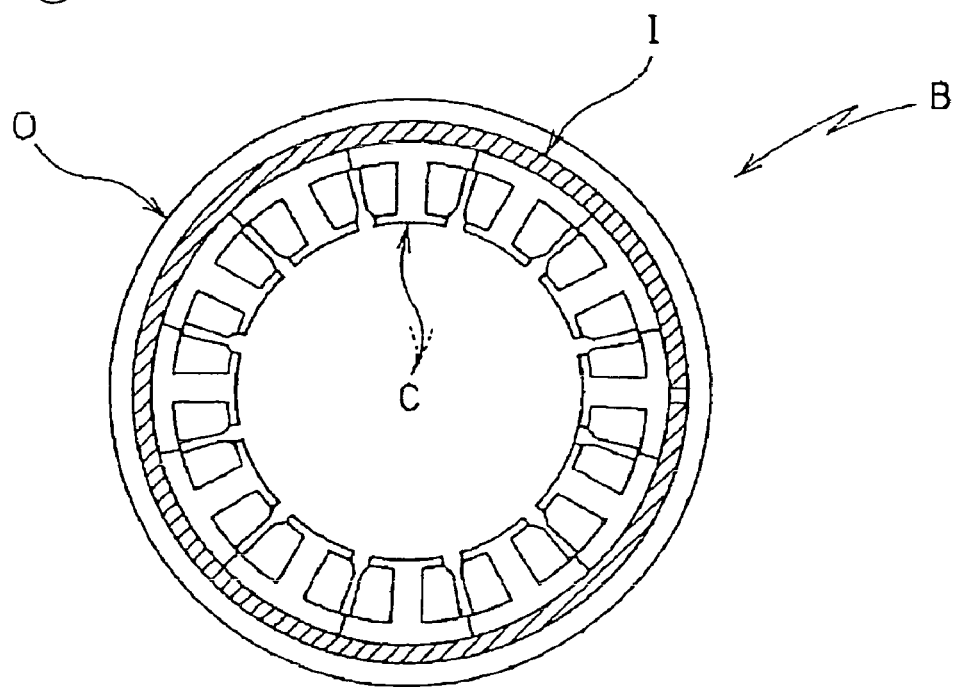

A diecast-attached rotor 200 in which magnet diecast metal blocks 25 are mounted on the laminated rotor core 2 as shown in FIG. 61B is completed by filling (die-casting) the diecast metal filling holes 2D, 2D, . . . of the laminated rotor core 2 with the melted diecast metal (for example, aluminum) 25 as shown in FIG. 61A, after manufacturing the laminated rotor core 2 as described above.

Although the present invention has been described in detail with reference to specific embodiments, it can be understood by those skilled in the art that various modifications may be applied thereto without departing from the spirit and scope of the present invention.

This application is based on Japanese Patent Application No. 2004-262541 filed on Sep. 9, 2004, Japanese Patent Application No. 2004-311198 filed on Oct. 26, 2004, Japanese Patent Application No. 2004-325201 filed on Nov. 9, 2004, Japanese Patent Application No. 2004-340510 filed on Nov. 25, 2004, Japanese Patent Application No. 2004-340511 filed on Nov. 25, 2004, and Japanese Patent Application No. 2004-349848 filed on Dec. 2, 2004, the disclosure of which is incorporated herein in its entirety by reference.

INDUSTRIAL APPLICABILITY

According to the present invention, it is possible to manufacture a laminated core excellent in shaping precision and electrical characteristic, by using a method of manufacturing a laminated core in which a band-shaped core piece is wound and laminated in a spiral shape.

What is claimed is:

1. A method of manufacturing a laminated stator core, comprising the steps of:
    forming a band-shaped yoke core piece having a shape that a yoke of the laminated stator core is developed in a straight line and having concave connection portions in the inner circumferential edge thereof by punching a metal plate;
    forming a laminated yoke body by winding and laminating the band-shaped yoke core piece in a spiral shape and coupling the laminated band-shaped yoke core piece using a caulking procedure;
    forming a magnetic core piece having a convex connection portion at the base end thereof by punching a metal plate;
    forming a laminated magnetic body by laminating and coupling a predetermined number of the magnetic core pieces to each other using a caulking procedure; and
    coupling the laminated yoke body and the laminated magnetic body to each other by winding a coil around the laminated magnetic body and then inserting the convex connection portions into the concave connection portions,
    wherein the band-shaped yoke core piece formed in forming the band-shaped yoke core piece has a shape that a yoke of the laminated stator core is developed in a straight line and concave connection portions and arc-shaped caulking portions having a plane shape curved in a winding direction are arranged with a constant pitch in the inner circumferential edge thereof,
    wherein in forming the laminated yoke body, caulking tongues of the arc-shaped caulking portions are inserted into caulking grooves of the arc-shaped caulking portions in a lower layer while winding and laminating the band-shaped yoke core piece in a spiral shape.

2. The method according to claim 1, wherein the forming a laminated yoke body comprises stretching the band-shaped yoke core piece in a longitudinal direction by locally pressing the outer circumferential edge thereof when winding and laminating the band-shaped yoke core piece.

3. The method according to claim 1, further comprising correcting the shape of the laminated yoke body by applying a diameter enlarging force from the inner circumference of the laminated yoke body, after the forming the laminated yoke body and before the coupling the laminated magnetic bodies to the laminated yoke body.

4. The method according to claim 1, wherein the convex connection portions in the laminated magnetic body has a tapered shape with a wide front end.

5. The method according to either of claims 1 or 2, wherein a minute protrusion is formed at the side of each convex connection portion in the laminated magnetic body.

6. The method according to either of claims 1 or 2, wherein after the convex connection portions of the laminated magnetic body are inserted into the concave connection portions of the laminate yoke body, a fixing engagement portion is formed in at least one of the concave connection portion and the convex connection portion through a pressing process.

7. The method according to claim 1, wherein in the forming the laminate yoke body, caulking portions are in advance in the band-shaped yoke core pieces, the band-shaped yoke core pieces are coupled to each other by the use of the caulking portions in a caulking manner, and the caulking portions or peripheries of the caulking portions including the caulking portions are pressed locally.

8. The method according to claim 7, wherein the area where the periphery of each caulking portion including the caulking portion is locally pressed is an area which is widened from the caulking portion toward the outer circumferential edge of each band-shaped yoke core piece.

9. The method according to claim 1, wherein the caulking tongues of the arc-shaped caulking portions are tilted downwardly in a direction opposite to the winding direction at the time of winding the band-shaped yoke core piece.

10. The method according to claim 1, wherein the caulking tongues of the arc-shaped caulking portions are tilted downwardly in the winding direction at the time of winding the band-shaped yoke core piece.

11. The method according to claim 1, wherein the magnetic core piece constituting the laminated magnetic body is made of a material having a iron loss smaller than that of the band-shaped yoke core piece constituting the laminated yoke body.

* * * * *